US012472189B2

(12) United States Patent
King et al.

(10) Patent No.: US 12,472,189 B2
(45) Date of Patent: Nov. 18, 2025

(54) TREATMENT AND PREVENTION OF CAPILLARY MALFORMATION-ARTERIOVENOUS MALFORMATION

(71) Applicant: The Regents of University of Michigan, Ann Arbor, MI (US)

(72) Inventors: Philip King, Ann Arbor, MI (US); Di Chen, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 680 days.

(21) Appl. No.: 17/798,502

(22) PCT Filed: Feb. 12, 2021

(86) PCT No.: PCT/US2021/017835
§ 371 (c)(1),
(2) Date: Aug. 9, 2022

(87) PCT Pub. No.: WO2021/163464
PCT Pub. Date: Aug. 19, 2021

(65) Prior Publication Data
US 2023/0103889 A1    Apr. 6, 2023

Related U.S. Application Data

(60) Provisional application No. 62/975,524, filed on Feb. 12, 2020.

(51) Int. Cl.
*A61K 31/575* (2006.01)
*A61K 31/167* (2006.01)
(Continued)

(52) U.S. Cl.
CPC .......... *A61K 31/575* (2013.01); *A61K 31/167* (2013.01); *A61K 31/192* (2013.01); *A61K 31/194* (2013.01); *A61K 31/198* (2013.01); *A61K 31/275* (2013.01); *A61K 31/277* (2013.01); *A61K 31/352* (2013.01);
(Continued)

(58) Field of Classification Search
CPC .............. A61K 2300/00; A61K 31/166; A61K 31/167; A61K 31/192; A61K 31/194; A61K 31/197; A61K 31/198; A61K 31/275; A61K 31/277; A61K 31/352; A61K 31/365; A61K 31/4045; A61K 31/4184; A61K 31/44; A61K 31/5377; A61K 31/575; A61P 9/14;
(Continued)

(56) References Cited

U.S. PATENT DOCUMENTS

2020/0024666 A1    1/2020    Greene et al.

FOREIGN PATENT DOCUMENTS

WO    WO 2019/156999    8/2019

OTHER PUBLICATIONS

International Search Report and Written Opinion for PCT/US21/17835. Mailed May 5, 2021. 8 pages.
(Continued)

*Primary Examiner* — Savitha M Rao
(74) *Attorney, Agent, or Firm* — David W. Staple; Casimir Jones, S.C.

(57) ABSTRACT

Provided herein are methods for the treatment and prevention of vascular lesions arising from RASA1 and/or EPHB4 mutations and associated with capillary malformation-arteriovenous malformation (CM-AVM).

19 Claims, 43 Drawing Sheets
(39 of 43 Drawing Sheet(s) Filed in Color)
Specification includes a Sequence Listing.

(51) Int. Cl.

| | |
|---|---|
| *A61K 31/192* | (2006.01) |
| *A61K 31/194* | (2006.01) |
| *A61K 31/198* | (2006.01) |
| *A61K 31/275* | (2006.01) |
| *A61K 31/277* | (2006.01) |
| *A61K 31/352* | (2006.01) |
| *A61K 31/365* | (2006.01) |
| *A61K 31/4045* | (2006.01) |
| *A61K 31/4184* | (2006.01) |
| *A61K 31/44* | (2006.01) |
| *A61K 31/5377* | (2006.01) |
| *A61P 9/14* | (2006.01) |

(52) U.S. Cl.
CPC ........ *A61K 31/365* (2013.01); *A61K 31/4045* (2013.01); *A61K 31/4184* (2013.01); *A61K 31/44* (2013.01); *A61K 31/5377* (2013.01); *A61P 9/14* (2018.01)

(58) Field of Classification Search
CPC ............ C12Q 1/6883; C12Q 2600/106; C12Q 2600/156
See application file for complete search history.

(56) References Cited

OTHER PUBLICATIONS

Adams et al., Roles of ephrinB ligands and EphB receptors in cardiovascular development: demarcation of arterial/venous domains, vascular morphogenesis, and sprouting angiogenesis. Genes Dev. Feb. 1, 1999;13(3):295-306.
Amyere et al., Germline Loss-of-Function Mutations in EPHB4 Cause a Second Form of Capillary Malformation-Arteriovenous Malformation (CM-AVM2) Deregulating RAS-MAPK Signaling. Circulation. Sep. 12, 2017;136(11):1037-1048.
Anand et al., MicroRNA-132-mediated loss of p120RasGAP activates the endothelium to facilitate pathological angiogenesis. Nat Med. Aug. 2010;16(8):909-14.
Annunen et al., The novel type II prolyl 4-hydroxylase is the main enzyme form in chondrocytes and capillary endothelial cells, whereas the type I enzyme predominates in most cells. J Biol Chem. Mar. 13, 1998;273(11):5989-92.
Aro et al., Severe Extracellular Matrix Abnormalities and Chondrodysplasia in Mice Lacking Collagen Prolyl 4-Hydroxylase Isoenzyme II in Combination with a Reduced Amount of Isoenzyme I. J Biol Chem. Jul. 3, 2015;290(27):16964-78.
Bachinger et al., Mouse procollagen IV. Characterization and supramolecular association. J Biol Chem. Aug. 25, 1982;257(16):9796-803.
Bazigou et al., Flow control in our vessels: vascular valves make sure there is no way back. Cell Mol Life Sci. Mar. 2013;70(6):1055-66.
Bazigou et al., Primary and secondary lymphatic valve development: molecular, functional and mechanical insights. Microvasc Res. Nov. 2014;96:38-45.
Buday et al., Many faces of Ras activation. Biochim Biophys Acta. Dec. 2008;1786(2):178-87.
Burrows et al., Lymphatic abnormalities are associated with RASA1 gene mutations in mouse and man. Proc Natl Acad Sci U S A. May 21, 2013;110(21):8621-6.
Butler et al., Retrieval from the ER-golgi intermediate compartment is key to the targeting of c-terminally anchored ER-resident proteins. J Cell Biochem. Dec. 2011;112(12):3543-8.
Byers et al., Recessively inherited forms of osteogenesis imperfecta. Annu Rev Genet. 2012;46:475-97.
Chang et al., Mammalian MAP kinase signalling cascades. Nature. Mar. 1, 2001;410(6824):37-40.
Chen et al., RASA1-dependent cellular export of collagen IV controls blood and lymphatic vascular development. J Clin Invest. Jun. 11, 2019;129(9):3545-3561.
Chioran et al., Collagen IV trafficking: The inside-out and beyond story. Dev Biol. Nov. 15, 2017;431(2):124-133.
Claxton et al., Efficient, inducible Cre-recombinase activation in vascular endothelium. Genesis. Feb. 2008;46(2):74-80.
Courtney et al., The PI3K pathway as drug target in human cancer. J Clin Oncol. Feb. 20, 2010;28(6):1075-83.
De Wijn et al., Phenotypic variability in a family with capillary malformations caused by a mutation in the RASA1 gene. Eur J Med Genet. Mar. 2012;55(3):191-5.
Doyle et al., Role of the pro-alpha2(I) COOH-terminal region in assembly of type I collagen: disruption of two intramolecular disulfide bonds in pro-alpha2(I) blocks assembly of type I collagen. J Cell Biochem. Nov. 1, 1998;71(2):233-42.
Eerola et al., Capillary malformation-arteriovenous malformation, a new clinical and genetic disorder caused by RASA1 mutations. Am J Hum Genet. Dec. 2003;73(6):1240-9.
Engelman et al., Effective use of PI3K and MEK inhibitors to treat mutant Kras G12D and PIK3CA H1047R murine lung cancers. Nat Med. Dec. 2008;14(12):1351-6.
Fish et al., The molecular regulation of arteriovenous specification and maintenance. Dev Dyn. Mar. 2015;244(3):391-409.
Gerety et al., Symmetrical mutant phenotypes of the receptor EphB4 and its specific transmembrane ligand ephrin-B2 in cardiovascular development. Mol Cell. Sep. 1999;4(3):403-14.
Gilkes et al., Collagen prolyl hydroxylases are essential for breast cancer metastasis. Cancer Res. Jun. 1, 2013;73(11):3285-96.
Glentis et al., Assembly, heterogeneity, and breaching of the basement membranes. Cell Adh Migr. 2014;8(3):236-45.
Guiraud et al., HANAC Col4a1 Mutation in Mice Leads to Skeletal Muscle Alterations due to a Primary Vascular Defect. Am J Pathol. Mar. 2017;187(3):505-516.
Henkemeyer et al., Vascular system defects and neuronal apoptosis in mice lacking ras GTPase-activating protein. Nature. Oct. 26, 1995;377(6551):695-701.
Holland et al., Juxtamembrane tyrosine residues couple the Eph family receptor EphB2/Nuk to specific SH2 domain proteins in neuronal cells. Embo J. Jul. 1, 1997;16(13):3877-88.
Homan et al., Differential effects of collagen prolyl 3-hydroxylation on skeletal tissues. PLoS Genet. Jan. 2014;10(1):e1004121. 16 pages.
Ishida et al., Hsp47 as a collagen-specific molecular chaperone. Methods Enzymol. 2011;499:167-82.
Ishikawa et al., A molecular ensemble in the rER for procollagen maturation. Biochim Biophys Acta. Nov. 2013;1833(11):2479-91.
Jablonska et al., Neutrophils responsive to endogenous IFN-beta regulate tumor angiogenesis and growth in a mouse tumor model. J Clin Invest. Apr. 2010;120(4):1151-64.
Jeanne et al., COL4A2 mutations impair COL4A1 and COL4A2 secretion and cause hemorrhagic stroke. Am J Hum Genet. Jan. 13, 2012;90(1):91-101.
Jeanne et al., Molecular and Genetic Analyses of Collagen Type IV Mutant Mouse Models of Spontaneous Intracerebral Hemorrhage Identify Mechanisms for Stroke Prevention. Circulation. May 5, 2015;131(18):1555-65.
Jenkins et al., Effect of 3-hydroxyproline residues on collagen stability. J Am Chem Soc. May 28, 2003;125(21):6422-7.
Kawasaki et al., RASA1 functions in EPHB4 signaling pathway to suppress endothelial mTORC1 activity. J Clin Invest. Jun. 2014;124(6):2774-84.
Kim et al., Cell death and endoplasmic reticulum stress: disease relevance and therapeutic opportunities. Nat Rev Drug Discov. Dec. 2008;7(12):1013-30.
Kim et al., EphB ligand, ephrinB2, suppresses the VEGF-and angiopoietin 1-induced Ras/mitogen-activated protein kinase pathway in venous endothelial cells. FASEB J. Jul. 2002;16(9):1126-8.
King et al., Nonredundant functions for Ras GTPase-activating proteins in tissue homeostasis. Sci Signal. Feb. 26, 2013;6(264):re1.
Kivirikko et al., Collagen hydroxylases and the protein disulfide isomerase subunit of prolyl 4-hydroxylases. Adv Enzymol Relat Areas Mol Biol. 1998;72:325-98.

(56) References Cited

OTHER PUBLICATIONS

Kuo et al., Allelic heterogeneity contributes to variability in ocular dysgenesis, myopathy and brain malformations caused by Col4a1 and Col4a2 mutations. Hum Mol Genet. Apr. 1, 2014;23(7):1709-22.
Lapinski et al., A role for p120 RasGAP in thymocyte positive selection and survival of naive T cells. J Immunol. Jul. 1, 2011;187(1):151-63.
Lapinski et al., Generation of mice with a conditional allele of the p120 Ras GTPase-activating protein. Genesis. Dec. 2007;45(12):762-7.
Lapinski et al., RASA1 maintains the lymphatic vasculature in a quiescent functional state in mice. J Clin Invest. Feb. 2012;122(2):733-47.
Lapinski et al., RASA1 regulates the function of lymphatic vessel valves in mice. J Clin Invest. Jun. 30, 2017;127(7):2569-2585.
Lapinski et al., Somatic second hit mutation of RASA1 in vascular endothelial cells in capillary malformation-arteriovenous malformation. Eur J Med Genet. Jan. 2018;61(1):11-16.
Li et al., Activation of Ras in the Vascular Endothelium Induces Brain Vascular Malformations and Hemorrhagic Stroke. Cell Rep. Sep. 11, 2018;24(11):2869-2882.
Lim et al., Role of the pro-alpha2(I) COOH-terminal region in assembly of type I collagen: truncation of the last 10 amino acid residues of pro-alpha2(I) chain prevents assembly of type I collagen heterotrimer. J Cell Biochem. Nov. 1, 1998;71(2):216-32.
Lubeck et al., Blood vascular abnormalities in Rasa1 (R780Q) knockin mice: implications for the pathogenesis of capillary malformation-arteriovenous malformation. Am J Pathol. Dec. 2014;184(12):3163-9.
Lubeck et al., Cutting Edge: Codeletion of the Ras GTPase-Activating Proteins (RasGAPs) Neurofibromin 1 and p120 RasGAP in T Cells Results in the Development of T Cell Acute Lymphoblastic Leukemia. J Immunol. Jul. 1, 2015;195(1):31-5.
Macmurdo et al., RASA1 somatic mutation and variable expressivity in capillary malformation/arteriovenous malformation (CM/AVM) syndrome. Am J Med Genet A. Jun. 2016;170(6):1450-4.
Malhotra et al., The pathway of collagen secretion. Annu Rev Cell Dev Biol. 2015;31:109-24.
Mao et al., Type IV Collagens and Basement Membrane Diseases: Cell Biology and Pathogenic Mechanisms. Curr Top Membr. 2015;76:61-116.
Martin-Almedina et al., EPHB4 kinase-inactivating mutations cause autosomal dominant lymphatic-related hydrops fetalis. J Clin Invest. Aug. 1, 2016;126(8):3080-8.
Marutani et al., Accumulation of type IV collagen in dilated ER leads to apoptosis in Hsp47-knockout mouse embryos via induction of Chop. J Cell Sci. Nov. 15, 2004;117(Pt 24):5913-22.
Matsuoka et al., Insufficient folding of type IV collagen and formation of abnormal basement membrane-like structure in embryoid bodies derived from Hsp47-null embryonic stem cells. Mol Biol Cell. Oct. 2004;15(10):4467-75.
Melville et al., The feelgood mutation in zebrafish dysregulates COPII-dependent secretion of select extracellular matrix proteins in skeletal morphogenesis. Dis Model Mech. Nov. 2011;4(6):763-76.
Michel et al., Anoikis in the cardiovascular system: known and unknown extracellular mediators. Arterioscler Thromb Vasc Biol. Dec. 2003;23(12):2146-54.
Mizuno et al., The peptides acetyl-(Gly-3(S)Hyp-4(R)Hyp)10-NH2 and acetyl-(Gly-Pro-3(S)Hyp)10-NH2 do not form a collagen triple helix. J Biol Chem. Jan. 2, 2004;279(1):282-7.
Mleczko-Sanecka et al., Unbiased RNAi screen for hepcidin regulators links hepcidin suppression to proliferative Ras/RAF and nutrient-dependent mTOR signaling. Blood. Mar. 6, 2014;123(10):1574-85.
Myllyharju et al., Collagens, modifying enzymes and their mutations in humans, flies and worms. Trends Genet. Jan. 2004;20(1):33-43.

Nikolaev et al., Somatic Activating KRAS Mutations in Arteriovenous Malformations of the Brain. N Engl J Med. Jan. 18, 2018;378(3):250-261.
Nissi et al., Prolyl 4-hydroxylase isoenzymes I and II have different expression patterns in several human tissues. J Histochem Cytochem. Sep. 2001;49(9):1143-53.
Oslowski et al., The binary switch between life and death of endoplasmic reticulum-stressed beta cells. Curr Opin Endocrinol Diabetes Obes. Apr. 2010;17(2):107-12.
Pratilas et al., Targeting the mitogen-activated protein kinase pathway: physiological feedback and drug response. Clin Cancer Res. Jul. 1, 2010;16(13):3329-34.
Rautavuoma et al., Premature aggregation of type IV collagen and early lethality in lysyl hydroxylase 3 null mice. Proc Natl Acad Sci U S A. Sep. 28, 2004;101(39):14120-5.
Revencu et al., Parkes Weber syndrome, vein of Galen aneurysmal malformation, and other fast-flow vascular anomalies are caused by RASA1 mutations. Hum Mutat. Jul. 2008;29(7):959-65.
Revencu et al., RASA1 mutations and associated phenotypes in 68 families with capillary malformation-arteriovenous malformation. Hum Mutat. Dec. 2013;34(12):1632-41.
Ricard-Blum. The collagen family. Cold Spring Harb Perspect Biol. Jan. 1, 2011;3(1):a004978. 19 pages.
Rose et al., Inhibition of 2-oxoglutarate dependent oxygenases. Chem Soc Rev. Aug. 2011;40(8):4364-97.
Ruotsalainen et al., Glycosylation catalyzed by lysyl hydroxylase 3 is essential for basement membranes. J Cell Sci. Feb. 15, 2006;119(Pt 4):625-35.
Saito et al., Mechanisms for exporting large-sized cargoes from the endoplasmic reticulum. Cell Mol Life Sci. Oct. 2015;72(19):3709-20.
Schmidpeter et al., Prolyl isomerization and its catalysis in protein folding and protein function. J Mol Biol. Apr. 10, 2015;427(7):1609-31.
Sevick-Muraca et al., Lymphatic vessel abnormalities arising from disorders of Ras signal transduction. Trends Cardiovasc Med. Apr. 2014;24(3):121-7.
Shoulders et al., Collagen structure and stability. Annu Rev Biochem. 2009;78:929-58.
Sipila et al., Secretion and assembly of type IV and VI collagens depend on glycosylation of hydroxylysines. J Biol Chem. Nov. 16, 2007;282(46):33381-33388.
Su et al., Apolipoprotein A-I (apoA-I) and apoA-I mimetic peptides inhibit tumor development in a mouse model of ovarian cancer. Proc Natl Acad Sci U S A. Nov. 16, 2010;107(46):19997-20002.
Takaluoma et al., Tissue-specific changes in the hydroxylysine content and cross-links of collagens and alterations in fibril morphology in lysyl hydroxylase 1 knock-out mice. J Biol Chem. Mar. 2, 2007;282(9):6588-96.
Tiainen et al., Characterization of recombinant human prolyl 3-hydroxylase isoenzyme 2, an enzyme modifying the basement membrane collagen IV. J Biol Chem. Jul. 11, 2008;283(28):19432-9.
Udan et al., Understanding vascular development. Wiley Interdiscip Rev Dev Biol. May-Jun. 2013;2(3):327-46.
Unlu et al., Trafficking mechanisms of extracellular matrix macromolecules: insights from vertebrate development and human diseases. Int J Biochem Cell Biol. Feb. 2014;47:57-67.
Venetsanakos et al., Induction of tubulogenesis in telomerase-immortalized human microvascular endothelial cells by glioblastoma cells. Exp Cell Res. Feb. 1, 2002;273(1):21-33.
Vivanti et al., Loss of function mutations in EPHB4 are responsible for vein of Galen aneurysmal malformation. Brain. Apr. 1, 2018;141(4):979-988.
Vranka et al., Prolyl 3-hydroxylase 1 null mice display abnormalities in fibrillar collagen-rich tissues such as tendons, skin, and bones. J Biol Chem. May 28, 2010;285(22):17253-62.
Wang et al., Ephrin-B2 controls VEGF-induced angiogenesis and lymphangiogenesis. Nature. May 27, 2010;465(7297):483-6.
Wang et al., Molecular distinction and angiogenic interaction between embryonic arteries and veins revealed by ephrin-B2 and its receptor Eph-B4. Cell. May 29, 1998;93(5):741-53.

(56) References Cited

OTHER PUBLICATIONS

Weng et al., COL4A1 mutations in patients with sporadic late-onset intracerebral hemorrhage. Ann Neurol. Apr. 2012;71(4):470-7.
Wennerberg et al., The Ras superfamily at a glance. J Cell Sci. Mar. 1, 2005;118(Pt 5):843-6.
Westenskow et al., Ras pathway inhibition prevents neovascularization by repressing endothelial cell sprouting. J Clin Invest. Nov. 2013;123(11):4900-8.
Wilkinson et al., Protein disulfide isomerase. Biochim Biophys Acta. Jun. 1, 2004;1699(1-2):35-44.
Wilson et al., Global defects in collagen secretion in a Mia3/TANGO1 knockout mouse. J Cell Biol. May 30, 2011;193(5):935-51.
Wooderchak-Donahue et al., Expanding the clinical and molecular findings in RASA1 capillary malformation-arteriovenous malformation. Eur J Hum Genet. Oct. 2018;26(10):1521-1536.
Wooderchak-Donahue et al., Phenotype of CM-AVM2 caused by variants in EPHB4: how much overlap with hereditary hemorrhagic telangiectasia (HHT)? Genet Med. Sep. 2019;21(9):2007-2014.
Xiao et al., EphB4 promotes or suppresses Ras/MEK/ERK pathway in a context-dependent manner: Implications for EphB4 as a cancer target. Cancer Biol Ther. Jun. 2012;13(8):630-7.
Yamane et al., Laminar high shear stress up-regulates type IV collagen synthesis and down-regulates MMP-2 secretion in endothelium. A quantitative analysis. Cell Tissue Res. Jun. 2010;340(3):471-9.
Yamauchi et al., Lysine post-translational modifications of collagen. Essays Biochem. 2012;52:113-33.
Yu et al., EPHB4 Mutation Implicated in Capillary Malformation-Arteriovenous Malformation Syndrome: A Case Report. Pediatr Dermatol. Sep. 2017;34(5):e227-e230.
Zybailov et al., Statistical analysis of membrane proteome expression changes in Saccharomyces cerevisiae. J Proteome Res. Sep. 2006;5(9):2339-47.

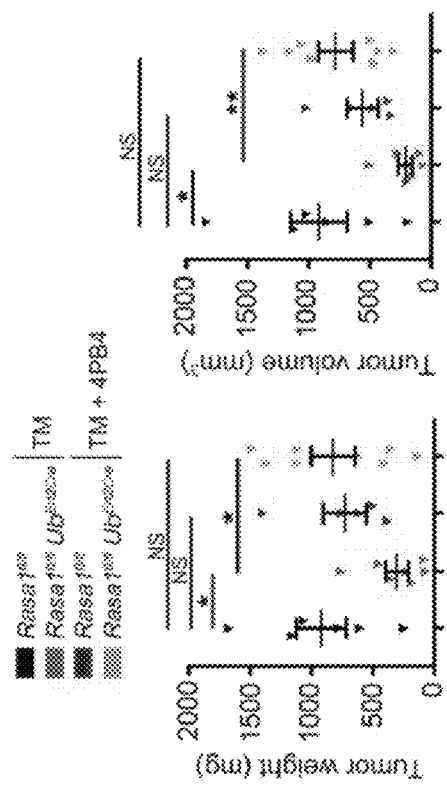
FIG. 12B
FIG. 12A
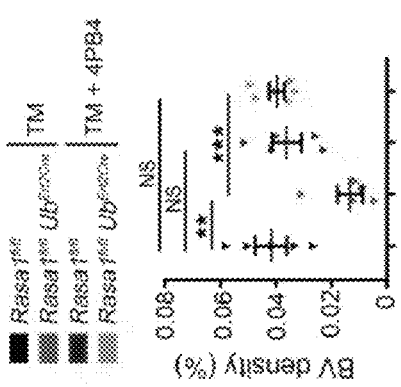
FIG. 12D
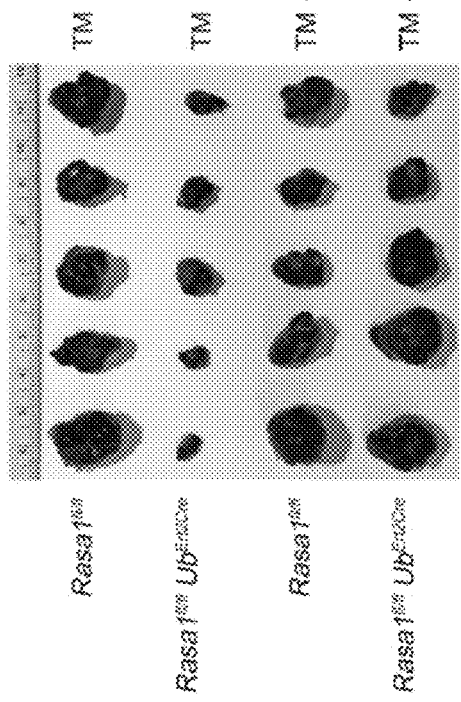
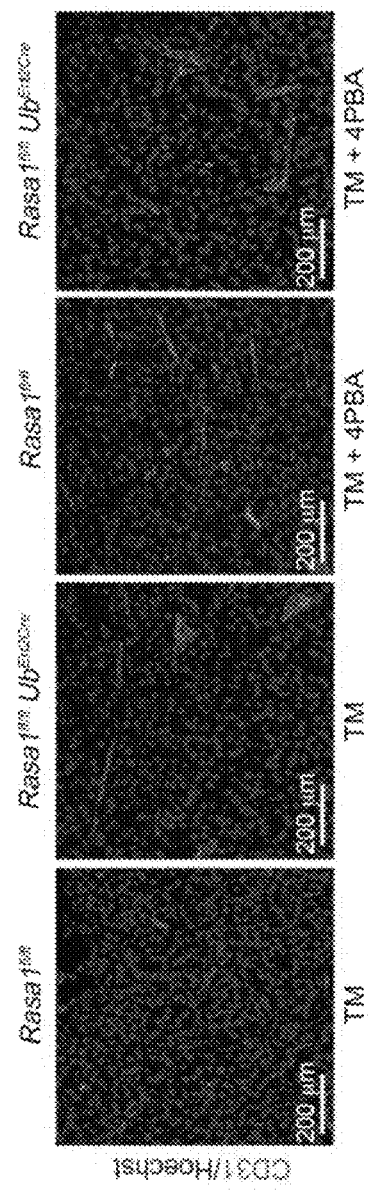
FIG. 12C

TREATMENT AND PREVENTION OF CAPILLARY MALFORMATION-ARTERIOVENOUS MALFORMATION

CROSS-REFERENCE TO RELATED APPLICATION

The present application claims priority to U.S. Provisional Patent Application Ser. No. 62/975,524 filed Feb. 12, 2020, which is hereby incorporated by reference in its entirety.

FIELD

Provided herein are methods for the treatment and prevention of vascular lesions arising from RASA1 and/or EPHB4 mutations and associated with capillary malformation-arteriovenous malformation (CM-AVM).

BACKGROUND

Capillary malformation-arteriovenous malformation (CM-AVM) is an autosomal dominant inherited vascular disease that is characterized by one or more cutaneous CM together with fast flow vascular lesions in one third of patients (Refs. 1-3; incorporated by reference in their entireties). Fast flow lesions, which include AVMs and arteriovenous fistulas, occur in different anatomical locations and can be life-threatening. Lymphatic vessel (LV) abnormalities that result in lymphedema, chylothorax and chylous ascites have also been identified in a minority of CM-AVM patients (Refs. 2-7; incorporated by reference in their entireties). In the majority of CM-AVM cases, blood vessel (BV) and LV lesions are present at birth, although can also develop throughout childhood and up to early adulthood.

Inactivating germline mutations of the RASA1 gene are responsible for approximately fifty percent of CM-AVM cases (Refs. 1-3; incorporated by reference in their entireties). RASA1 encodes p120 Ras GTPase-activating protein (p120 RasGAP or RASA1), a negative-regulator of the Ras small GTP-binding protein that promotes cell growth, proliferation and differentiation (Refs. 8-10; incorporated by reference in their entireties). In quiescent cells, Ras exists predominantly in an inactive GDP-bound state. Growth factors promote the conversion of Ras to an active GTP-bound state that results in the triggering of downstream signaling pathways including the mitogen-activated protein kinase (MAPK) and phosphatidylinositol 3-kinase (PI3K) pathways that drive cellular responses. RASA1 inhibits Ras signal transduction by augmenting the ability of Ras to hydrolyze bound GTP resulting in its conversion to the inactive GDP-bound form (Ref. 8; incorporated by reference in its entirety). Vascular lesions in CM-AVM patients with germline RASA1 mutations arise as a consequence of somatic inactivating mutation of the inherited wild-type RASA1 allele in endothelial cells (EC) or their precursors (Refs. 6, 11; incorporated by reference in their entireties). Loss of RASA1 in these EC would be expected to result in dysregulated Ras signal transduction that could drive lesion development.

Inactivating germline mutations of EPHB4, which encodes the ephrin receptor B4, are responsible for the majority of CM-AVM cases that are not explained by RASA1 mutation (Ref. 12; incorporated by reference in its entirety). Accordingly, CM-AVM resulting from RASA1 mutation has been re-named CM-AVM1 and CM-AVM resulting from EPHB4 mutation has been named CM-AVM2. Clinically, CM-AVM1 and CM-AVM2 are almost indistinguishable except for the additional occurrence of telangiectasias in CM-AVM2 (Ref. 12; incorporated by reference in its entirety).

SUMMARY

Provided herein are methods for the treatment and prevention of vascular lesions arising from RASA1 and/or EPHB4 mutations and associated with capillary malformation-arteriovenous malformation (CM-AVM).

In some embodiments, provided herein are methods of treating or preventing capillary malformation-arteriovenous malformation (CM-AVM) comprising administering to a subject a pharmaceutical composition that promotes proper folding, and therefore export of, collagen IV from endothelial cells.

In some embodiments, a pharmaceutical composition comprises a chaperone molecule. In some embodiments, the chaperone molecule facilitates proper folding of collagen IV, thereby allowing export of collagen from the endoplasmic reticulum and from the endothelial cells. In some embodiments, the chaperone molecule is selected from 4-phenylbutyric acid (PBA), tauroursodeoxycholic acid (TUDCA), and ursodeoxycholic acid (UDCA).

In some embodiments, a pharmaceutical composition comprises an inhibitor of a collagen IV modifying enzyme. In some embodiments, the inhibitor prevents over modification of collagen IV that leads to collagen IV accumulation in the ER and/or retaining of collagen IV within endothelial cells. In some embodiments, the collagen IV modifying enzyme comprises a 2-oxoglutarate dependent collagen IV modifying enzymes. In some embodiments, the inhibitor is selected from:

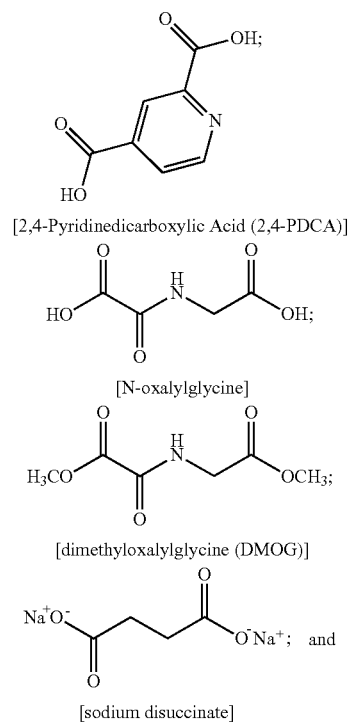

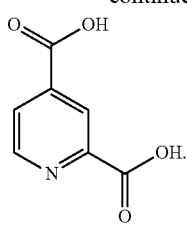

[pyridine-2,4-dicarboxylic acid (PDCA)]

In some embodiments, a pharmaceutical composition comprises an inhibitor of an enzyme of a signaling pathway that is downstream from RASA1 and/or EPHB4. In some embodiments, the pharmaceutical composition comprises an inhibitor of a mitogen-activated protein kinase (MAPK). In some embodiments, the inhibitor is selected from:

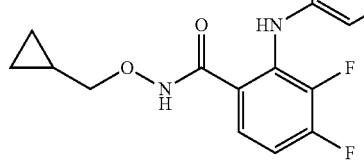

[AZD6244]

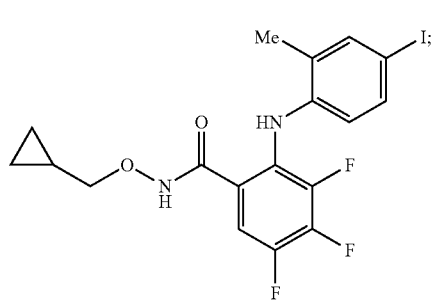

[Arctigenin]

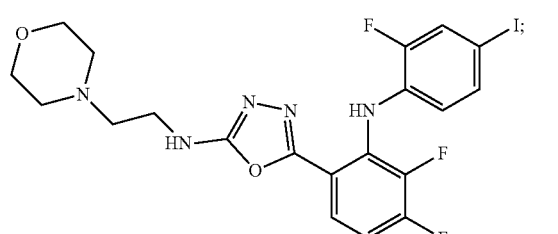

[BIX 02189]

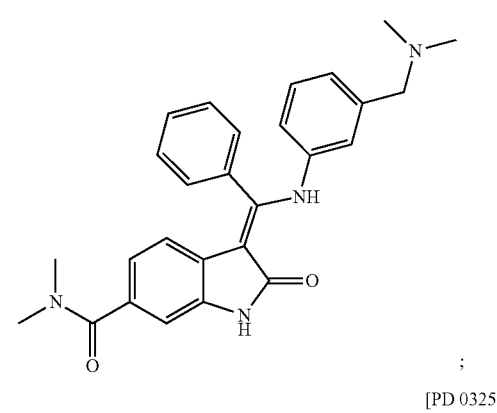

[PD 0325901]

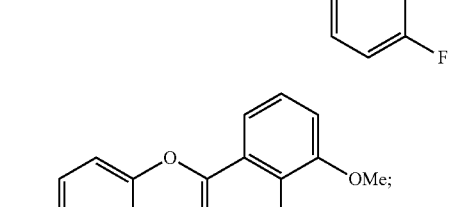

[PD 184352]

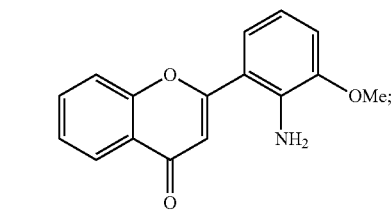

[PD 198306]

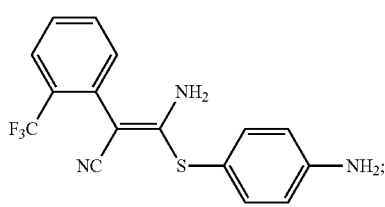

[PD 334581]

[PD 98059]

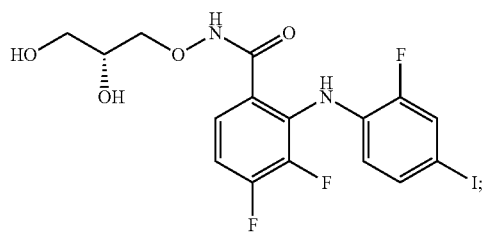

[SL 327]

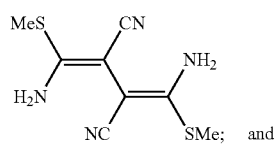

[U0124]

and

-continued

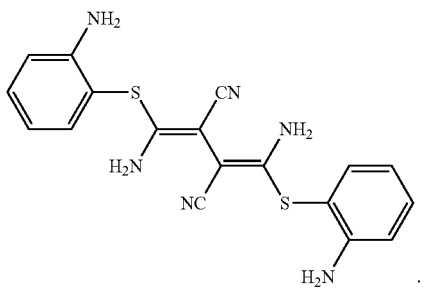

In some embodiments, a pharmaceutical composition is administered to a subject that carries a germline mutation of RASA1 (RAS p21 protein activator 1). In some embodiments, a pharmaceutical composition is administered to a subject that carries a germline mutation of EPHB4 (Ephrin type-B receptor 4). In some embodiments, the subject is a neonate, infant, juvenile, or adult. In some embodiments, the subject suffers from CM-AVM and the pharmaceutical composition is administered to treat CM-AVM or symptoms thereof. In some embodiments, the subject is at risk of developing CM-AVM (e.g., a carrier of a germline mutation that renders susceptibility to CM-AVM (e.g., RASA1 mutation, EPHB4 mutation, etc.), etc.) and the pharmaceutical composition is administered to prevent CM-AVM or symptoms thereof. In some embodiments, the subject is an adult female that carries a germline mutation (e.g., RASA1 mutation, EPHB4 mutation, etc.) that places offspring of the subject at risk for CM-AVM. In some embodiments, the subject is an adult female with a sexual partner that carries a germline mutation (e.g., RASA1 mutation, EPHB4 mutation, etc.) that places offspring of the subject and her partner at risk for CM-AVM. In some embodiments, the subject is pregnant, and the pharmaceutical composition is administered to prevent the offspring from developing CM-AVM.

In some embodiments, provided herein is the use of a pharmaceutical composition that promotes proper folding, and therefore export of, collagen IV from endothelial cells for the treatment or prevention of CM-AVM. In some embodiments, provided herein are pharmaceutical compositions that promotes proper folding, and therefore export of, collagen IV from endothelial cells (e.g., for use as a medicament). In some embodiments, provided herein are pharmaceutical compositions for use in the treatment or prevention of CM-AVM. In some embodiments, provided herein are kits comprising a pharmaceutical composition that promotes proper folding, and therefore export of, collagen IV from endothelial cells and other such components, and the use thereof for the treatment or prevention of CM-AVM.

In some embodiments, provided herein are methods comprising: (a) testing a subject for a germline mutation that renders susceptibility to CM-AVM; and (b) administering to the subject a pharmaceutical composition that promotes proper folding, and therefore export of, collagen IV from endothelial cells. In some embodiments, the subject is an infant or neonate. In some embodiments, the subject is a female and is pregnant or pursuing pregnancy. In some embodiments, the subject is a female of reproductive age.

In some embodiments, provided herein are methods comprising co-administering to a subject a pharmaceutical composition that promotes proper folding, and therefore export of, collagen IV from endothelial cells and one or more agents that promote prenatal health and/or prevent development of birth defects in offspring of the subject (e.g., prenatal vitamins, prenatal supplements, etc.). In some embodiments, provided herein are kits comprising a pharmaceutical composition that promotes proper folding, and therefore export of, collagen IV from endothelial cells and one or more agents that promote prenatal health and/or prevent development of birth defects in offspring of the subject (e.g., prenatal vitamins, prenatal supplements, etc.).

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 12A-E. Disruption of Rasa1 in adult mice inhibits pathological angiogenesis in a B16 melanoma model. Littermate adult Rasa1$^{fl/fl}$ and Rasa1$^{fl/fl}$ Ub$^{ert2cre}$ mice were administered TM before subcutaneous injection of B16 melanoma cells into flanks one week later. 4PBA was administered to some mice at the same time as B16 melanoma cells and every day thereafter for the duration of the experiment. After 13 days, mice were euthanized and tumors were harvested. (A) Representative images of harvested tumors are shown. (B) Graphs show mean+/−1 SEM of tumor weight and volume (n=5-8 tumors from mice of each genotype and treatment condition). (C) Sections of tumors were stained with Hoechst and CD31 antibodies. Representative images show reduced BV density in tumors from Rasa1$^{fl/fl}$ Ub$^{ert2cre}$ mice treated TM alone. (D) Graph shows mean+/−1 SEM of percentage coverage of fields with BV (n=5-6 tumors from mice of each genotype and treatment condition). (E) Tumor sections were stained with Hoechst and antibodies against collagen IV and CD31. Representative images are shown. Note accumulation of collagen IV in BEC of tumors from $Rasa1^{fl/fl}\ Ub^{ert2cre}$ mice treated with TM alone (arrows). *, P<0.05, **, P<0.01; ns, not significant, one-way ANOVA test with a Dunnett's multiple comparisons post-hoc test.

Graphs show mean+/−1 SEM of tumor weight and volume (n=6-8 tumors from mice of each genotype and treatment condition). ns, not significant, one-way ANOVA test with a Dunnett's multiple comparisons post-hoc test.

Figure 36:
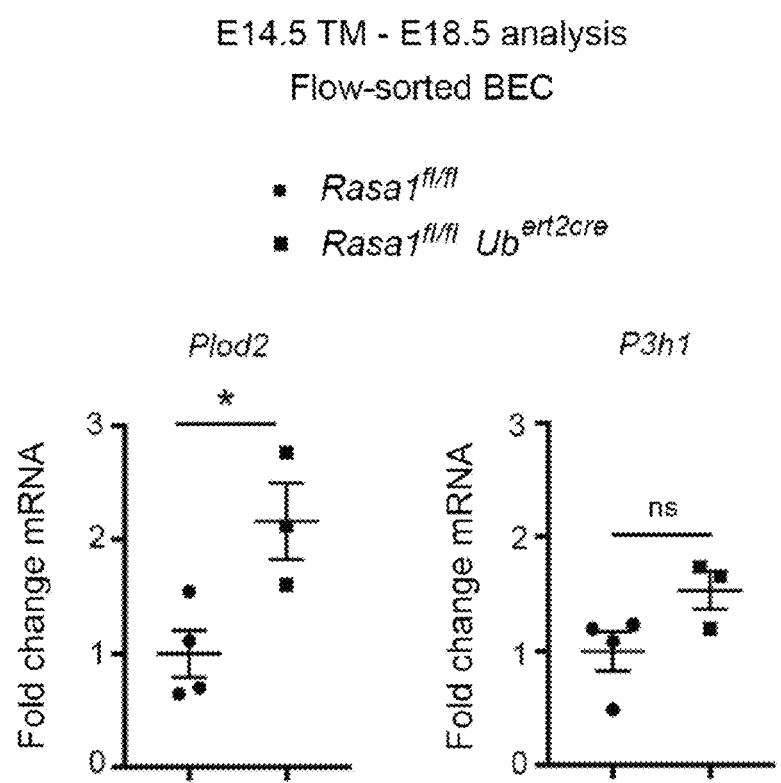

FIG. 36. mRNA levels of collagen IV-modifying enzymes in induced RASA1-deficient BEC. TM was administered to littermate Rasa1$^{fl/fl}$ and Rasa1$^{fl/fl}$ Ub$^{ert2cre}$ embryos at E14.5. At E18.5 skin BEC were purified from embryos and mRNA expression levels of the indicated collagen IV modifying enzymes were determined by real time PCR. Each symbol represents the fold change in mRNA expression in BEC from individual Rasa1$^{fl/fl}$ and Rasa1$^{fl/fl}$ Ub$^{ert2cre}$ embryos relative to the mean fold change in mRNA expression in Rasa1$^{fl/fl}$ embryos. Bars indicate mean+/−1 SEM of the fold change mRNA. *, p<0.05; ns, not significant, Student's 2-sample t-test.

Figure 37:
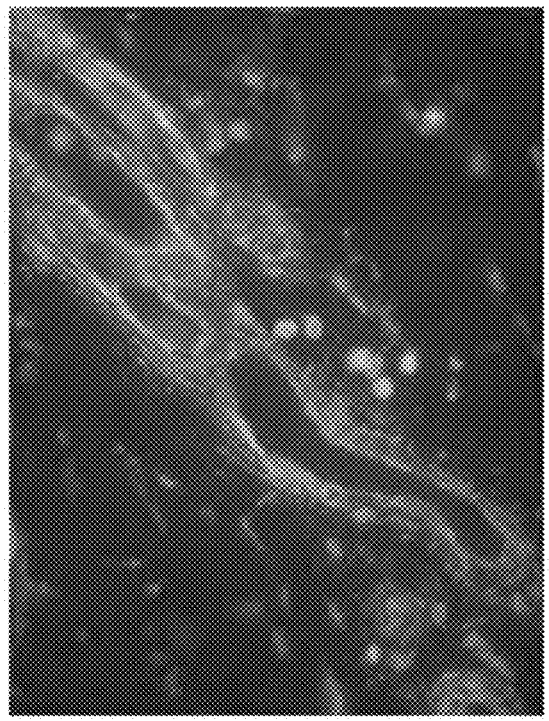
Figure 37:
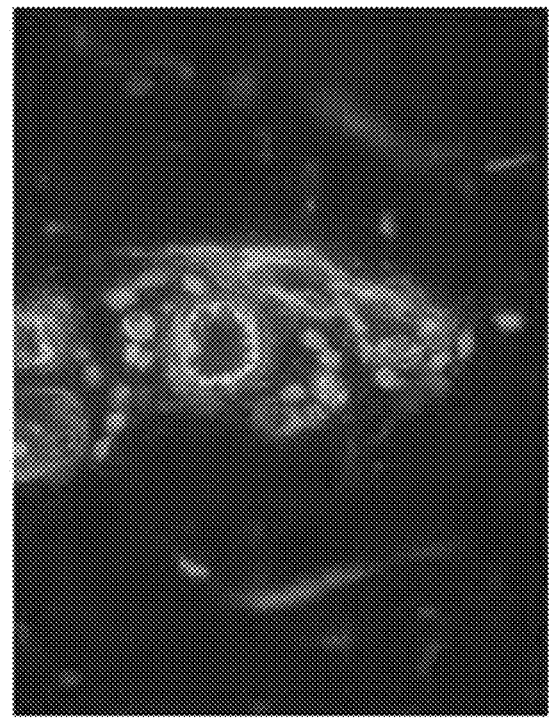

FIG. 37. Collagen IV distribution in CM-AVM1 lesion vessels. Sections of skin from a normal subject and lesional skin from a CM-AVM1 patient with an established somatic second hit RASA1 mutation in EC of the same lesion were stained with Hoechst and antibodies against CD31 and collagen IV. Note absence of evidence of collagen IV accumulation in EC of the CM-AVM1 vessels.

Figure 38:
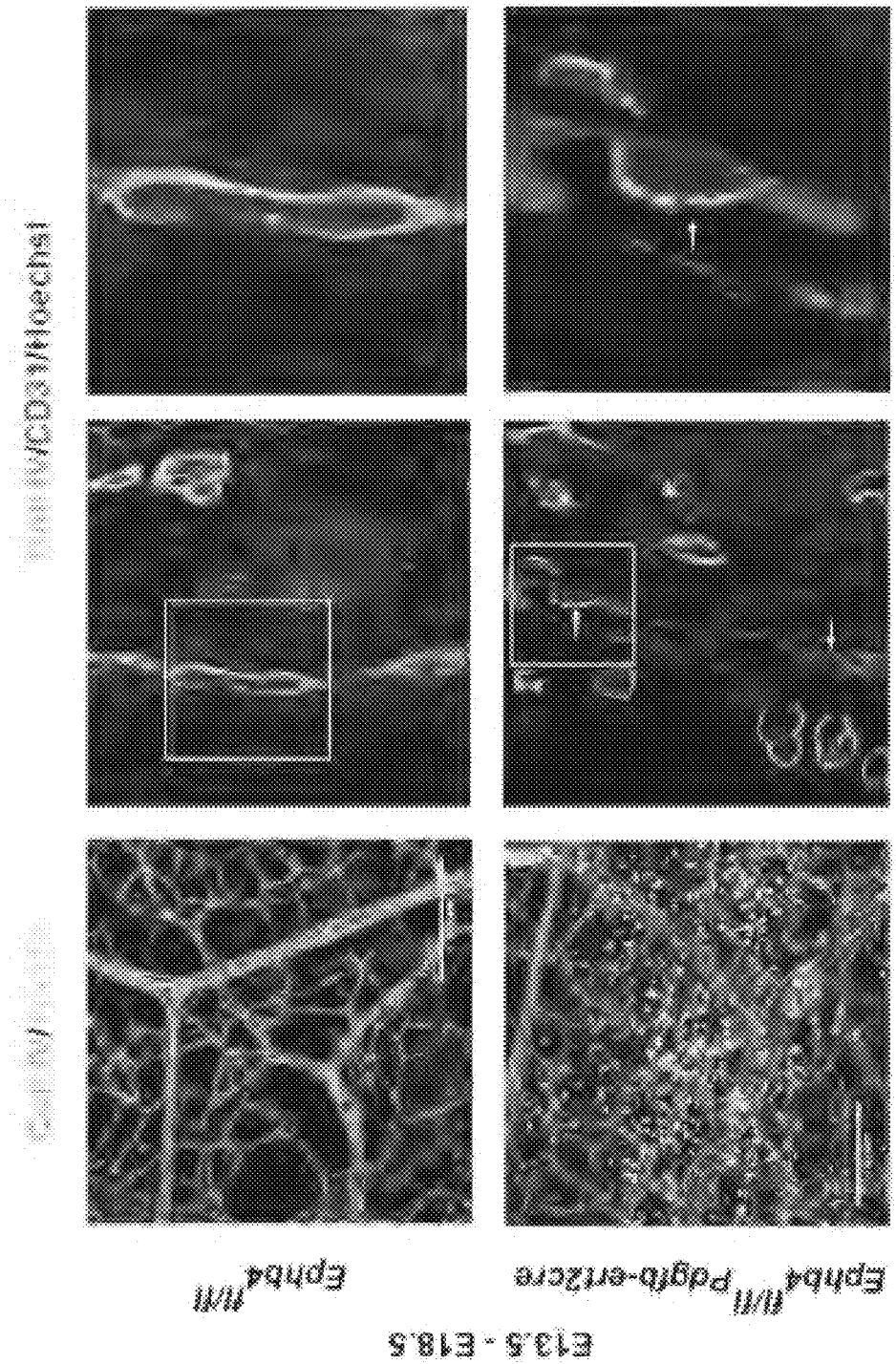

FIG. 38. Induced EC-specific disruption of Ephb4 during developmental angiogenesis results in BV hemorrhage and BEC intracellular accumulation of collagen IV. Embryos of the indicated genotypes were administered tamoxifen at E13.5 and harvested at E18.5. Whole mount skin sections (left) were stained with anti-CD31 and anti-Ter119 antibodies to identify BV and erythrocytes respectively. Extravasated erythrocytes in the Ephb4$^{fl/fl}$ Pdgfb-ert2cre embryos are apparent. Sections of skin were stained with anti-CD31 and anti-collagen IV antibodies (middle). Intracellular collagen accumulation of collagen IV in BEX of the Ephb4$^{fl/fl}$ Pdgfb-ert2cre embryos is apparent (arrows). Higher magnifications of boxed areas are shown at right. Punctate perinuclear accumulation of collagen IV internal to the luminal CD31 staining in the Ephb4$^{fl/fl}$ Pdgfb-ert2cre embryos is apparent. The same results were observed in 3/3 cre+ and 2/2 cre− embryos in a single litter.

Figure 39:
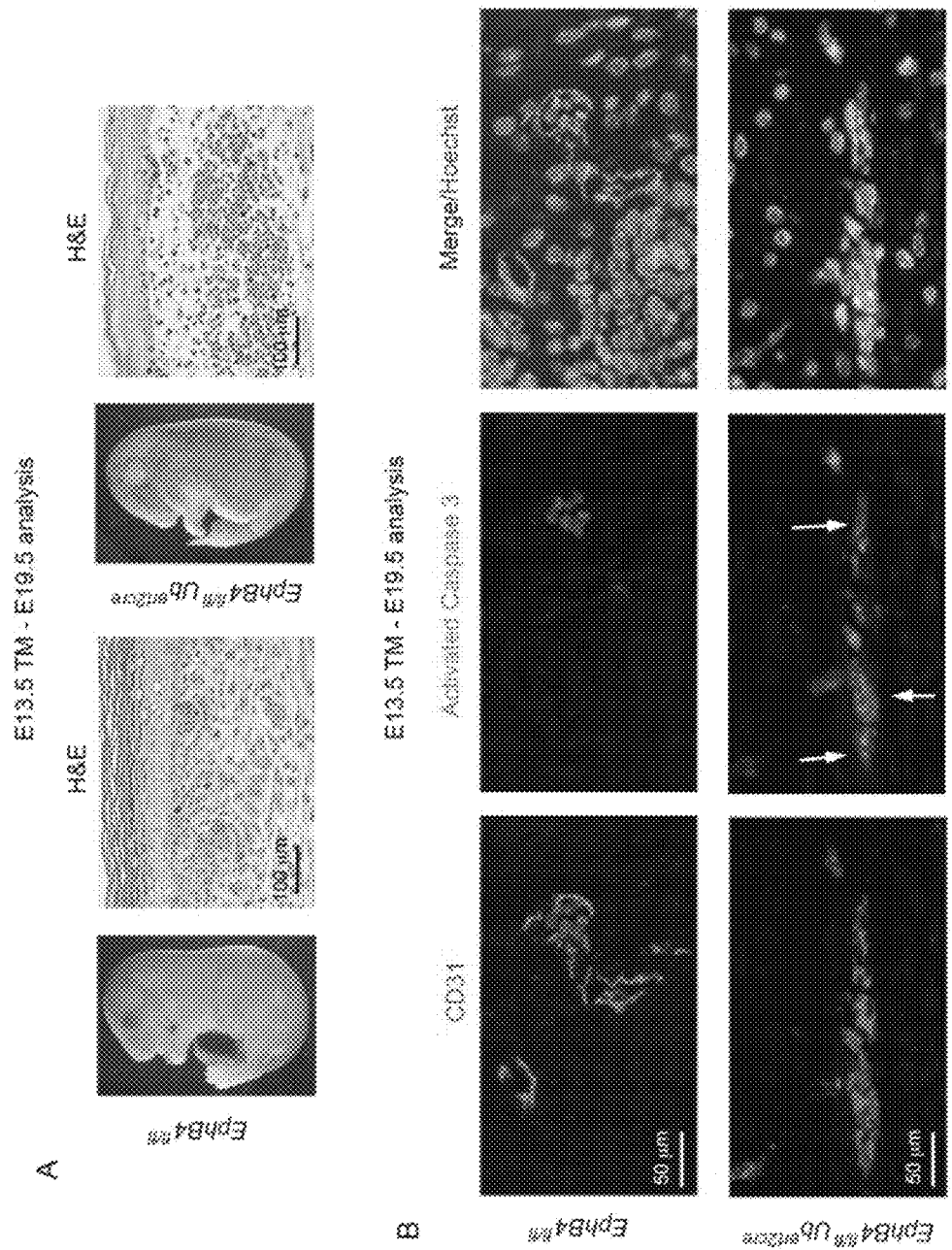

FIG. 39, panels A-B. Hemorrhage, edema and EC apoptosis following global disruption of EphB4 during developmental angiogenesis. (A) TM was administered to littermate EphB4$^{fl/fl}$ and EphB41$^{fl/fl}$ Ub$^{ert2cre}$ embryos at E13.5 and embryos were harvested at E19.5. (A) EphB4$^{fl/fl}$ Ub$^{ert2cre}$ embryos show extensive cutaneous hemorrhage that was confirmed by staining of skin sections with H&E. (B) Skin sections were additionally stained with Hoechst and antibodies against CD31 and activated caspase 3. Note activated caspase 3 (arrows) surrounding fragmented nuclei of apoptotic BEC of EphB4$^{fl/fl}$ Ub$^{ert2cre}$ embryos.

Figure 40:
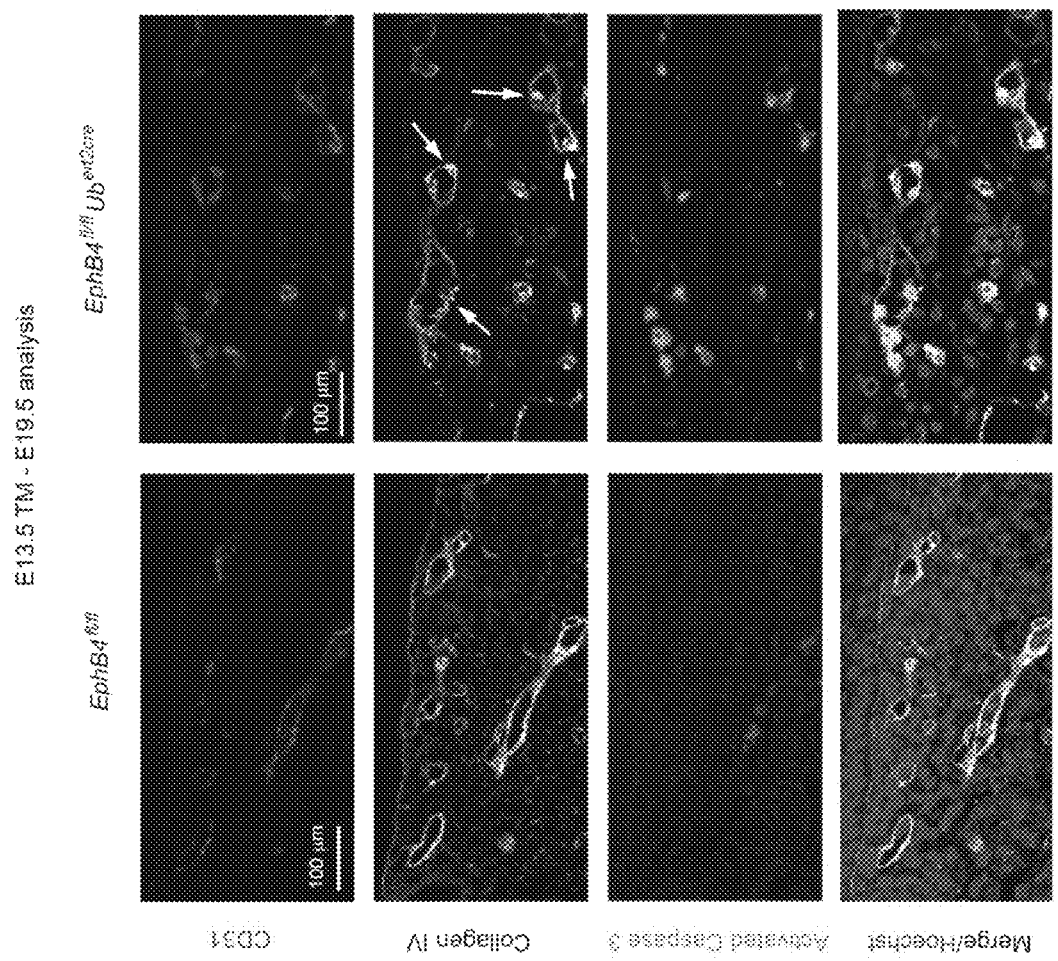

FIG. 40. Disruption of EphB4 during developmental angiogenesis results in retention of collagen IV within BEC. TM was administered to littermate EphB41$^{fl/fl}$ and EphB4$^{fl/fl}$ Ub$^{ert2cre}$ embryos at E13.5. Embryos were harvested at E19.5 and skin sections were stained with Hoechst and antibodies against CD31, collagen IV and activated caspase 3. Note accumulation of collagen IV within BEC of EphB4$^{fl/fl}$ Ub$^{ert2cre}$ embryos (arrows).

DEFINITIONS

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular molecules, compositions, methodologies or protocols herein described, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise.

As used herein, the term "comprise" and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

As used herein, the terms "treat," "treatment," and "treating" refer to reducing the amount or severity of a particular condition, disease state, or symptoms thereof, in a subject presently experiencing or afflicted with the condition or disease state. The terms do not necessarily indicate complete treatment (e.g., total elimination of the condition, disease, or symptoms thereof).

As used herein, the terms "prevent," "prevention," and "preventing" refer to reducing the likelihood of a particular condition or disease state from occurring in a subject not presently experiencing or afflicted with the condition or disease state. The terms do not necessarily indicate complete or absolute prevention.

As used herein, the term "subject" broadly refers to any animal, including human and non-human animals (e.g., dogs, cats, cows, horses, sheep, poultry, fish, crustaceans, etc.). As used herein, the term "patient" typically refers to a human subject that is being treated for a disease or condition.

As used herein, the term "neonate", when used in reference to a human subject, refers to a subject under 30 days of age.

As used herein, the term "infant", when used in reference to a human subject, refers to a subject under 1 year of age.

As used herein, the term "juvenile", when used in reference to a human subject, refers to a subject that has not reached physical and/or sexual maturity.

As used herein, the term "adult", when used in reference to a human subject, refers to a subject that has reached physical and/or sexual maturity.

As used herein, the term "pharmaceutical composition" refers to the combination of an active agent with a carrier, inert or active, making the composition especially suitable for diagnostic or therapeutic use in vitro, in vivo or ex vivo.

The terms "pharmaceutically acceptable" or "pharmacologically acceptable," as used herein, refer to compositions that do not substantially produce adverse reactions, e.g., toxic, allergic, or immunological reactions, when administered to a subject.

As used herein, the term "pharmaceutically acceptable carrier" refers to any of the standard pharmaceutical carriers including, but not limited to, phosphate buffered saline solution, water, emulsions (e.g., such as an oil/water or water/oil emulsions), and various types of wetting agents, any and all solvents, dispersion media, coatings, sodium lauryl sulfate, isotonic and absorption delaying agents, disintigrants (e.g., potato starch or sodium starch glycolate), and the like. The compositions also can include stabilizers and preservatives. For examples of carriers, stabilizers and adjuvants, see, e.g., Martin, Remington's Pharmaceutical Sciences, 15th Ed., Mack Publ. Co., Easton, Pa. (1975), incorporated herein by reference in its entirety.

As used herein, the terms "administration" and "administering" refer to the act of giving a drug, prodrug, or other agent, or therapeutic treatment to a subject or in vivo, in vitro, or ex vivo cells, tissues, and organs. Exemplary routes of administration to the human body can be through space under the arachnoid membrane of the brain or spinal cord (intrathecal), the eyes (ophthalmic), mouth (oral), skin (topical or transdermal), nose (nasal), lungs (inhalant), oral mucosa (buccal), ear, rectal, vaginal, by injection (e.g., intraosseously, intravenously, subcutaneously, intratumorally, intraperitoneally, etc.) and the like.

As used herein, the terms "co-administration" and "co-administering" refer to the administration of at least two agent(s) or therapies to a subject. In some embodiments, the co-administration of two or more agents or therapies is concurrent. In other embodiments, a first agent/therapy is administered prior to a second agent/therapy. Those of skill in the art understand that the formulations and/or routes of administration of the various agents or therapies used may vary. The appropriate dosage for co-administration can be readily determined by one skilled in the art. In some embodiments, when agents or therapies are co-administered, the respective agents or therapies are administered at lower dosages than appropriate for their administration alone. Thus, co-administration is especially desirable in embodiments where the co-administration of the agents or therapies lowers the requisite dosage of a potentially harmful (e.g., toxic) agent(s), and/or when co-administration of two or more agents results in sensitization of a subject to beneficial effects of one of the agents via co-administration of the other agent.

As used herein, the term "effective amount" refers to the amount of a composition sufficient to effect beneficial or desired results. An effective amount can be administered in one or more administrations, applications or dosages and is not intended to be limited to a particular formulation or administration route.

DETAILED DESCRIPTION

Provided herein are methods for the treatment and prevention of vascular lesions arising from RASA1 and/or EPHB4 mutations and associated with capillary malformation-arteriovenous malformation (CM-AVM).

Combined germline and somatic second hit inactivating mutations of the RASA1 gene, which encodes a negative regulator of the Ras signaling pathway, cause blood and lymphatic vascular lesions in the human autosomal dominant vascular disorder capillary malformation-arteriovenous malformation (CM-AVM). Experiments conducted during development of embodiments herein using different murine models of RASA1-deficiency elucidated that RASA1 was essential for the survival of EC during developmental angiogenesis in which primitive vascular plexuses are remodeled into hierarchical vascular networks. RASA1 was required for EC survival during developmental angiogenesis because it was necessary for export of collagen IV from EC and deposition in vascular basement membranes. In the absence of RASA1, dysregulated Ras mitogen-activated protein kinase (MAPK) signal transduction in EC resulted in impaired folding of collagen IV and its retention in the endoplasmic reticulum (ER) leading to EC death. Experiments were conducted during development of embodiments herein to demonstrate that chemical chaperones (e.g., 4-phenylbutyric acid) and small molecule inhibitors of MAPK and 2-oxoglutarate dependent collagen IV modifying enzymes rescued ER retention of collagen IV and EC apoptosis and resulted in normal developmental angiogenesis (Chen et al. Clin Invest. 2019; 129(9):3545-3561; incorporated by reference in its entirety).

Experiments conducted during development of embodiments herein indicate that lesion development in CM-AVM results from loss of an EPHB4-RASA1 negative-regulatory axis in EC in which EPHB4 serves to recruit RASA1 to the inner leaflet of the cell membrane allowing its juxtaposition to Ras-GTP (Refs. 12-13; incorporated by reference in their entireties).

Constitutive loss of Rasa1 in mice results in mid-gestation lethality at E10.5 as a consequence of impaired vascular development (Refs. 14-15; incorporated by reference in their entireties). Developmental angiogenesis, in which primitive vascular plexuses are remodeled into hierarchical vascular networks, is abnormal in these embryos. This is evident in the yolk sac for example where EC initially assemble into a vascular plexus but then fail to organize into a vascular network that supplies blood to the developing embryo. Some defects in vasculogenesis are also evident in RASA1-deficient embryos. In contrast to this, in adults, induced global disruption of Rasa1 does not result in any spontaneous BV abnormalities (Ref. 16; incorporated by reference in its entirety). Instead, mice develop LV hyperplasia and leakage that results in chylous ascites and chylothorax (Ref. 16; incorporated by reference in its entirety). RASA1 is essential for the development and maintenance of valves in collecting LV which accounts for LV leakage in the absence of RASA1 (Ref. 17; incorporated by reference in its entirety).

Experiments were conducted during development of embodiments herein to examine the influence of embryonic loss of RASA1 after E10.5. By E10.5, vasculogenesis, is largely complete and the remainder of vascular development is devoted to remodeling of the vascular network by angiogenic processes (Ref. 18; incorporated by reference in its entirety). RASA1 was found to be essential for continued vascular development during this period by promoting the survival of EC. The pro-survival function of RASA1 in EC during developmental angiogenesis is due to its requirement for the proper folding and export from EC and vascular smooth muscle cells (VSMC) of collagen IV, a major constituent of vascular basement membranes (BM). Experiments conducted during development of embodiments herein demonstrate that RASA1 is required for normal retinal angiogenesis in newborns and pathological angiogenesis in adults and due to its role in the export of collagen IV for deposition in BM.

Germline loss of function mutations of EPHB4 account for the majority of cases of CM-AVM not associated with RASA1 mutation. Similar to RASA1-deficient embryos, EPHB4-deficient embryos show defects in developmental angiogenesis, corroborating the view that RASA1 and EPHB4 act together in the same pathway to promote normal developmental angiogenesis and thus protect against the development of BV abnormalities in CM-AVM.

Multiple lines of evidence indicate that RASA1 and EPHB4 function in the same molecular pathway to promote normal developmental angiogenesis:

- In HUVEC, EPHB4, upon interaction Ephrin B2, inhibits Ras-MAPK signaling through a mechanism that is critically dependent upon RASA1 (Ref. 26A; incorporated by reference in its entirety);
- In zebrafish, knockdown of RASA1 or EPHB4 results in the identical phenotype of an enlarged caudal vascular deformity and disrupted caudal blood flow (Ref. 15A; incorporated by reference in its entirety);
- Constitutive EPHB4- and Ephrin B2-deficient embryos show the same defects in angiogenic remodeling of primitive vascular plexuses (e.g. in the head and yolk sac plexuses) as constitutive RASA1-deficient embryos and also die at E10.5 (Refs. 9A-10A; incorporated by reference in their entireties);
- Induced EC-specific disruption of Ephb4 at E13.5 in mouse embryos (using a Pdgfb-ert2cre driver (Ref. 74A; incorporated by reference in its entirety)) results in the same skin hemorrhagic phenotype associated with collagen IV accumulation in BEC at E18.5 as observed in induced RASA1-deficient mice (FIG. 38);
- Ephrin B2 stimulation of EPHB4 in EC and other cell types induces tyrosine phosphorylation of the EPHB4 intracellular domain leading to physical interaction with RASA1 Refs. 15A, 16A, and 25A; incorporated by reference in their entireties); and
- Specific interruption of the EPHB4-RASA1 physical interaction in zebrafish results in the same vascular defects as observed in EPHB4 and RASA1 knockdown zebrafish (Ref. 15A; incorporated by reference in its entirety).

Taken together, along with the RASA1 data described herein, these results indicate that loss of EPHB4 in BEC results in failed recruitment of RASA1 to membranes (an event that is dependent upon EPHB4-RASA1 physical association), leading to dysregulated Ras-MAPK signaling and increased abundance of 2OG-DO such as PLOD2 that ultimately inhibits collagen IV folding and export, thus accounting for failed developmental angiogenesis.

Accordingly, in some embodiments provided herein are methods of treating or preventing capillary malformation-arteriovenous malformation (CM-AVM) comprising administering to a subject a pharmaceutical composition that promotes proper folding, and therefore export of, collagen IV from endothelial cells. In some embodiments, methods and compositions herein prevent intracellular collagen IV accumulation (e.g., in endothelial cells). In some embodiments, methods and compositions herein prevent impaired export of collagen IV from ECs. In some embodiments, methods and compositions herein prevent collagen IV from being retained within the endoplasmic reticulum of cells (e.g., ECs). In some embodiments, methods and compositions herein promote proper collagen IV folding. In some embodiments, methods and compositions herein promote proper developmental angiogenesis. In some embodiments, methods and compositions herein prevent EC apoptosis. In some embodiments, methods and compositions treat or prevent the formation of blood vessel abnormalities, such as fast flow lesions (e.g., arteriovenous malformation, arteriovenous fistulas, etc.), lymphatic vessel (LV) abnormalities, etc. In some embodiments, methods and compositions herein treat or prevent lymphedema, chylothorax and/or chylous ascites. In some embodiments, compositions and methods herein treat or prevent pathways, symptoms, abnormalities, etc. that are present at birth and/or develop throughout childhood and/or adulthood.

In some embodiments, methods are provided for treating or preventing CM-AVM in a subject. In some embodiments, the subject is a carrier of a germline mutation (e.g., heterozygous for the mutation) that renders the subject susceptible to CM-AVM (e.g., effects of CM-AVM occur upon a somatic second-hit mutation in the subject (e.g., in endothelial cells). In some embodiments, the subject is a neonate, an infant, a juvenile, or an adult and is administered a pharmaceutical composition comprising an agent that promotes proper folding, and therefore export of, collagen IV to prevent development or advancement of CM-AVM or symptoms thereof.

In some embodiments, the subject suffers from CM-AVM and a pharmaceutical composition is administered to treat the condition or prevent the occurrence of symptoms of CM-AVM. In some embodiments, the subject is a neonate, an infant, a juvenile, or an adult and is administered a pharmaceutical composition comprising an agent that promotes proper folding, and therefore export of, collagen IV.

In some embodiments, compositions and methods are provided to prevent a subject from developing CM-AVM or symptoms thereof. In some embodiments, the subject is unborn and is a carrier (e.g., confirmed or possible carrier) of a germline mutation (e.g., heterozygous for the mutation) that renders the subject susceptible to CM-AVM. In some embodiments, the subject is unborn and the mother and/or father a carrier (e.g., confirmed or possible carrier) of a germline mutation (e.g., heterozygous for the mutation) that renders the subject susceptible to CM-AVM. In some embodiments, the subject, the mother, or the father carries a germline mutation of EPHB4 and/or RASA1 that renders susceptibility to CM-AVM. In some embodiments, the mother is administered a pharmaceutical composition comprising an agent that promotes proper folding, and therefore export of, collagen IV to prevent the subject from developing CM-AVM or symptoms thereof.

In some embodiments, compositions and methods are provided to prevent a subject from developing CM-AVM or symptoms thereof. In some embodiments, the subject is unborn and is a carrier (e.g., confirmed or possible carrier) of a germline mutation (e.g., heterozygous for the mutation) that renders the subject susceptible to CM-AVM. In some embodiments, the subject is unborn and the mother and/or father a carrier (e.g., confirmed or possible carrier) of a germline mutation (e.g., heterozygous for the mutation) that renders the subject susceptible to CM-AVM. In some embodiments, the subject, the mother, or the father carries a germline mutation of EPHB4 and/or RASA1 that renders susceptibility to CM-AVM. In some embodiments, the mother is administered a pharmaceutical composition comprising an agent that promotes proper folding, and therefore export of, collagen IV in the subject to prevent the subject from developing CM-AVM or symptoms thereof.

In some embodiments, a pharmaceutical composition comprises a chaperone molecule. In some embodiments, the chaperone molecule facilitates proper folding of collagen IV, thereby allowing export of collagen from the endoplasmic reticulum and from the endothelial cells. In some embodiments, the chaperone molecule is selected from 4-phenylbutyric acid (PBA), tauroursodeoxycholic acid (TUDCA), and ursodeoxycholic acid (UDCA). 4-phenylbutyric acid (PBA) and tauroursodeoxycholic acid (TUDCA) are approved by US Food and Drug Administration (FDA) for use in humans.

In some embodiments, a pharmaceutical composition comprises an inhibitor of a collagen IV modifying enzyme. In some embodiments, the inhibitor prevents over modification of collagen IV that leads to collagen IV accumulation in the ER and/or retaining of collagen IV within endothelial cells. In some embodiments, the collagen IV modifying enzyme comprises a 2-oxoglutarate dependent collagen IV modifying enzymes. In some embodiments, the inhibitor is selected from:

2,4-Pyridinedicarboxylic Acid (2,4-PDCA)

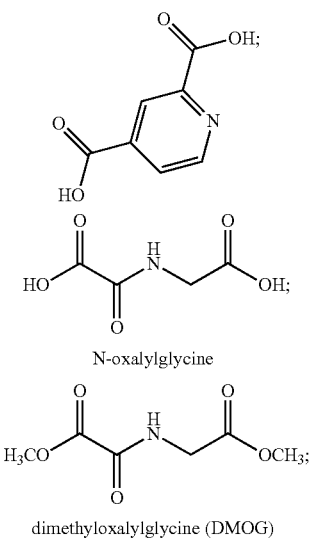

In some embodiments, a pharmaceutical composition comprises an inhibitor of an enzyme of a signaling pathway that is downstream from RASA1. In some embodiments, the pharmaceutical composition comprises an inhibitor of a mitogen-activated protein kinase (MAPK). In some embodiments, the inhibitor is a MEK inhibitor selected from:

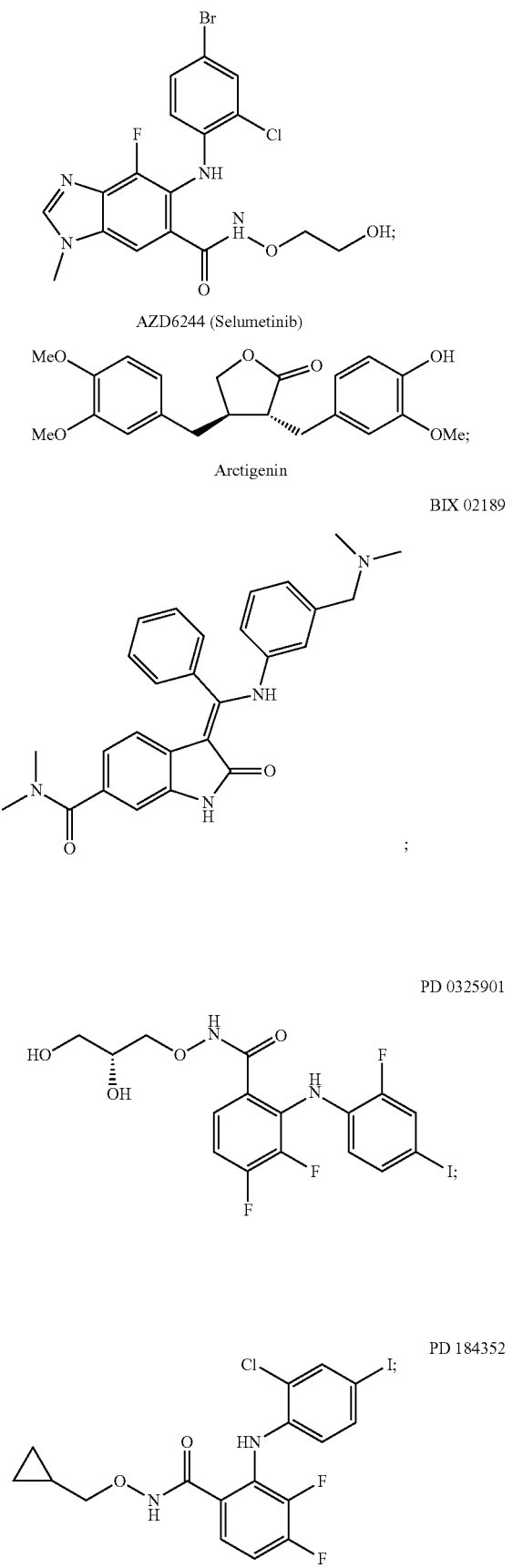

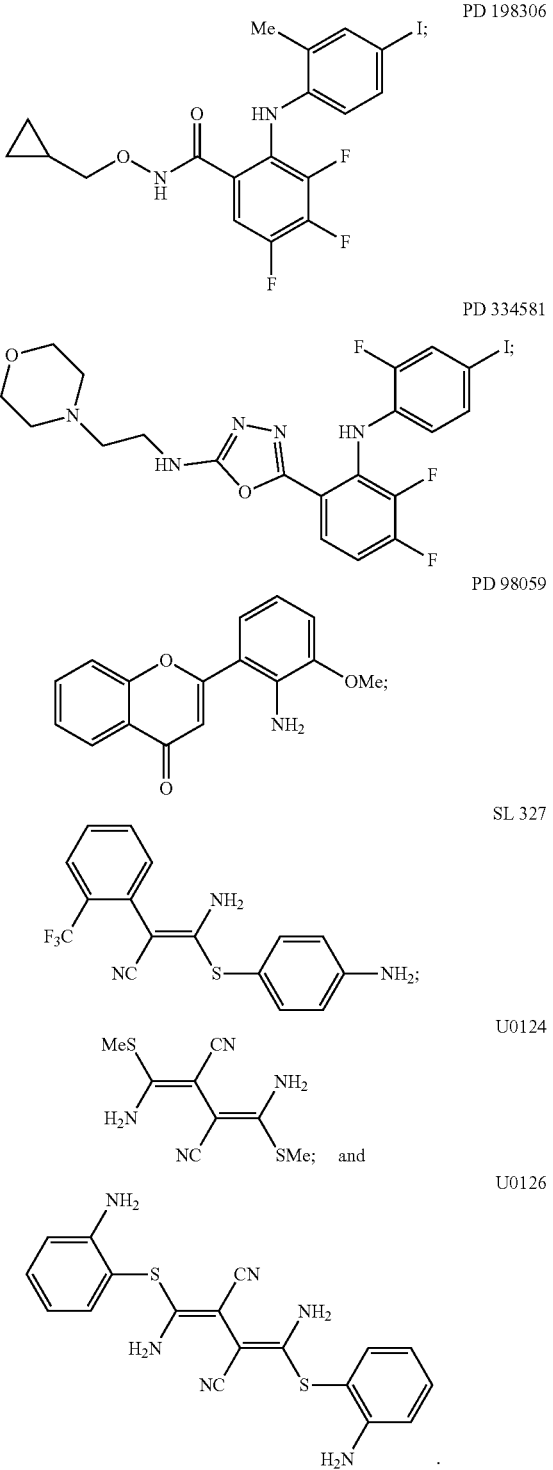

The pharmaceutical formulations described herein can be administered to a subject by multiple administration routes, including but not limited to, oral, parenteral (e.g., intravenous, intraosseous, subcutaneous, intramuscular), intranasal, buccal, topical, rectal, or transdermal administration routes. The pharmaceutical compositions described herein can be formulated into any suitable dosage form for the selected method of administration (e.g., intravenous, intraosseous, etc.). Dosing and administration regimes are tailored by the clinician, or others skilled in the pharmacological arts, based upon well-known pharmacological and therapeutic considerations including, but not limited to, the desired level of therapeutic effect, and the practical level of therapeutic effect obtainable. In certain embodiments, the compounds are administered to a subject at a dose of about 0.01 mg/kg to about 200 mg/kg, more preferably at about 0.1 mg/kg to about 100 mg/kg, even more preferably at about 0.5 mg/kg to about 50 mg/kg. When the compounds described herein are co-administered with another agent (e.g., as sensitizing agents), the effective amount may be less than when the agent is used alone. Dosing may be once per day or multiple times per day for one or more consecutive days.

In some embodiments, methods herein comprise testing a subject for a mutation that renders increased susceptibility (e.g., is causative of) to CM-AVM. In some embodiments, a biological sample from a subject is tested (or sent for testing). In some embodiments, the biological sample is saliva, blood, or a blood product. In some embodiments, a subject is tested for a mutation that renders increased susceptibility (e.g., is causative of) to CM-AVM during or prior to pregnancy (e.g., genetic carrier screening). In some embodiments, a subject is tested to determine the risk of offspring also being carriers of the mutation and/or to determine the risk of offspring developing CM-AVM. In some embodiments, a mutation that renders increased susceptibility (e.g., is causative of) to CM-AVM is tested for along with one or more other genetic conditions (e.g., cystic fibrosis; fragile X syndrome, sickle cell disease, Tay-Sachs disease, spinal muscular atrophy, etc.). In some embodiments, a subject is tested for a mutation that renders increased susceptibility (e.g., is causative of) to CM-AVM in utero. In some embodiments, a neonate or infant is tested for a mutation that renders increased susceptibility (e.g., is causative of) to CM-AVM. In some embodiments, if a subject tests positive for a mutation that renders increased susceptibility (e.g., is causative of) to CM-AVM, the subject (or the subject's mother) is administered a pharmaceutical composition to treat or prevent CM-AVM or symptoms thereof (e.g., in the subject, in the subject's offspring, etc.).

In some embodiments, a pharmaceutical composition described herein is co-administered with one or more supplements, vitamins, or other pharmaceuticals for the treatment/prevention of CM-AVM and/or treatment/prevention of other genetic and/or birth defects.

EXPERIMENTAL

Example 1

Materials and Methods

Developmental Angiogenesis.

Pregnant mice were given 3 i.p. injections of TM (Sigma; 0.05 mg/g body weight per injection, dissolved in corn oil) on consecutive days. The MEK inhibitor, AZD6244 (Selleckchem; 0.05 mg/g body weight per injection), the PI3K inhibitor, PX-866 (Cayman chemical; 0.015 mg/g body weight per injection), the chemical chaperone, 4PBA (Sigma; 0.25 mg/g body weight per injection), and the 2OG dependent oxygenase inhibitors, EDHB and 2,4PDCA (Sigma; 0.1 mg/g body weight per injection) were injected i.p. into mice at the same time as TM and the day following the last TM injection for AZD6244 and PX-866 or for all subsequent days of gestation until harvest for 4PBA, EDHB and 2,4PDCA. The same drug administration protocols were employed for embryos that had not been administered TM.

Embryos were fixed in 3.75% formaldehyde overnight and embedded in paraffin. Five micrometer sections were dehydrated and antigen retrieval was performed with a Diva de-cloaking kit (Biocare Medical). Sections were blocked in PBS/10% donkey serum/0.3% Triton-X100 and incubated overnight with the following primary antibodies in PBS in 10% donkey serum: rat anti-CD31 (SZ31, Dianova), rabbit anti-active caspase 3 (AF835, R&D Systems), goat anti-collagen IV (1340-01, Southern Biotech), goat anti-VE-Cadherin (AF1002, R&D systems), mouse anti-SMA (1A4/asm-1, Novus Biologicals), rabbit anti-laminin alpha 4 (PAC077Mu03, Cloud clone corp.), rabbit anti-TGN46 (ab16059, Abcam), rabbit anti-LMNA1 (ab125006, Abcam), rabbit anti-calnexin (ab22595, Abcam), rabbit anti-LYVE-1 (ab14917, Abcam), rabbit anti-calreticulin (D3E6, Cell Signaling Technology), rat anti-LAMP1 (1D4B, Thermo Scientific), rabbit anti-BIP (3177, Cell Signaling Technology), hamster anti-podoplanin (provided by Y. Hong, University of Southern California, Los Angeles, California, USA). Secondary antibodies used were species-specific anti-immunoglobulin donkey F(ab)$_2$ fragments coupled to Alexa Fluor 488, 594 or 647 (Jackson Immunoresearch) and were incubated with tissues in PBS for 2 hours. Sections were stained with Hoechst (Invitrogen) to identify nuclei before mounting and viewing on a BX60 upright fluorescence microscope (Nikon) or a Leica SP5 X confocal microscope (Leica Microsystems).

BEC Isolation.

Pregnant mice were given 3 i.p. injections of TM as above starting at E14.5 and embryos were harvested at E18.5. Skin was removed from embryos and single cell suspensions were prepared by digestion in collagenase IV (Sigma; 2 mg/ml) and DNase I (Sigma; 20 U/ml) for 1 h at 37° C. Cells were stained with CD45.2-FITC (104, BD Biosciences), CD31-BV510 (MEC13.3, BD Biosciences) and LYVE-1-Alexa Flour 700 (ALY7, Novus Biologicals) antibodies and CD45.2− CD31+ LYVE1− BEC were isolated by flow cytometry on a BD FACSAria II (BD Biosciences) and flash frozen. Purity of sorted BEC from all embryos was greater than 98%.

Cell Culture and siRNA Transfection

HUVEC from pooled donors (Lonza, CC-2519) were cultured in EBM™-2 Basal Medium (Lonza, CC-3156) supplemented with EGMm-2 SingleQuots™ Supplement Pack (Lonza, CC-4176). Cells were transfected with 50 nM RASA1 siRNA (5'-GCAGGCAGGGAAGU-CUGGCAGUUAU-3' (SEQ ID NO: 1), Invitrogen) using Lipofectamine RNAi MAX (Invitrogen) reagent according to the manufacturer's protocol. Stealth RNAi™ siRNA Negative Control Hi GC (Invitrogen) was used as control. Following transfection, HUVEC were recultured in the presence or absence of 2 mM 4PBA for 24 hours.

Real Time PCR.

Genomic DNA was prepared from sorted BEC or from embryo tails using a DNEasy Blood and Tissue kit (Qiagen) and relative Rasa1 gene abundance was determined by real time qPCR for Rasa1 exon 18 as described (Lubek et al. Immunol. 2015; 195(1):31-5; incorporated by reference in its entirety). Total RNA was isolated from HUVEC and sorted BEC using an RNeasy Mini Kit (Qiagen) and reverse transcribed using the iScript cDNA Synthesis Kit (Bio-Rad) according to the manufacturer's instructions. RASA1 gene expression in HUVEC and Plod2 and P3h1 gene expression in sorted BEC was assessed by real time PCR of cDNA using a SYBR Green mix (Applied Biosystems) and the following primers: RASA1, forward 5'-GGCCGG-GAAGAAGATCCAC-3'(SEQ ID NO: 2) and reverse 5'-GCAGACTTGACCAACTGTCATT-3'(SEQ ID NO: 3); human β-actin internal control, forward 5'-TGACCCAGAT-CATGTTTGAGA-3'(SEQ ID NO: 4) and reverse 5'-TACGGCCAGAGGCGTACAGC-3'(SEQ ID NO: 5); Plod2, forward 5'-GAGAGGCGGTGATGGAATGAA-3' (SEQ ID NO: 6), reverse 5'-ACTCGGTAAACAA-GATGACCAGA-3'(SEQ ID NO: 7); P3h1, forward 5'-AACAGAAGTCGGAACGCGAAA-3'(SEQ ID NO: 8), reverse 5'-TCCACGAGGGTCTCGATCTC-3'(SEQ ID NO: 9); mouse f-actin internal control, forward 5'-CGGTTCC-GATGCCCTGAGGCTCTT-3'(SEQ ID NO: 10) and reverse 5'-TCCACGAGGGTCTCGATCTC-3'(SEQ ID NO: 11).

Tissue Culture Immunofluorescence

HUVECs were fixed with 4% paraformaldehyde in PBS for 30 minutes at room temperature washed in PBS, permeabilized with 0.2% Triton X-100, and blocked with 10% donkey serum for 1 hour. Cells were incubated with antibodies against collagen IV (1340-01, SouthernBiotech) and calnexin (PA5-34754, Thermo Fisher) overnight, followed by Alexa Fluor®488 or 594 conjugated secondary antibodies (Jackson ImmunoResearch) for 4 hours. Cells were stained with Hoechst to identify nuclei before mounting and viewing on a Leica SP5 X confocal microscope.

BEC Protein Extraction and Digestion.

Sorted BEC were lysed in RIPA buffer (2% SDS, 150 mM NaCl, 50 mM Tris pH8, 1× Roche Complete) and lysates from three individual embryos of the same genotype (determined by Cre PCR of tail genomic DNA), representing approximately 3×10$^5$ BEC total, were pooled. Gene disruption in Cre+ embryos exceeded 90% in all cases as determined by Rasa1 exon 18 qPCR of tail genomic DNA. The protein concentration of the extract was determined by Qubit fluorometry. Five micrograns of each sample was processed by SDS-PAGE using a 10% Bis-Tris NuPage Mini-gel with the MES buffer system (Invitrogen). The gel was run 5 cm, each gel lane was excised into twenty equally sized bands. Gel bands were processed by in-gel digestion with trypsin using a ProGest robot (DigiLab) with the following protocol: (a) washed with 25 mM ammonium bicarbonate followed by acetonitrile; (b) reduced with 10 mM dithiothreitol at 60° C. followed by alkylation with 50 mM iodoacetamide at RT; (c) digested with sequencing grade trypsin (Promega) at 37° C. for 4 h and; (d) quenched with formic acid and analyzed without further processing.

Mass Spectrometry.

Half of each digest was analyzed by nano LC-MS/MS with a Waters NanoAcquity HPLC system interfaced to a ThermoFisher Fusion Lumos mass spectrometer. Peptides were loaded on a trapping column and eluted over a 75 μm analytical column at 350 nL/min using a 0.5 h reverse phase gradient; both columns were packed with Luna C18 resin (Phenomenex). The mass spectrometer was operated in data-dependent mode with the Orbitrap operating at 60,000 FWHM and 15,000 FWHM for MS and MS/MS respectively. The instrument was run with a 3 s cycle for MS and MS/MS with Advanced Peak Determination enabled. A total of 10 h of instrument time/sample was employed.

Proteomic Data Processing and Analysis.

Data were searched using a local copy of Mascot with the following parameters: Enzyme, Trypsin/P; Database: SwissProt Mouse (concatenated forward and reverse plus common contaminants); Fixed modifications: Carbamidomethyl (C); Variable modifications: Oxidation (M), Acetyl (N-term), Pyro-Glu (N-term Q), Deamidation (N,Q); Mass values: Monoisotopic; Peptide mass tolerance: 10 ppm; Fragment mass tolerance: 0.02 Da; Maximum missed cleavages: 2. Mascot data files were subsequently parsed into Scaffold (Proteome Software Inc.) and analyzed with protein and peptide thresholds set at 1% FDR, and minimum number of peptides to 2. For quantitation by spectral counting, the complete list of proteins displaying the total spectrum count was exported to excel, the Normalized Spectrum Abundance Factor (NSAF) calculated according to literature and subsequently the fold change was calculated from the NSAF values (Zybailov B et al. J Proteome Res. 2006; 5(9):2339-47; incorporated by reference in its entirety). Fold changes from >2 (for up-regulation) or <0.5 for down-regulation were considered significant.

Retinal Angiogenesis.

Newborn pups were injected with TM (0.05 mg/g body weight per injection) on three consecutive days from P1-P3 and retinas were harvested at P4 or P6. Alternatively, pups were administered TM from P3-P5 and retinas were harvested at P10. Retinas were fixed in 4% paraformaldehyde for 2 h, were blocked in PBS/10% donkey serum and incubated overnight with IB4-FITC (Sigma) and goat anti-collagen IV in PBS/10% donkey serum. Retinas were subsequently incubated for 2 h with a secondary anti-goat donkey $F(ab)_2$ coupled to Alexa 594 in PBS to detect collagen. Whole mounts were viewed on a BX60 upright fluorescence microscope. The percentage EC coverage and number of empty sleeves per field was determined in a random 50 μm×50 μm area behind the angiogenic front in a region between an artery and a vein. The number of endothelial branch points was determined for the same vein. The number of filopodia at the angiogenic front was determined for a random 200 μm×200 μm region.

Tumor Angiogenesis.

TM was administered to mice at 2 months of age (female mice for ID8 experiments and mice of either sex for B16 experiments). After 1 week, mice were injected s.c. in the flank with 1×10⁶ ID8 cells or 0.75×10⁶ B16F10 cells (provided by Weiping Zou, Michigan Medicine, Ann Arbor Michigan) suspended in 100 μl matrigel (Corning). In B16 experiments, 4PBA was administered to some mice at the same time as tumor and for each day thereafter (0.4 mg/g body weight per injection). ID8 and B16 tumors were harvested 6 weeks or 13 days later respectively and tumor weight and volume was determined as described (Kozak et al. Proc Natl Acad Sci USA. 2010; 107(46):19997-20002; incorporated by reference in its entirety). Tumors were fixed in 4% paraformaldehyde overnight and 5 μm sections were stained with Hoechst and antibodies against CD31, activated caspase 3 and collagen IV as above. Sections were viewed on a BX60 upright fluorescence microscope or a Leica SP5 X confocal microscope. BV density was assessed within a random 800 μm×800 μm region.

CM-AVM1 Tissue Samples and Staining.

CM-AVM1 patients examined in these studies have been reported previously (Lapinski et al. Eur J Med Genet. 2018; 61(1):11-6; Macmurdo et al. Am J Med Genet A. 2016; 170(6):1450-4; incorporated by reference in their entireties). Skin punch biopsy specimens from lesional areas of patients and normal controls were fixed in 3.75% formaldehyde overnight and embedded in paraffin. Five-micrometer sections were processed as above and stained with Hoechst and antibodies against CD31 (clone EP3095, LSBio) and collagen IV followed by species-specific labeled secondary antibodies (Jackson Immunoresearch). Sections were viewed on a BX60 upright fluorescence microscope.

Results

Global Disruption of Rasa1 During Developmental Angiogenesis Results in Hemorrhage, Edema and EC Apoptosis.

Figure 13:
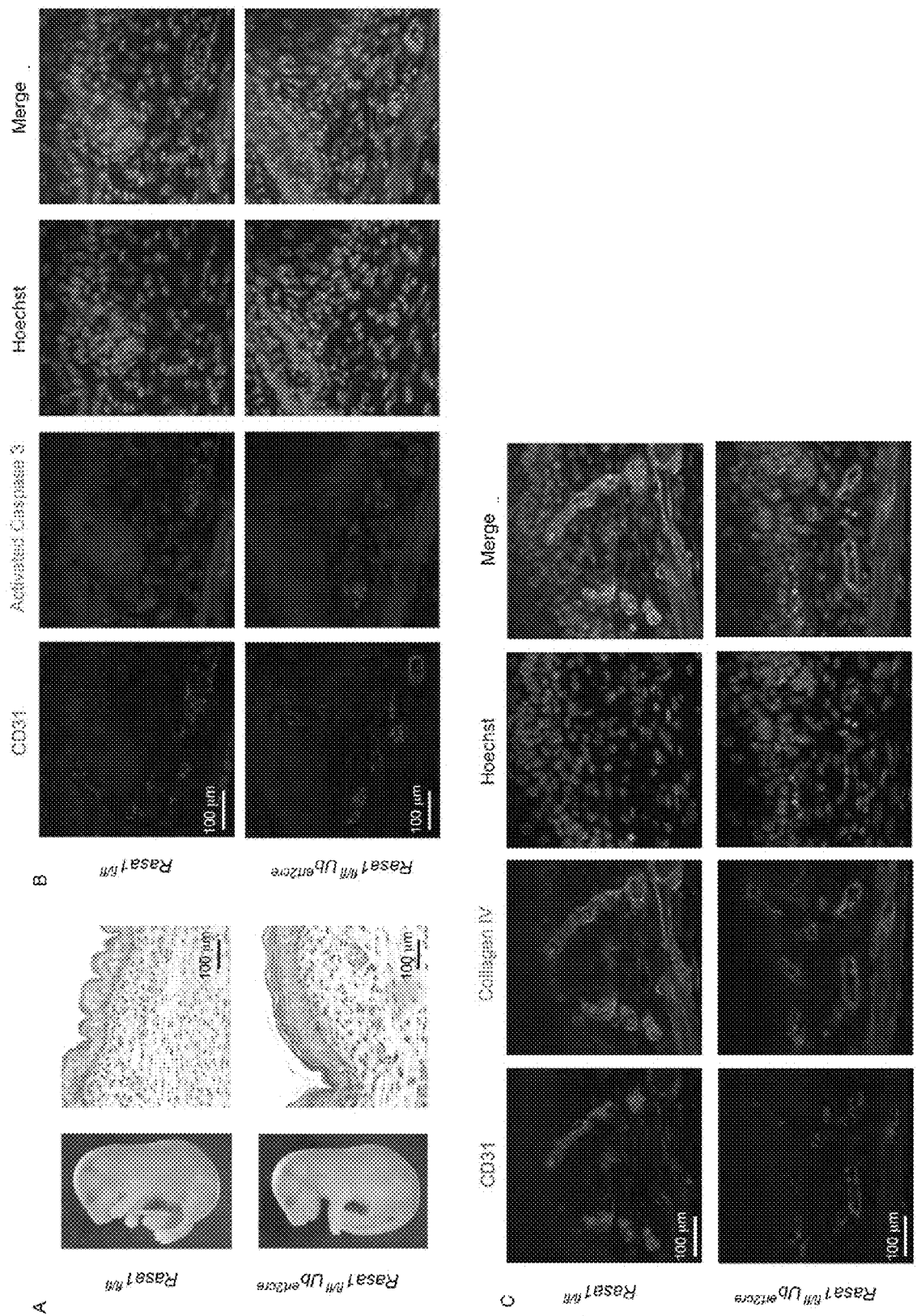
FIG. 13, panels A-C. Normal blood vascular development in $Rasa1^{fl/fl}$ and $Rasa1^{fl/fl}\ Ub^{ert2cre}$ embryos in the absence of TM. Littermate $Rasa1^{fl/fl}$ and $Rasa1^{fl/fl}\ Ub^{ert2cre}$ embryos were harvested at E18.5. (A) Absence of gross embryonic vascular phenotypes (left) and normal vascular development as revealed by H&E staining of skin sections (right) (n=2 embryos each genotype). (B and C) Skin sections were stained with Hoechst and antibodies against CD31, activated caspase 3, and collagen IV. Note absence of collagen IV accumulation and apoptosis in BEC of both types of embryo.

To examine the influence of global RASA1 loss upon developmental angiogenesis, tamoxifen (TM) was administered to pregnant Rasa1$^{fl/fl}$ mice carrying Rasa1$^{fl/fl}$ and Rasa1$^{fl/fl}$ Ub$^{ert2cre}$ embryos at E12.5-E14.5. Administration of TM to Rasa1$^{fl/fl}$ Ub$^{ert2cre}$ embryos at this time resulted in visible cutaneous hemorrhage and an edematous appearance at E18.5-E19.5 (Table 1 and FIG. 1A). Histological analysis of embryos revealed extravasated erythrocytes in skin associated with damaged cutaneous BV and a vastly reduced number of cutaneous LV (FIG. 1A). The same phenotypes were not observed in Rasa1$^{fl/fl}$ Ub$^{ert2cre}$ embryos that were not administered TM (FIG. 13A). Administration of TM to Rasa1$^{fl/fl}$ Ub$^{ert2cre}$ embryos at E15.5 and later also did not result in hemorrhage or other spontaneous embryonic BV abnormalities, although does result in failed LV valve development (Ref. 17; incorporated by reference in its entirety).

TABLE 1

Embryonic disruption of Rasa1

| Littermate group | Rasa1 | Ert2Cre driver | TM day | Drug[a] | Harvest | Embryonic vascular phenotypes | Percentage embryos with phenotype (affected/total) |
|---|---|---|---|---|---|---|---|
| 1 | fl/fl | Ub | E12.5 | None | E18.5 | Hemorrhage/lymphedema EC apoptosis[c] | 100 (11/11) |
|   | fl/fl | None | E12.5 | None | E18.5 | None | 0 (0/5) |
| 2 | fl/fl | Ub | E13.5 | None | E18.5 | Hemorrhage/lymphedema EC apoptosis[c] | 91 (10/11) |
|   | fl/fl | None | E13.5 | None | E18.5 | None | 0 (0/8) |
| 3 | fl/fl | Ub | E13.5 | 4PBA[a] | E18.5 | None | 0 (0/7) |
|   | fl/fl | None | E13.5 | 4PBA[a] | E18.5 | None | 0 (0/5) |
| 4 | fl/fl | Ub | E13.5 | EDHB[a] | E18.5 | None | 0 (0/5) |
|   | fl/fl | None | E13.5 | EDHB[a] | E18.5 | None | 0 (0/7) |
| 5 | fl/fl | Ub | E13.5 | 2,4PDCA[a] | E18.5 | None | 0 (0/3) |
|   | fl/fl | None | E13.5 | 2,4PDCA[a] | E18.5 | None | 0 (0/6) |
| 6 | fl/fl | Ub | E13.5 | AZD6244[b] | E18.5 | None | 0 (0/7) |
|   | fl/fl | None | E13.5 | AZD6244[a] | E18.5 | None | 0 (0/8) |
| 7 | fl/fl | Ub | E14.5 | None | E19.5 | Hemorrhage/lymphedema EC apoptosis[c] | 100 (1/1) |
|   | fl/fl | None | E14.5 | None | E19.5 | None | 0 (0/2) |

TABLE 1-continued

Embryonic disruption of Rasa1

| Littermate group | Rasa1 | Ert2Cre driver | TM day | Drug[a] | Harvest | Embryonic vascular phenotypes | Percentage embryos with phenotype (affected/total) |
|---|---|---|---|---|---|---|---|
| 8 | fl/fl | Ub | E15.5 | None | E17.5 | Valve LEC apoptosis Impaired lymphatic vessel valve development[c] | 100 (6/6) Ref. 17 |
|  | fl/fl | None | E15.5 | None | E17.5 | None | Ref. 17 |
| 9 | fl/fl | Cdh5 | E13.5 | None | E18.5 | Hemorrhage (local)[c] | 83 (10/12) |
|  | fl/fl | None | E13.5 | None | E18.5 | None | 0 (0/6) |
| 10 | fl/fl | Cdh5 | E13.5 | None | E19.5 | Hemorrhage/lymphedema EC apoptosis[c] | 100 (7/7) |
|  | fl/fl | None | E13.5 | None | E19.5 | None | 0 (0/5) |
| 11 | fl/R780Q | Ub | E12.5 | None | E18.5 | Hemorrhage/lymphedema EC apoptosis[c] | 86 (6/7) |
|  | fl/R780Q | None | E12.5 | None | E18.5 | None | 0 (0/6) |

Figure 14:
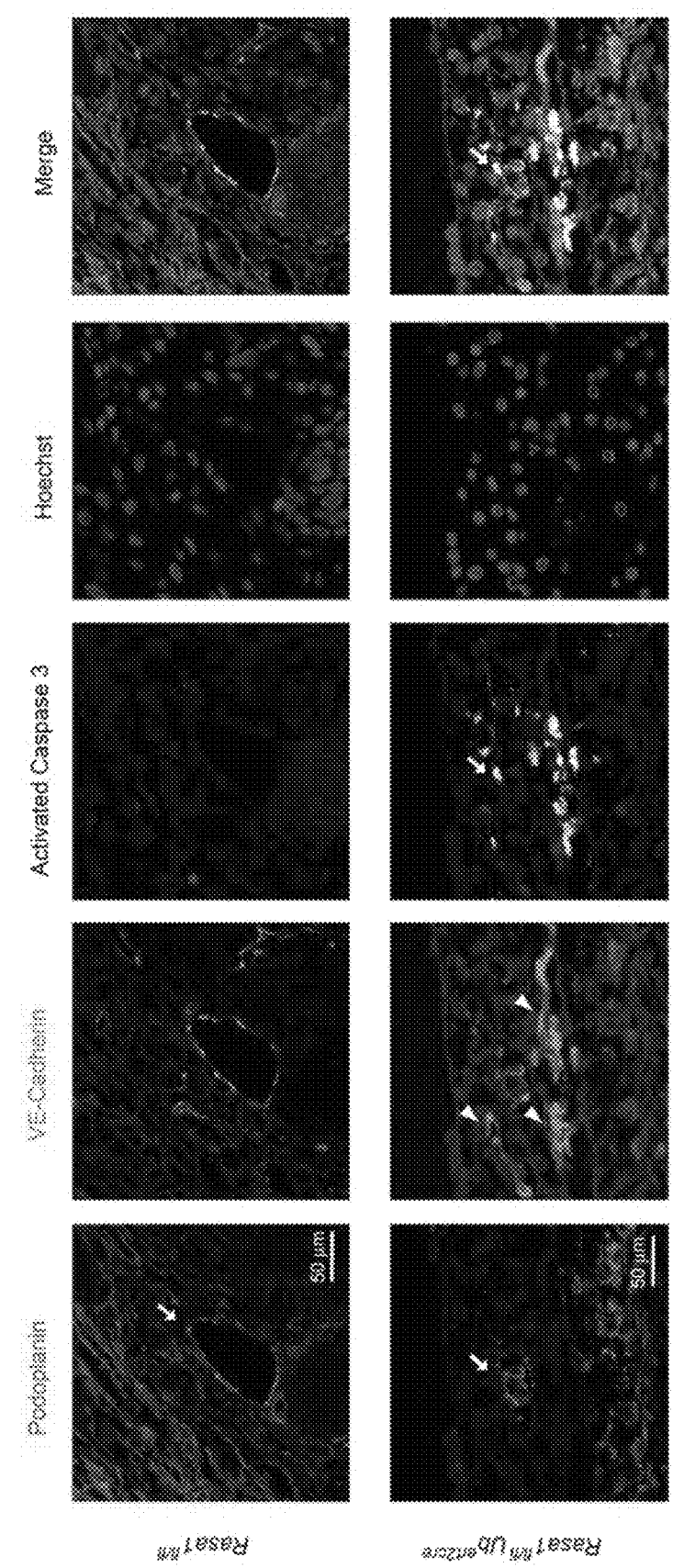
FIG. 14. LEC apoptosis following disruption of Rasa1 during developmental angiogenesis. TM was administered to littermate $Rasa1^{fl/fl}$ and $Rasa1^{fl/fl}\ Ub^{ert2cre}$ embryos at E14.5 and embryos were harvested at E19.5. Skin sections from embryos were stained with Hoechst and antibodies against podoplanin, VE-Cadherin and activated caspase 3. LV (podoplanin+, VE-Cadherin+) and BV (podoplanin−, VE-Cadherin+) are indicated by arrows and arrowheads respectively. Note apoptotic LEC as well as BEC in $Rasa1^{fl/fl}\ Ub^{ert2cre}$ embryos.

Failed LV valve development in embryos administered TM at E15.5 is explained by apoptosis of LV endothelial cells (LEC) in developing LV valve leaflets. Experiments were conducted during development of embodiments herein to determine if disruption of Rasa1 in Rasa1$^{fl/fl}$ Ub$^{ert2cre}$ embryos before E15.5 induced apoptosis of BV endothelial cells (BEC) and LEC in BV and LV walls. As revealed by immunostaining for activated caspase 3, apoptotic BEC were identified in the vast majority of cutaneous BV of Rasa1$^{fl/fl}$ Ub$^{ert2cre}$ embryos that were administered TM between E12.5 and E14.5 as determined at E18.5-E19.5 (FIG. 1B) but not in Rasa1$^{fl/fl}$ Ub$^{ert2cre}$ embryos that did not receive TM (FIG. 13B). Likewise, within the few LV that could be identified in these embryos at these times, apoptotic LEC were frequently observed (FIG. 14). These experiments indicate that apoptosis of BEC and LEC contributes to hemorrhage and edema in Rasa1$^{fl/fl}$ Ub$^{ert2cre}$ embryos administered TM between E12.5 and E14.5.

Disruption of Rasa1 Specifically within EC is Sufficient for EC Apoptosis During Developmental Angiogenesis.

Figure 15:
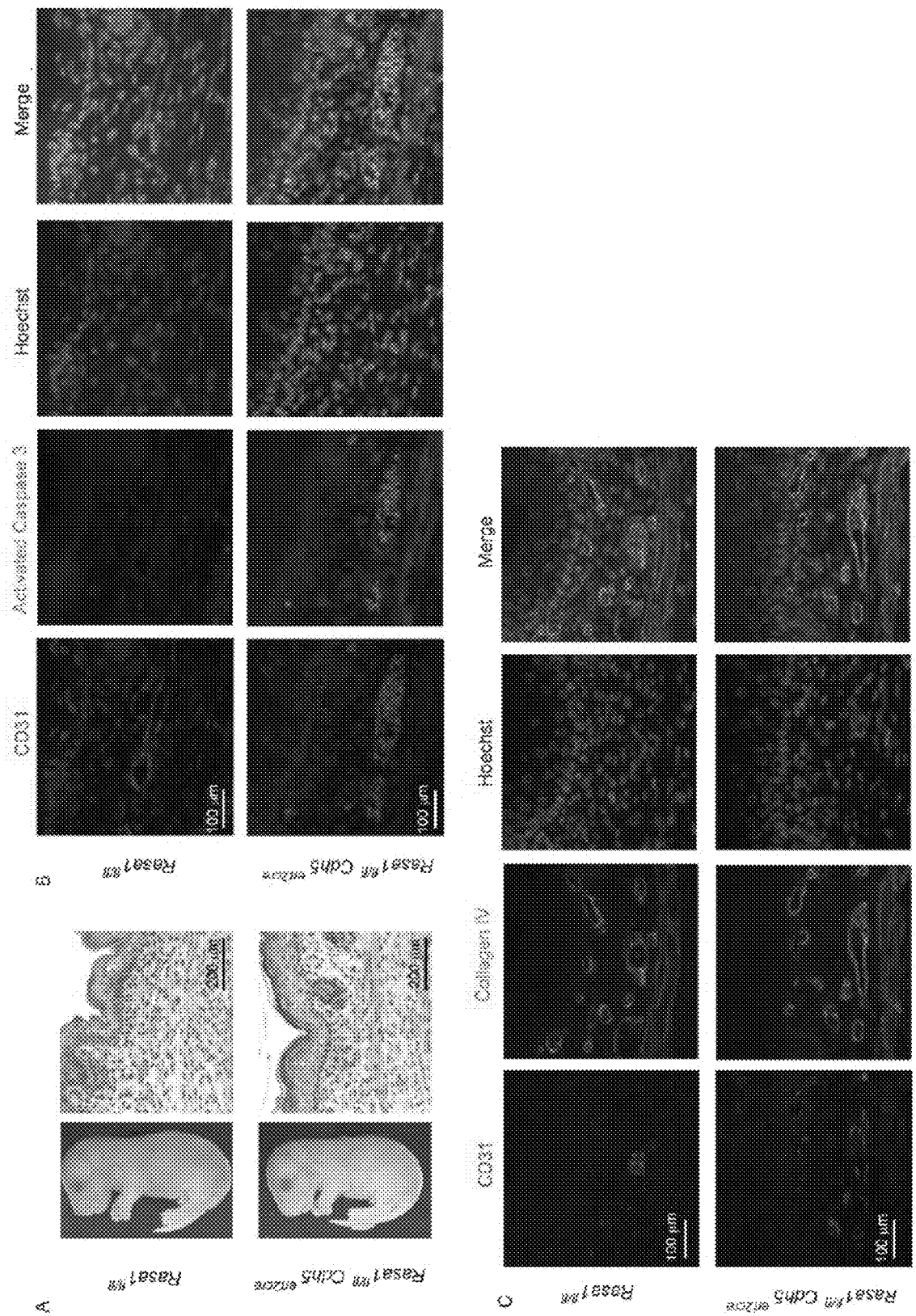
FIG. 15, panels A-C. Normal blood vascular development in $Rasa1^{fl/fl}$ and $Rasa1^{fl/fl}\ Cdh5^{ert2cre}$ embryos in the absence of TM. Littermate $Rasa1^{fl/fl}$ and $Rasa1^{fl/fl}\ Cdh5^{ert2cre}$ embryos were harvested at E18.5. (A) Absence of gross embryonic vascular phenotypes (left) and normal vascular development as revealed by H&E staining of skin sections (right) (n=3 embryos each genotype). (B and C) Skin sections were stained with Hoechst and antibodies against CD31, activated caspase 3, and collagen IV. Note absence of collagen IV accumulation and apoptosis in BEC of both types of embryo.
Figure 16:
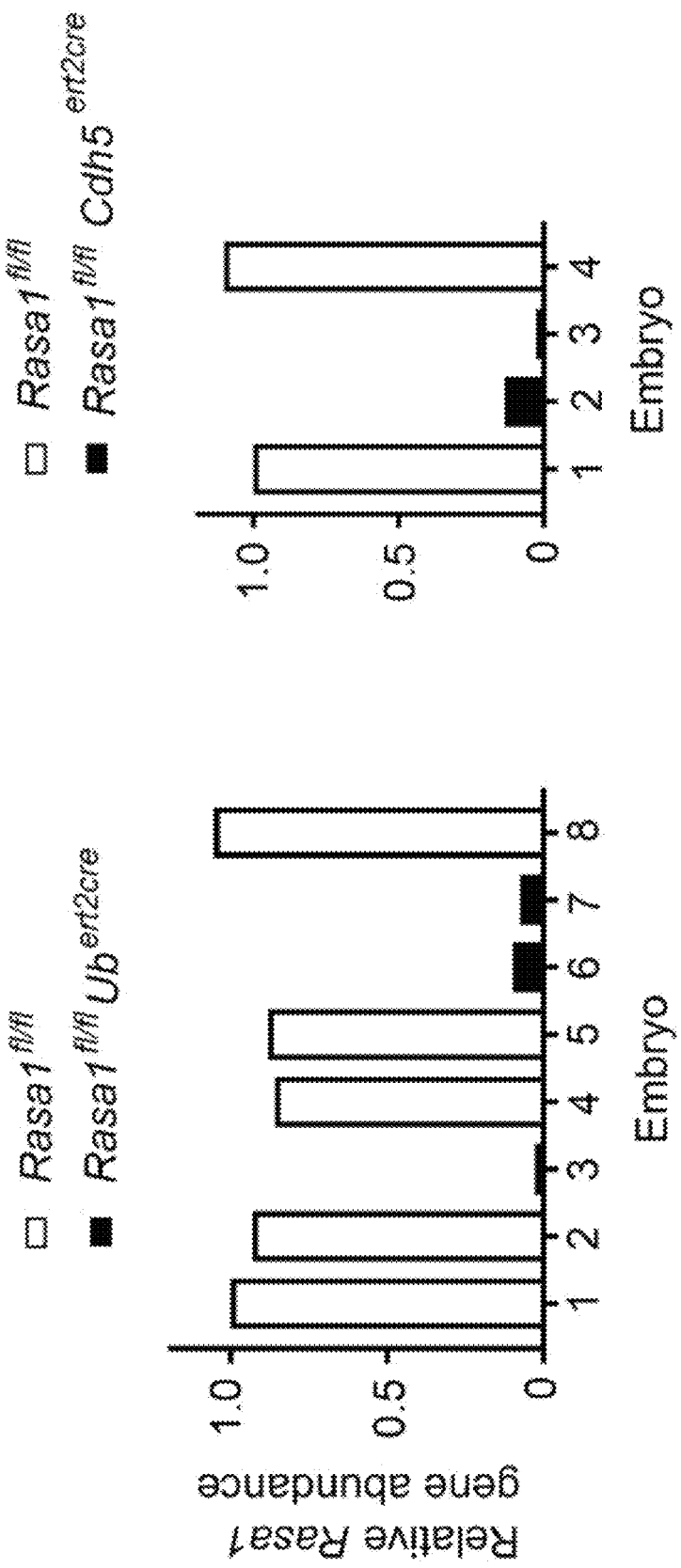
FIG. 16. Rasa1 gene disruption efficiency in BEC. TM was administered to littermate $Rasa1^{fl/fl}$ and $Rasa1^{fl/fl}\ Ub^{ert2cre}$ and littermate $Rasa1^{fl/fl}$ and $Rasa1^{fl/fl}\ Cdh5^{ert2cre}$ embryos at E14.5 and embryos were harvested at E18.5. Skin BEC (CD31+CD45− LYVE1−) were purified by flow cytometry and analyzed for Rasa1 gene abundance by real time qPCR. Shown are results from different litters. Results are normalized to the first Cre− embryo in each litter.

To determine if the vascular abnormalities observed in Rasa1$^{fl/fl}$ Ub$^{ert2cre}$ embryos treated with TM between E12.5 and E14.5 were a consequence of loss of RASA1 within EC themselves, similar experiments were performed using an EC-specific Cdh5$^{ert2cre}$ driver (Ref. 19; incorporated by reference in its entirety). Pregnant Rasa1$^{fl/fl}$ mice carrying Rasa1$^{fl/fl}$ and Rasa1$^{fl/fl}$ Cdh5$^{ert2cre}$ embryos were administered TM at E13.5 and harvested at E18.5 or E19.5, i.e. 5 or 6 days later respectively. At E18.5, cutaneous hemorrhage was observed in TM-treated but not untreated Rasa1$^{fl/fl}$ Cdh5$^{ert2cre}$ embryos, which was confirmed by histological analysis (Table 1, FIGS. 2A and 15A). However, hemorrhage was more localized in Rasa1$^{fl/fl}$ Cdh5$^{ert2cre}$ embryos than in Rasa1$^{fl/fl}$ Ub$^{ert2cre}$ embryos at this time (compare FIG. 1A). In contrast, at E19.5, extensive hemorrhage and edema was observed in Rasa1$^{fl/fl}$ Cdh5$^{ert2cre}$ embryos (Table 1 and FIG. 2B). Furthermore, apoptotic BEC were readily observed in BV of Rasa1$^{fl/fl}$ Cdh5$^{ert2cre}$ embryos at E19.5 (FIG. 2C) but not E18.5. As shown by real time qPCR analysis of sorted skin BEC from TM-treated Rasa1$^{fl/fl}$ Ub$^{ert2cre}$ and Rasa1$^{fl/fl}$ Cdh5$^{ert2cre}$ embryos, deletion efficiency of the Rasa1 gene in BEC was comparable using the two different types of ertcre driver at E18.5 (FIG. 16). Therefore, differences in the time of onset of phenotypes cannot be explained by differences in Rasa1 gene deletion efficiency.

Disruption of Rasa1 within EC during developmental angiogenesis is sufficient for the development of vascular abnormalities, including EC apoptosis, albeit that full manifestation of vascular phenotypes is slightly delayed.

Accumulation of Collagen IV within BEC of Induced EC-Specific RASA1-Deficient Embryos.

Figure 17:
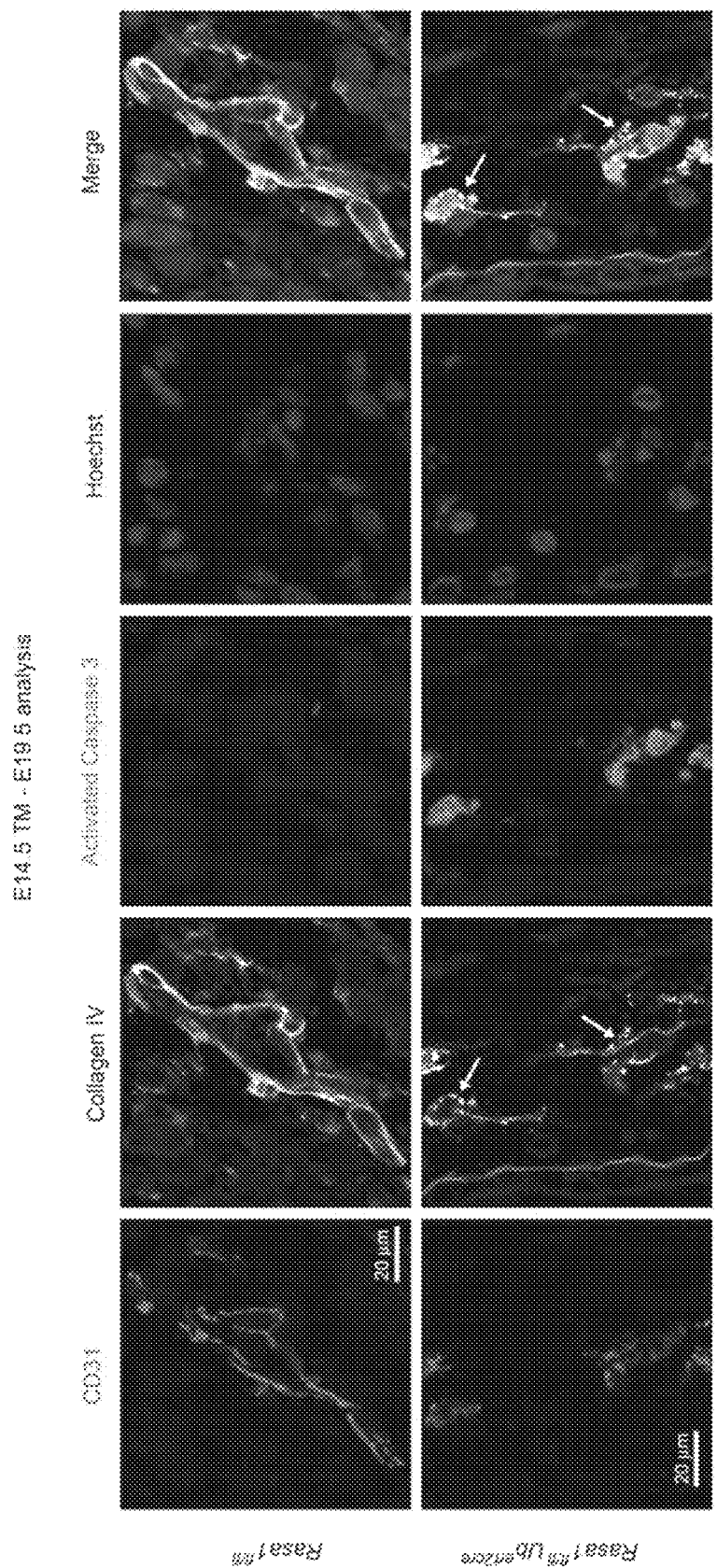
FIG. 17. Accumulation of collagen IV within BEC and BEC apoptosis following induced disruption of Rasa1 during developmental angiogenesis. Skin sections from E19.5 littermate $Rasa1^{fl/fl}$ and $Rasa1^{fl/fl}\ Ub^{ert2cre}$ embryos administered TM at E14.5 were stained with Hoechst and antibodies against CD31, collagen IV and activated caspase. Collagen IV deposition in BV BM was discontinuous in $Rasa1^{fl/fl}\ Ub^{ert2cre}$ embryos and collagen IV was frequently observed in discrete punctae within BEC (arrows). BEC with intracellular accumulation of collagen IV were frequently apoptotic.

Loss of RASA1 during developmental angiogenesis results in hemorrhage. Vascular BM are composed predominantly of collagen IV and laminins that are produced mostly by EC but also VSMC during developmental angiogenesis (Ref. 20; incorporated by reference in its entirety). Apoptotic death of BEC would be expected to result in reduced deposition of BM that would result in reduced barrier function that could contribute to hemorrhage. Skin sections from Rasa1$^{fl/fl}$ and Rasa1$^{fl/fl}$ Ub$^{ert2cre}$ embryos that had been administered TM between E12.5 and E14.5 (or not) were stained with antibodies against collagen IV (FIGS. 13C and 17). At E18.5-19.5, BV BM in TM-treated Rasa1$^{fl/fl}$ Ub$^{ert2cre}$ embryos stained less intensely with collagen IV antibodies than BV BM in Rasa1 littermates (FIG. 17). In addition, in TM-treated Rasa1$^{fl/fl}$ Ub$^{ert2cre}$ embryos, the collagen IV staining of BM was frequently discontinuous. BEC in TM-treated Rasa1$^{fl/fl}$ Ub$^{ert2cre}$ embryos frequently contained intracellular accumulations of collagen IV in discrete foci (FIG. 17). These abnormalities of collagen IV distribution were not observed in the absence of TM treatment (FIG. 13C).

Figure 3:
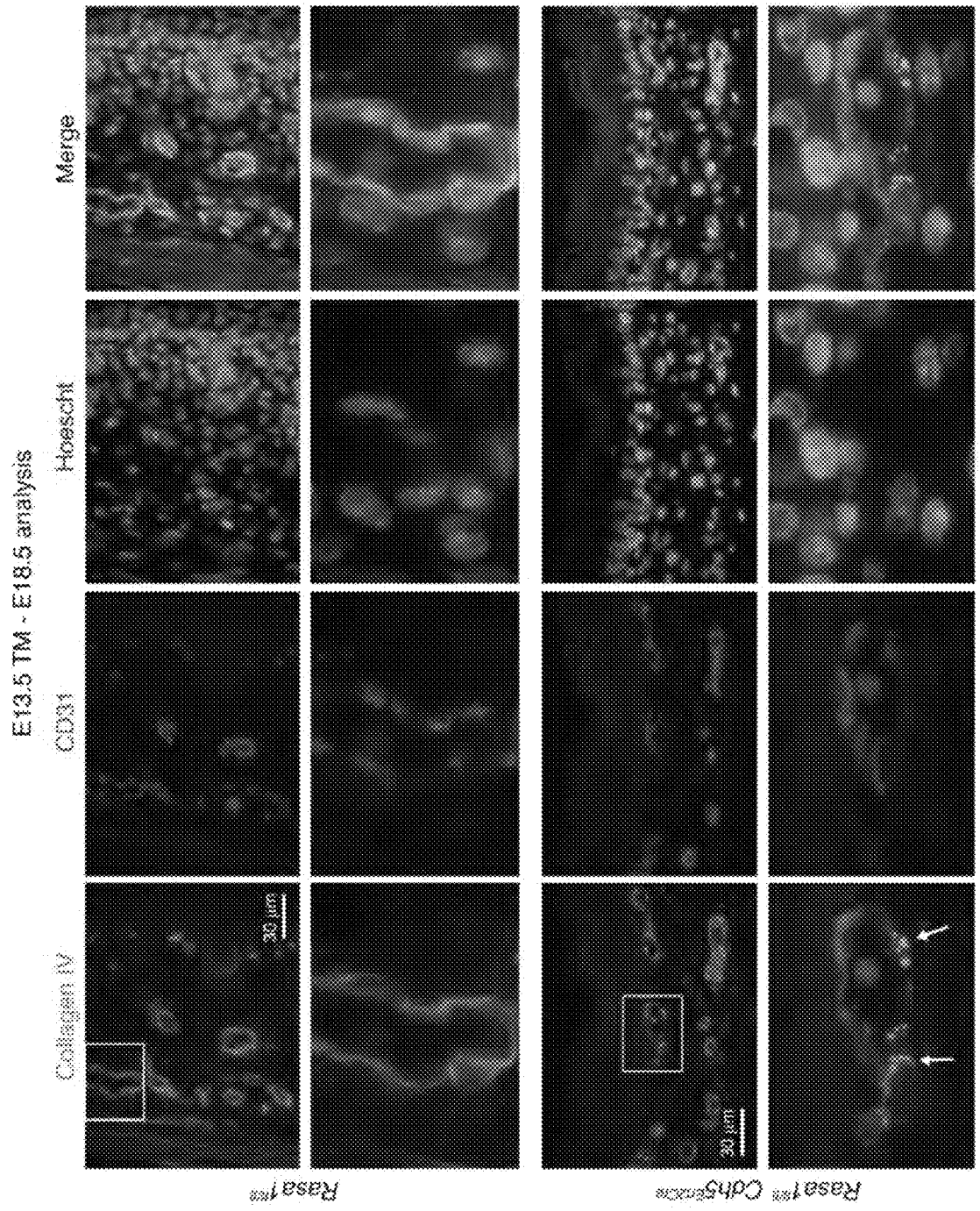
FIG. 3. EC-specific disruption of Rasa1 during developmental angiogenesis results in retention of collagen IV within BEC. TM was administered to littermate $Rasa1^{fl/fl}$ and $Rasa1^{fl/fl}$ $Cdh5^{ert2cre}$ embryos at E13.5. Embryos were harvested at E18.5 and skin sections were stained with Hoechst and antibodies against CD31 and collagen IV. Lower power images are shown in top rows. Higher power images of boxed areas are shown below, Note accumulation of collagen IV within BEC of $Rasa1^{fl/fl}$ $Cdh5^{ert2cre}$ embryos (arrows).
Figure 18:
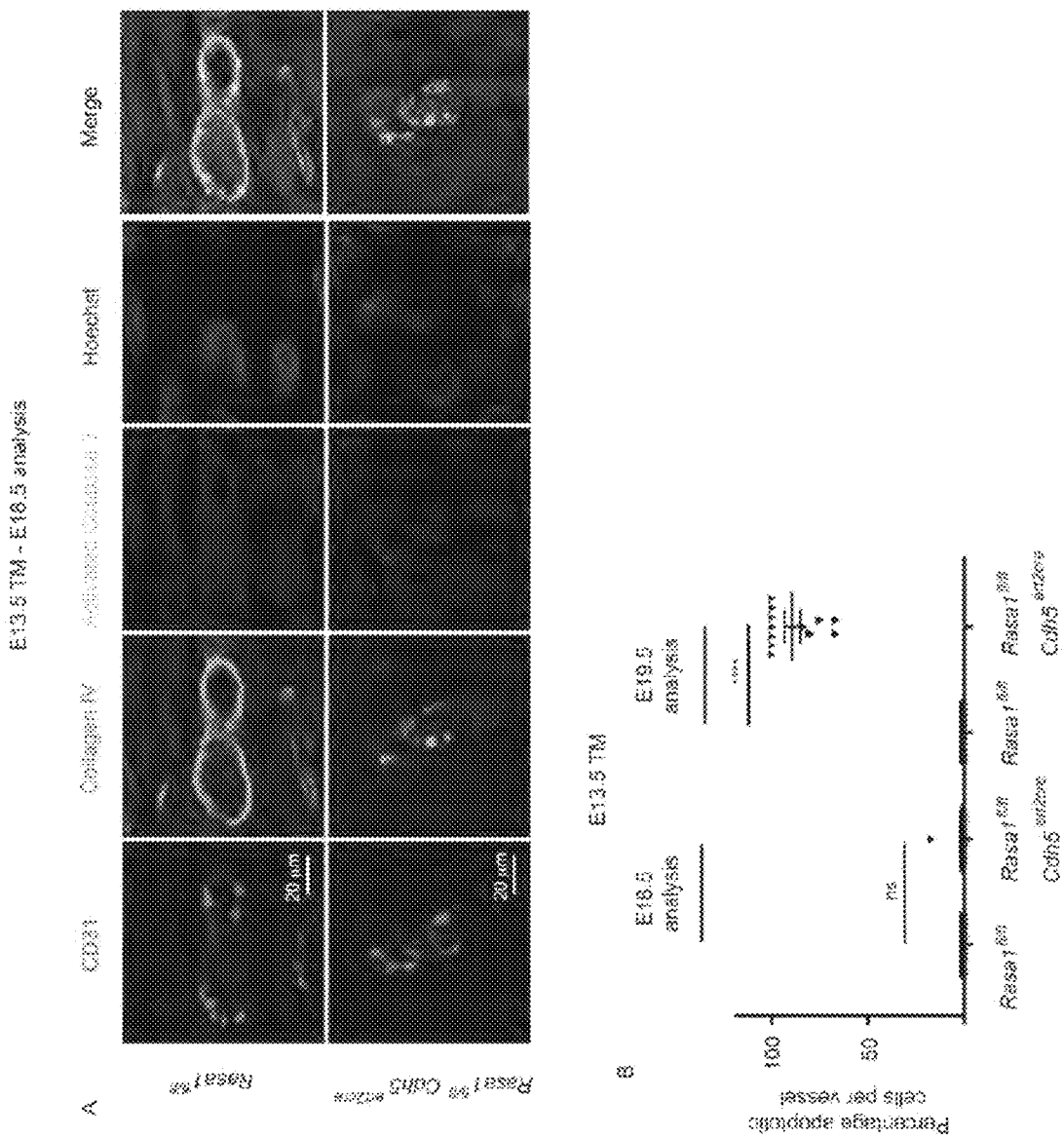
FIG. 18, panels A-B. Collagen accumulation prior to BEC apoptosis in EC-specific RASA1-deficient embryos. (A) TM was administered to littermate $Rasa1^{fl/fl}$ and $Rasa1^{fl/fl}\ Cdh5^{ert2cre}$ embryos at E13.5. Embryos were harvested at E18.5 and skin sections were stained with Hoechst, and antibodies against CD31, activated caspase 3, and collagen IV. Note collagen IV accumulation in BEC in the absence of BEC apoptosis. (B) Quantitation of BEC apoptosis in skin BV of $Rasa1^{fl/fl}$ and $Rasa1^{fl/fl}\ Cdh5^{ert2cre}$ embryos administered TM at E13.5 and harvested at E18.5 or E19.5. Shown is the mean+/−1 SEM of the percentage of activated caspase 3+ BEC per BV (n=15 BV at E18.5 and n=12 BV at E19.5). *P<0.0001; ns, not significant, Student's 2-sample t-test.
Figure 19:
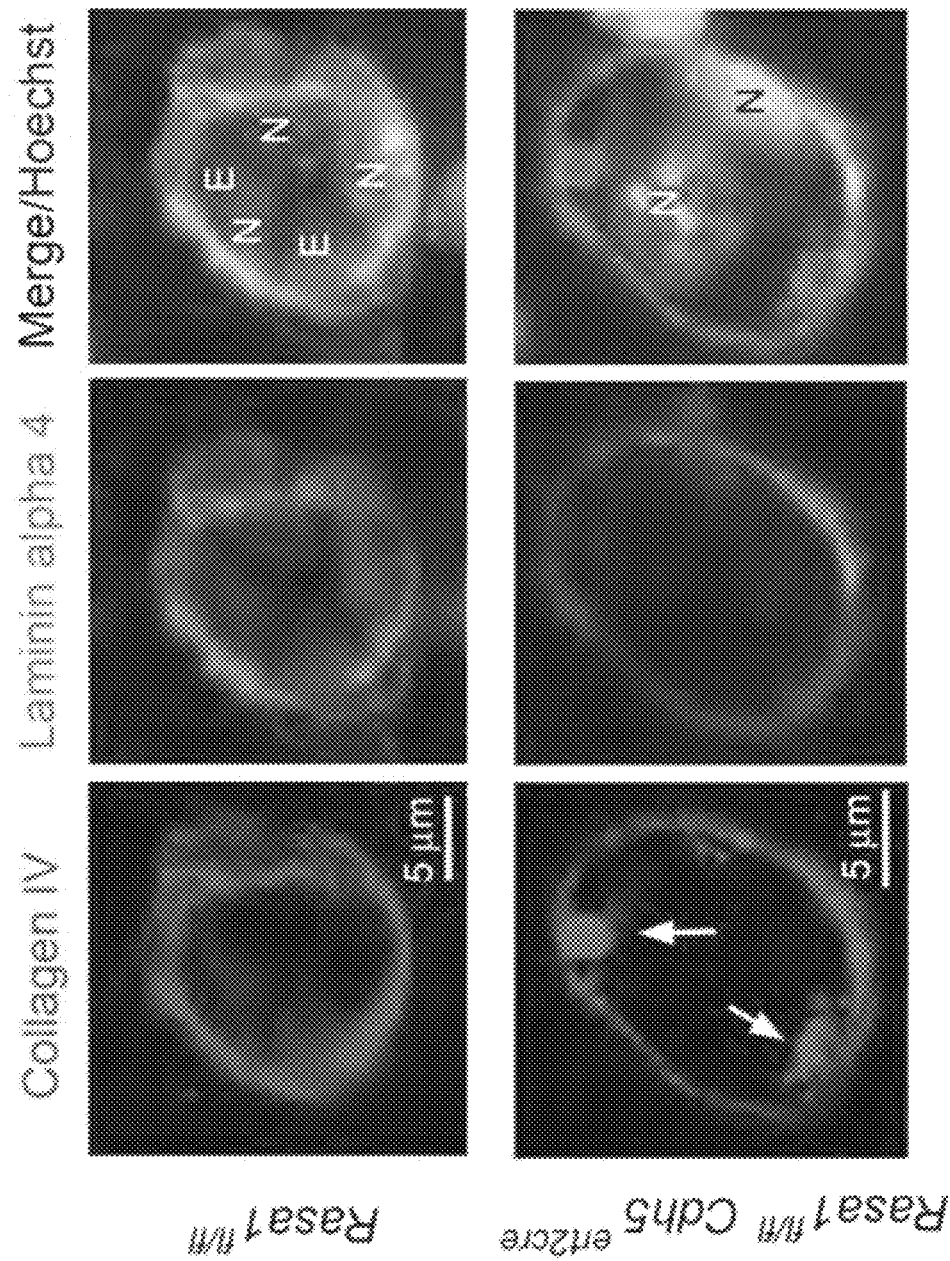
FIG. 19. Specific accumulation of collagen IV within BEC following induced loss of RASA1 during developmental angiogenesis. Skin sections from E18.5 littermate $Rasa1^{fl/fl}$ and $Rasa1^{fl/fl}\ Cdh5^{ert2cre}$ embryos administered TM at E13.5 were stained with Hoechst and antibodies against collagen IV and laminin alpha 4. Shown are representative small cutaneous BV. Note intracellular accumulation of collagen IV (arrows) but not laminin alpha 4 in BEC of $Rasa1^{fl/fl}\ Cdh5^{ert2cre}$ embryos. N, nucleus; E, erythrocyte.
Figure 20:
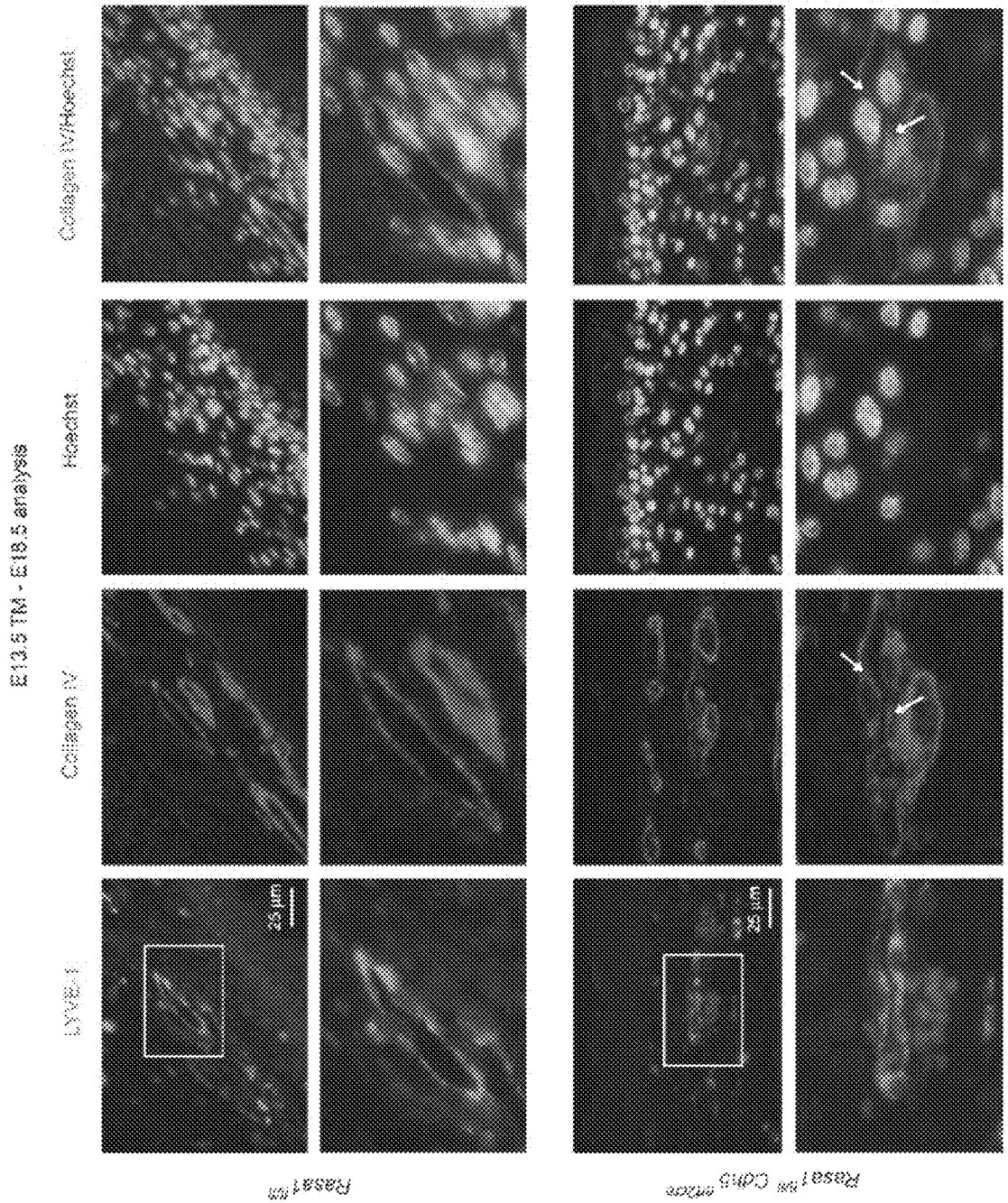
FIG. 20. Accumulation of collagen IV within LEC following induced loss of RASA1 during developmental angiogenesis. Skin sections from E18.5 littermate $Rasa1^{fl/fl}$ and $Rasa1^{fl/fl}\ Cdh5^{ert2cre}$ embryos administered TM at E13.5 were stained with Hoechst and antibodies against collagen IV and LYVE-1. Lower power images are shown in top rows. Higher power images of boxed areas containing LYVE-1+LV are shown below. Note accumulation of collagen IV in LEC of $Rasa1^{fl/fl}\ Cdh5^{ert2cre}$ embryos (arrows).

To determine if intracellular collagen IV accumulation was a consequence of or was independent of BEC apoptosis, skin sections of E18.5 Rasa1$^{fl/fl}$ Cdh5$^{ert2cre}$ embryos administered TM at E13.5 were stained with collagen IV antibodies (FIG. 3). BEC apoptosis is observed infrequently in Rasa1$^{fl/fl}$ Cdh5$^{ert2cre}$ embryos at this time point (FIG. 18). BEC in these embryos (but not BEC in E18.5 Rasa1$^{fl/fl}$ Cdh5$^{ert2cre}$ embryos that were not treated with TM) showed intracellular accumulation of collagen IV associated with a reduced density of collagen IV in BM (FIGS. 3, 15, and 18). Therefore, intracellular accumulation of collagen IV occurs independently of BEC apoptosis. In contrast to collagen IV, laminin alpha 4 was deposited normally in BV BM in Rasa1$^{fl/fl}$ Cdh5$^{ert2cre}$ embryos at E18.5 (FIG. 19). These findings indicate that impaired export of collagen IV from BEC is a contributing factor to the paucity of collagen IV in BV BM independent of BEC apoptosis. The intensity of collagen IV staining in BM of LV was also less in TM-treated E18.5 Rasa1$^{fl/fl}$ Cdh5$^{ert2cre}$ embryos compared to controls (FIG. 20). Furthermore, this was associated with intracellular accumulation of collagen IV within LEC (FIG. 20). Therefore, similar to BV, intracellular accumulation of collagen IV in LEC contributes to the reduced density of collagen IV in LV BM following loss of RASA1.

Collagen IV is Retained within the Endoplasmic Reticulum of EC of Induced EC-Specific RASA1-Deficient Embryos.

Figure 4:
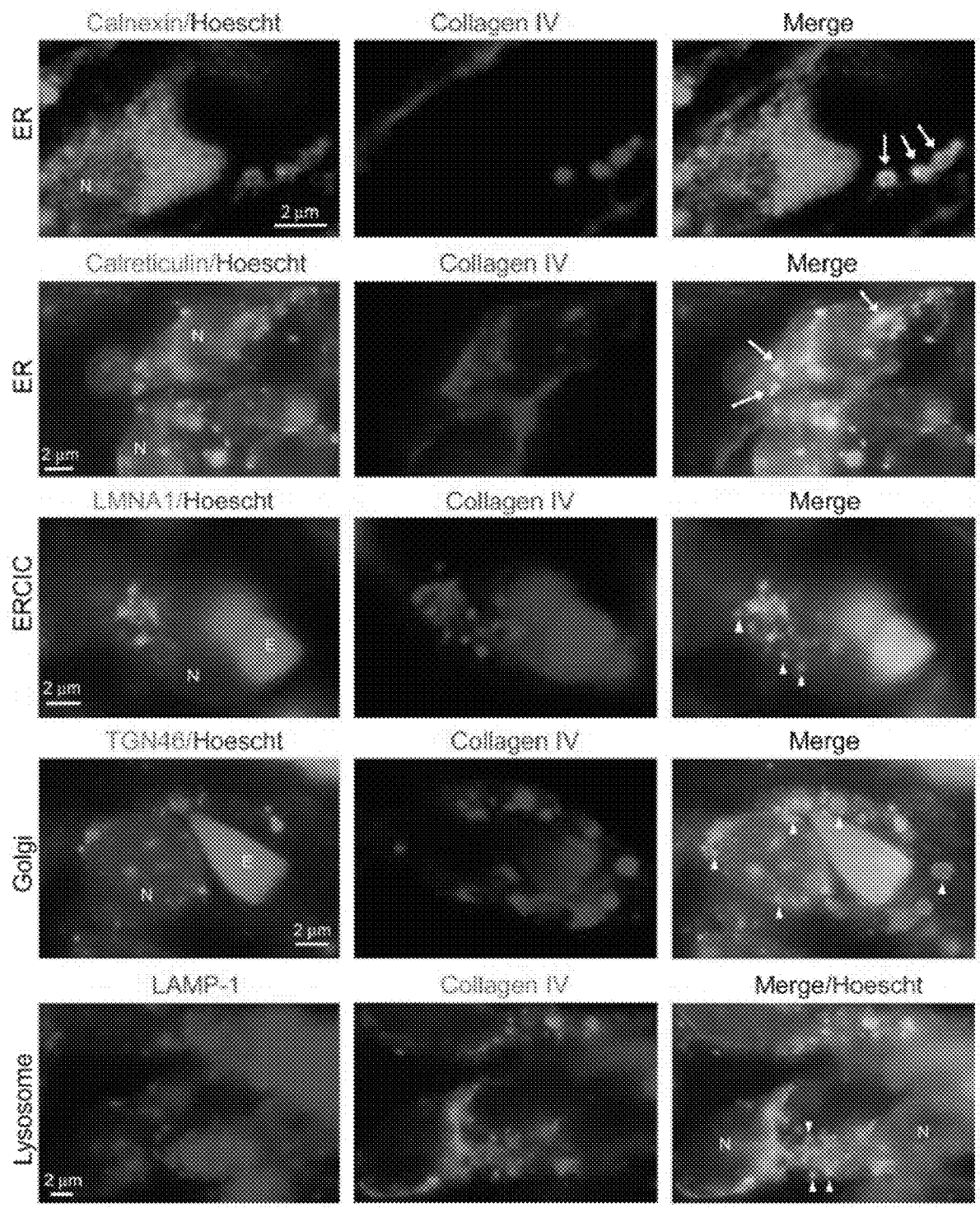
FIG. 4. Collagen IV is trapped within the ER of BEC following disruption of Rasa1 during developmental angiogenesis. Skin sections from E18.5 $Rasa1^{fl/fl}$ Cdh5$^{ert2cre}$ embryos administered TM at E13.5 were stained with Hoechst and antibodies against collagen IV together with antibodies against calnexin (ER), calreticulin (ER), LMNA1 (ERGIC), TGN46 (Golgi) or LAMP-1 (lysosome). Note encircling of collagen IV punctae with calnexin (arrows) and colocalization with calreticulin (arrows) but absence of colocalization of collagen IV punctae with other organelle markers (arrowheads). N, nucleus; E, erythrocyte.

Newly synthesized collagen IV in the endoplasmic reticulum (ER) is packaged into coat protein II (COPII)-coated vesicles that deliver collagen IV to the Golgi apparatus via the ER Golgi intermediate compartment (ERGIC). From the Golgi, collagen IV is further packaged into secretory vesicles for export to the extracellular space (Ref. 21; incorporated by reference in its entirety). Skin sections from E18.5 Rasa1$^{fl/fl}$ Cdh5$^{ert2cre}$ embryos treated with TM at E13.5 were co-stained with antibodies against collagen IV and organelle specific antibodies (FIG. 4). No co-localization of collagen IV with ERGIC, Golgi or lysosomal markers was observed. In contrast, both of two different ER markers co-localized with collagen IV. Calnexin, a transmembrane ER chaperone, that is highly restricted to the ER, encircled discrete collagen IV punctae (Ref. 22; incorporated by reference in its entirety). In contrast, calreticulin, an ER lumenal chaperone was coincident with the majority of collagen IV punctae (FIG. 4). Thus, intracellular collagen IV accumulation in RASA1-deficient EC is explained by impaired export of collagen IV from the ER.

Mechanism of EC Death Upon Loss of RASA1 During Developmental Angiogenesis.

Blocked export of collagen IV from vascular cells could contribute to EC death during developmental angiogenesis in two distinct ways.

Figure 1:
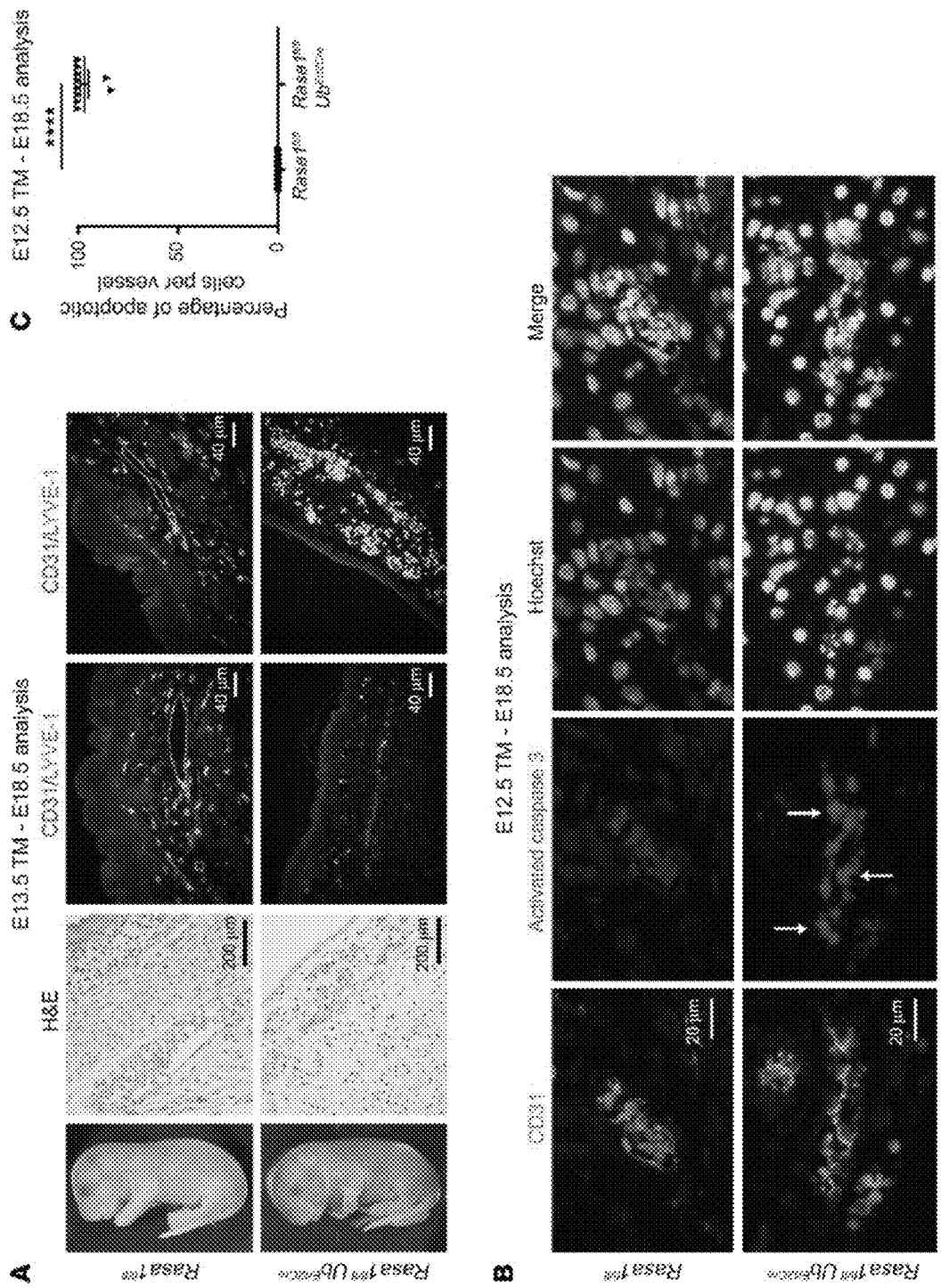
FIG. 1, panel A-C. Hemorrhage, edema and EC apoptosis following global disruption of Rasa1 during developmental angiogenesis. (A) TM was administered to littermate $Rasa1^{fl/fl}$ and $Rasa1^{fl/fl}$ $Ub^{ert2cre}$ embryos at E13.5 and embryos were harvested at E18.5. $Rasa1^{fl/fl}$ $Ub^{ert2cre}$ embryos show extensive cutaneous hemorrhage that was confirmed by staining of skin sections with H&E. Sections were additionally stained with antibodies against CD31 and LYVE-1 to identify BV and LV respectively. Note abundant BV and LV in skin of control $Rasa1^{fl/fl}$ embryos (separate representative fields are shown) and damaged BV and absence of LV in skin of $Rasa1^{fl/fl}$ $Ub^{ert2cre}$ embryos (separate fields show areas with and without extravasated autofluorescent erythrocytes in yellow). (B) TM was administered to littermate $Rasa1^{fl/fl}$ and $Rasa1^{fl/fl}$ $Ub^{ert2cre}$ embryos at E12.5 and embryos were harvested at E18.5. Skin sections were stained with Hoechst and antibodies against CD31 and activated caspase 3. Note activated caspase 3 (arrows) surrounding fragmented nuclei of apoptotic BEC of $Rasa1^{fl/fl}$ $Ub^{ert2cre}$ embryos. (C) Quantitation of BEC apoptosis in skin BV of $Rasa1^{fl/fl}$ and $Rasa1^{fl/fl}$ $Ub^{ert2cre}$ embryos administered TM at E12.5 and harvested at E18.5. Shown is the mean+/−1 SEM of the percentage of activated caspase 3+ BEC per BV (n=10 BV each genotype). ****, P<0.0001, Student's 2-sample t-test.
Figure 2:
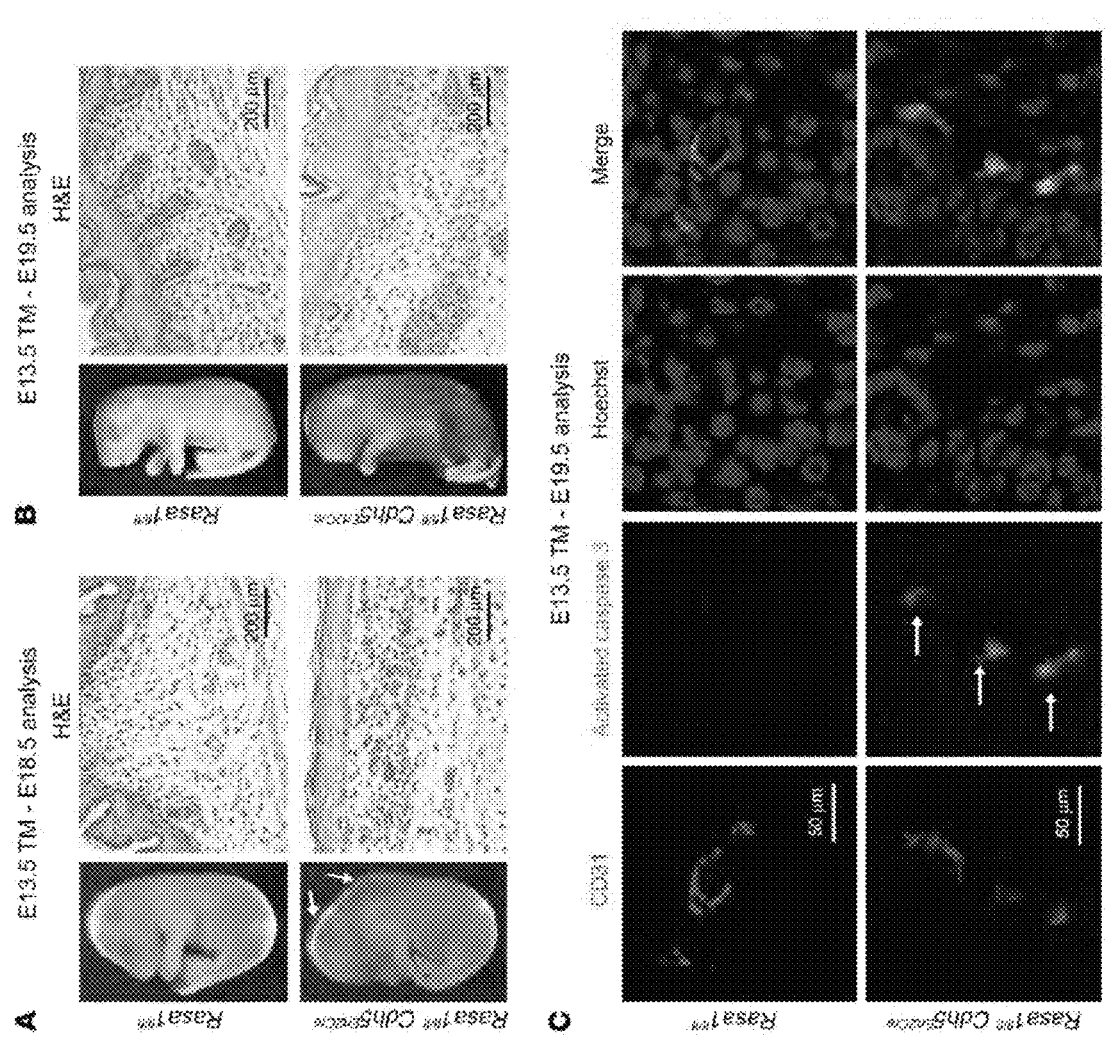
FIG. 2, panel A-C. BV abnormalities following disruption of Rasa1 specifically within EC during developmental angiogenesis. TM was administered to littermate $Rasa1^{fl/fl}$ and $Rasa1^{fl/fl}$ $Cdh5^{ert2cre}$ embryos at E13.5. (A and B) Embryos were harvested at E18.5 or E19.5 and skin sections were stained with H&E. Note localized hemorrhage in $Rasa1^{fl/fl}$ $Cdh5^{ert2cre}$ embryos at E18.5 (arrows) and more extensive hemorrhage and edema at E19.5. Note extravasated erythrocytes in skin sections from E18.5 and E19.5 embryos. The section from the E18.5 $Rasa1^{fl/fl}$ $Cdh5^{ert2cre}$ embryo is from an area of skin with visible hemorrhage. (C) Embryos were harvested at E19.5 and skin sections were stained with Hoechst and antibodies against CD31 and activated caspase 3. Note apoptotic BEC in $Rasa1^{fl/fl}$ $Cdh5^{ert2cre}$ embryos (arrows).
Figure 21:
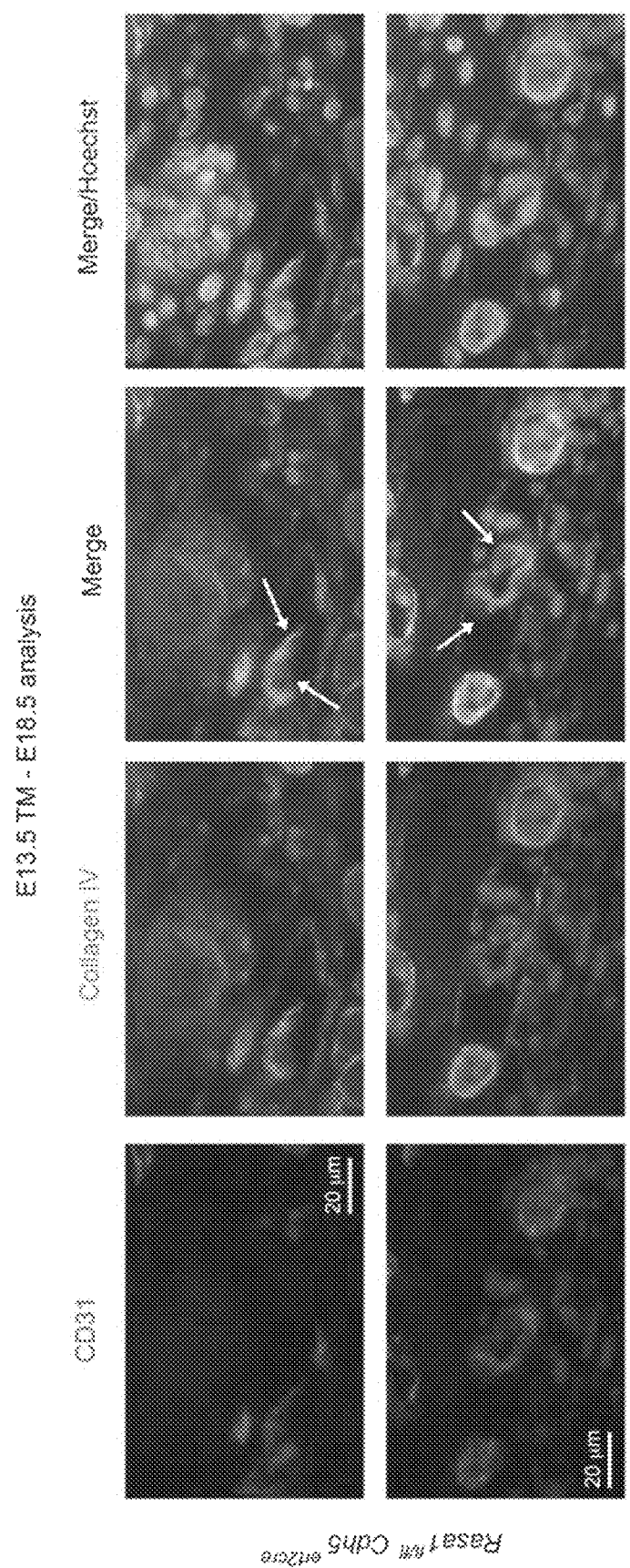
FIG. 21. Evidence of BEC anoikis in EC-specific RASA1-deficient embryos. $Rasa1^{fl/fl}\ Cdh5^{ert2cre}$ embryos were administered TM at E13.5 and harvested at E18.5. Skin sections were stained with Hoechst and antibodies against CD31 and collagen IV. Note detached or detaching BEC with intracellular collagen IV in lumens of vessels (arrows).
Figure 22:
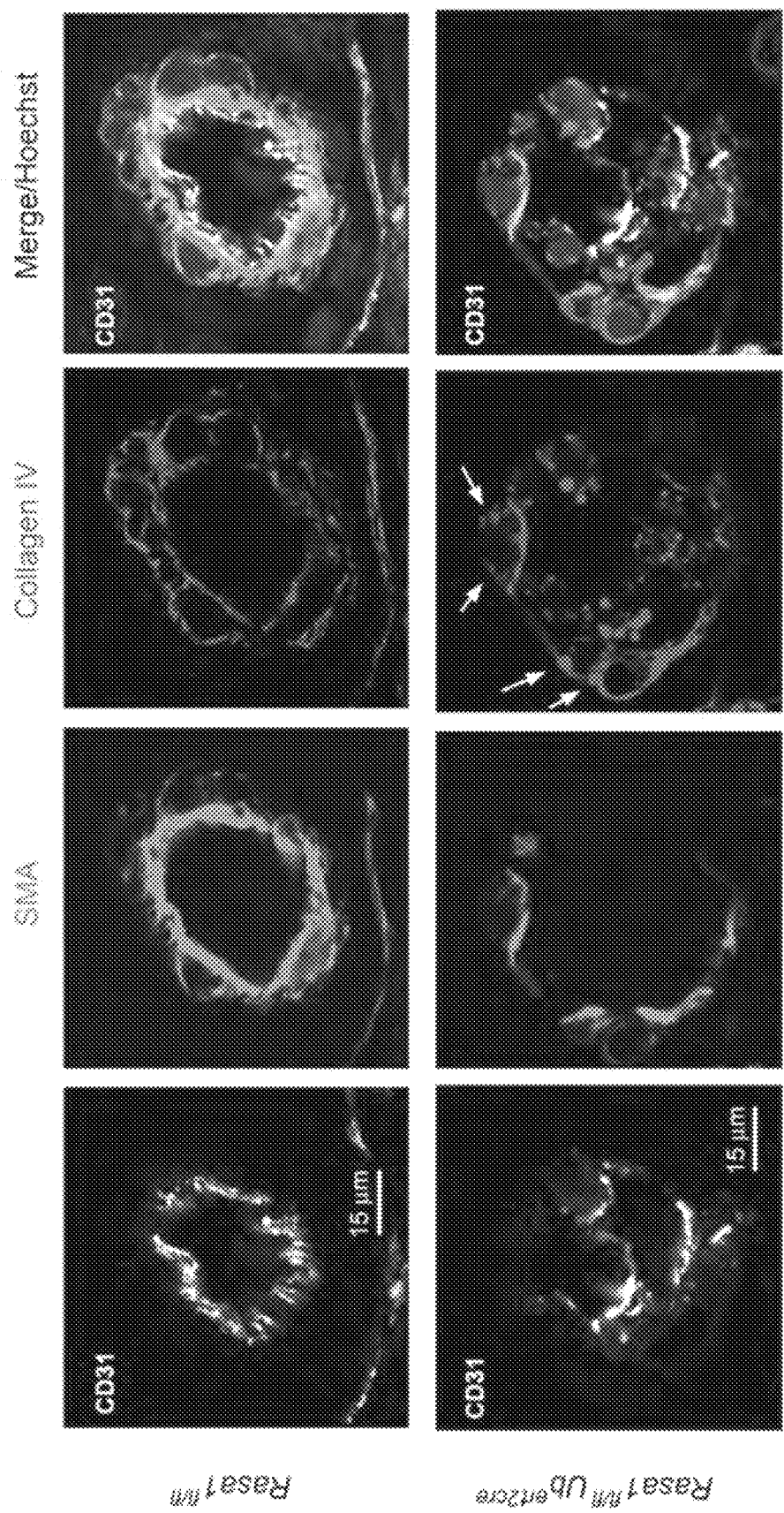
FIG. 22. Accumulation of collagen IV within vascular smooth muscle cells following induced loss of RASA1 during developmental angiogenesis. Skin sections from E19.5 littermate $Rasa1^{fl/fl}$ and $Rasa1^{fl/fl}\ Ub^{ert2cre}$ embryos administered TM at E14.5 were stained with Hoechst and antibodies against CD31, smooth muscle actin (SMA) and collagen IV. Note intracellular accumulation of collagen IV in vascular smooth cells of $Rasa1^{fl/fl}\ Ub^{ert2cre}$ embryos (arrows).
Figure 23:
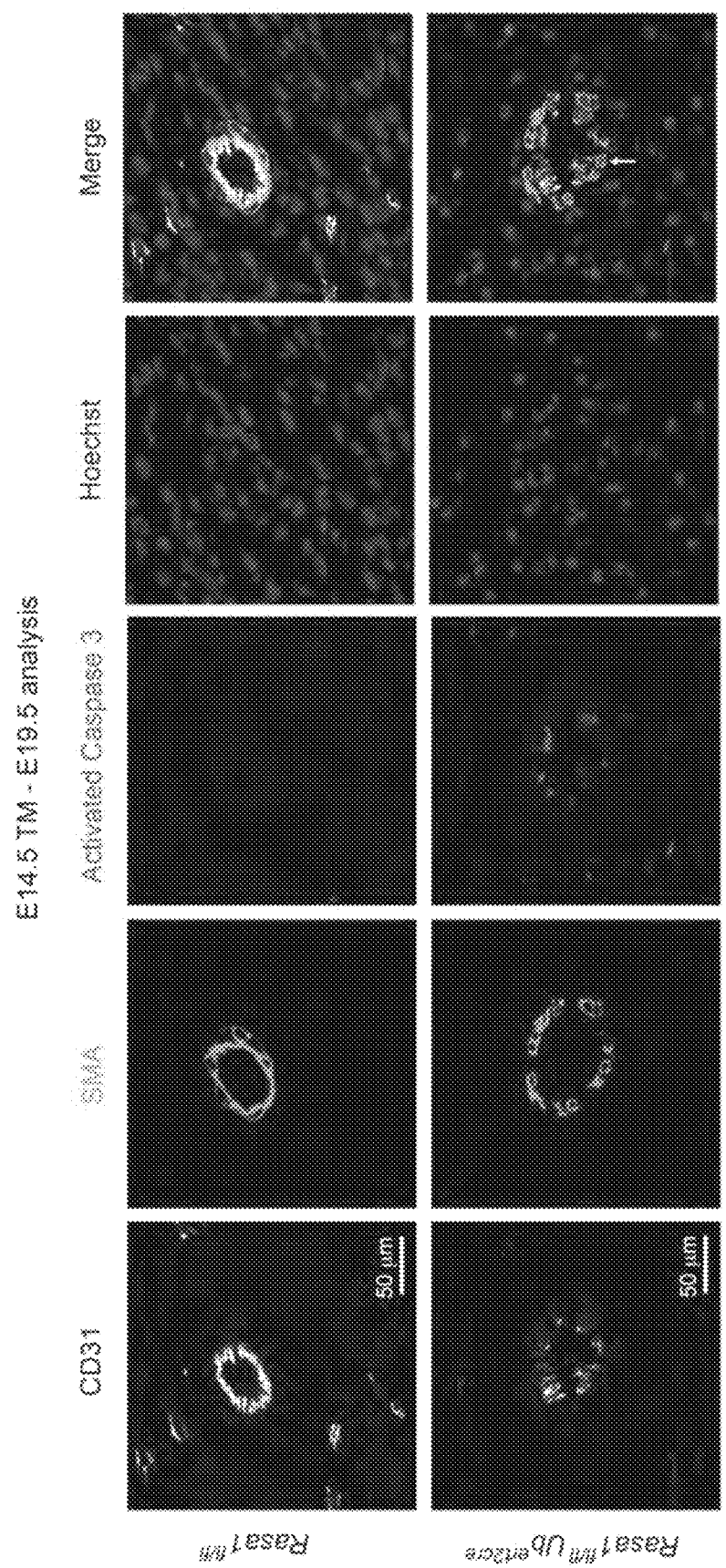
FIG. 23. VSMC apoptosis in RASA1-deficient embryos. Skin sections from E19.5 littermate $Rasa1^{fl/fl}$ and $Rasa1^{fl/fl}\ Ub^{ert2cre}$ embryos administered TM at E14.5 were stained with Hoechst and antibodies against CD31 and activated caspase 3. Note evidence of VSMC apoptosis in $Rasa1^{fl/fl}\ Ub^{ert2cre}$ embryos (arrow).

First, blocked export could result in detachment or failed attachment of EC to vascular BM, thereby resulting in apoptotic death by anoikis (Ref. 23; incorporated by reference in its entirety). EC with accumulated collagen IV were observed in the process of detachment from the underlying BM following induced loss of RASA1 (FIG. 21). Anoikis contribution to EC death in the absence of RASA1 is supported by the observation of an earlier EC apoptotic response in TM-treated Rasa1$^{fl/fl}$ Ub$^{ert2cre}$ compared to Rasa1$^{fl/fl}$ Cdh5$^{ert2cre}$ embryos (FIGS. 1-2 and Table 1). Vascular BM collagen IV is synthesized both by EC and VSMC (Ref. 20; incorporated by reference in its entirety). It was examined if VSMC in Rasa1$^{fl/fl}$ Ub$^{ert2cre}$ embryos also accumulated collagen IV following administration of TM; intracellular accumulation of collagen IV was readily identified in VSMC cells of these embryos (FIG. 22). Apoptotic VSMC were identified (FIG. 23).

Figure 5:
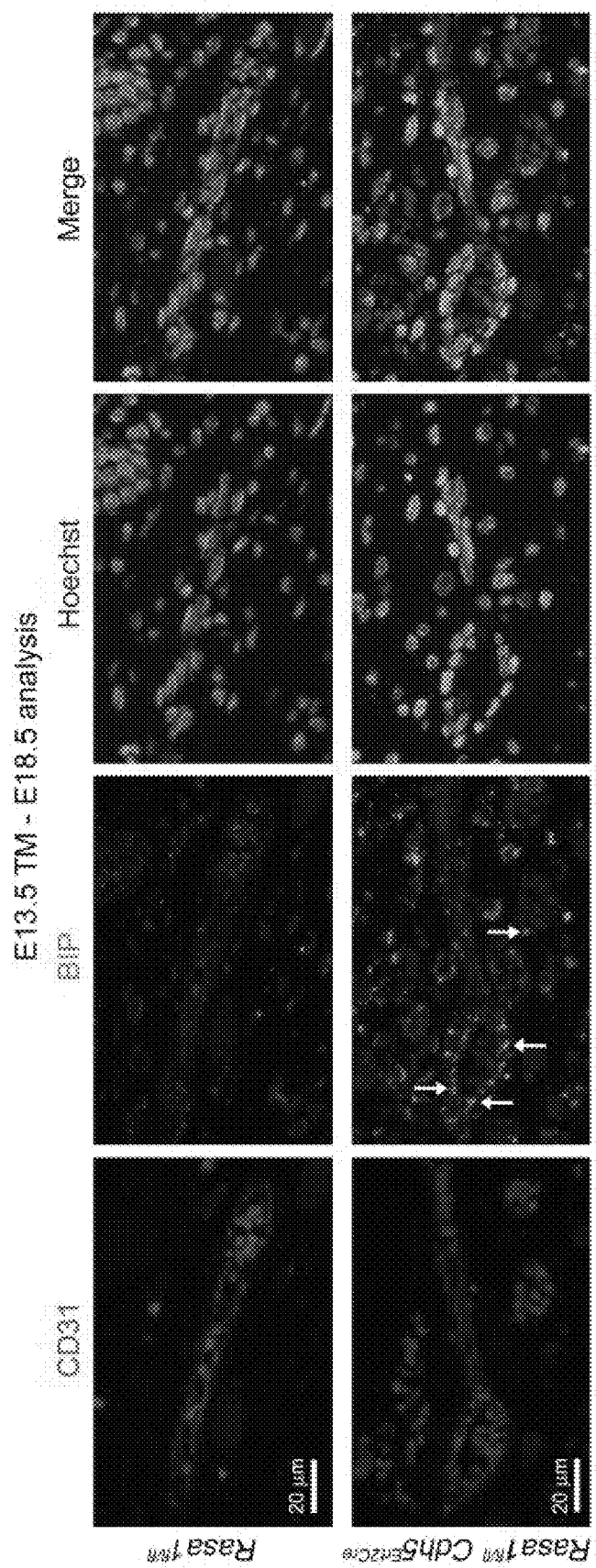
FIG. 5. Increased amounts of BIP in BEC following disruption of Rasa1 during developmental angiogenesis. Skin sections from E18.5 Rasa1$^{fl/fl}$ Cdh5$^{ert2cre}$ embryos administered TM at E13.5 were stained with Hoechst and antibodies against CD31 and BIP. Note increased BIP in BEC of the Rasa1$^{fl/fl}$ Cdh5$^{ert2cre}$ embryos indicative of an ongoing UPR (arrows).
Figure 24:
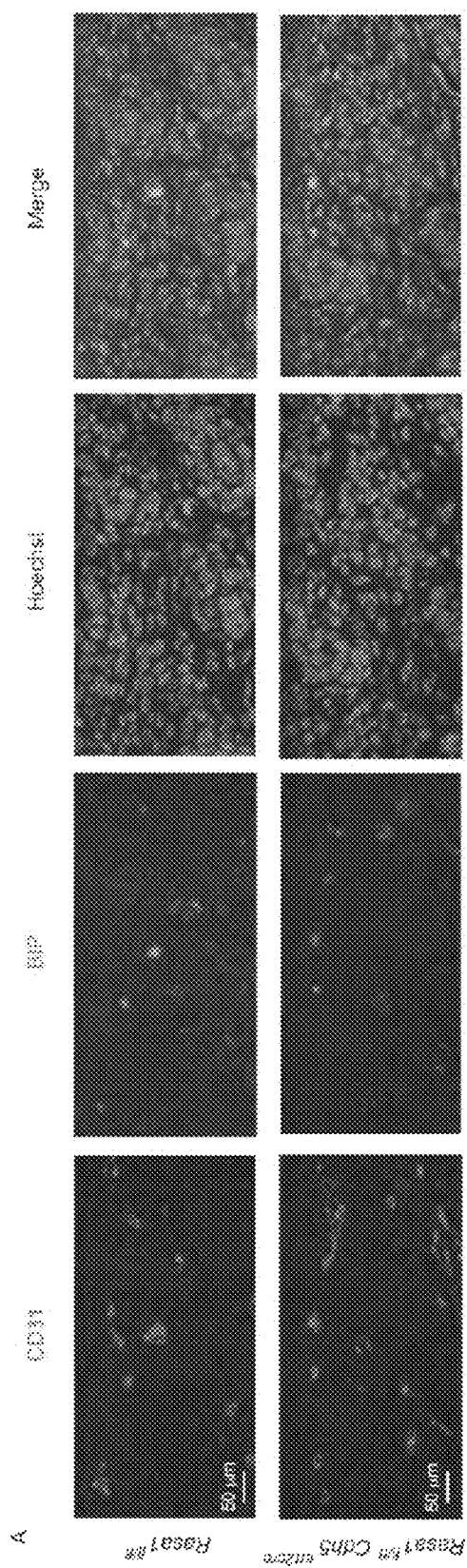
FIG. 24, panels A-B. No increased BIP in BEC of $Rasa1^{fl/fl}\ Cdh5^{ert2cre}$ embryos in the absence of TM. (A) Skin sections from littermate E18.5 $Rasa1^{fl/fl}$ and $Rasa1^{fl/fl}\ Cdh5^{ert2cre}$ embryos were stained with Hoechst and antibodies against CD31 and BIP. Note lack of detectable BIP in BEC both embryos. (B) Mean+/−1 SEM of the percentage of BIP+ BEC per BV in skin sections of $Rasa1^{fl/fl}$ and $Rasa1^{fl/fl}\ Cdh5^{ert2cre}$ embryos at E18.5 treated or not with TM at E13.5 (n=15 BV each genotype and condition). ****, P<0.0001; ns, not significant, Student's 2-sample t-test.
Figure 24:
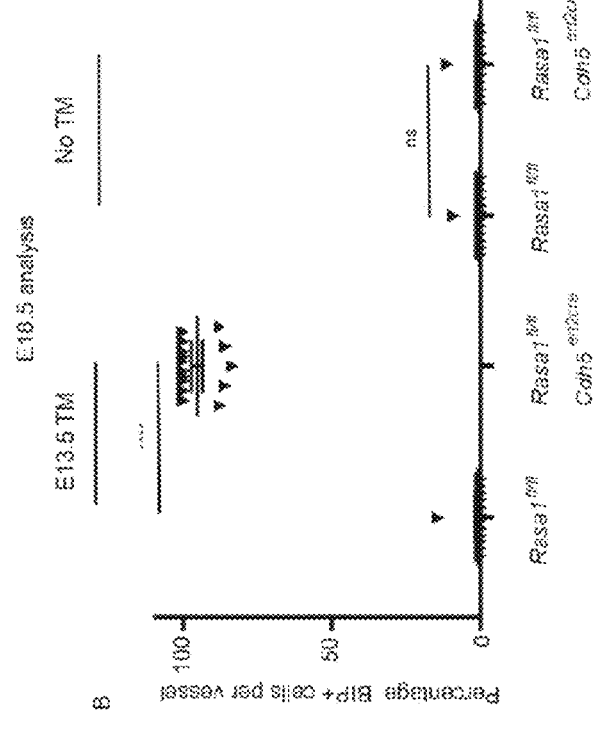

A second mechanism through which accumulated intracellular collagen IV could induce EC apoptosis is through induction of ER stress resulting in an unfolded protein response (UPR) (Refs. 24-25; incorporated by reference in their entireties). The purpose of the UPR is to assist the cell with the folding of unfolded and misfolded proteins in the ER. However, in circumstances where there remains an excess of unfolded protein, the UPR triggers apoptosis. In humans and mice, point-mutated collagen IV variants induce cell apoptosis via this mechanism (Refs. 26-29; incorporated by reference in their entireties). In addition, in mice deficient in the TANGO1 protein that is involved in export of collagen IV from the ER and in mice that are deficient in the Hsp47 chaperone that assists with collagen IV folding, accumulating wild-type collagen IV in the ER induces a UPR and BEC apoptosis (Refs. 30-31; incorporated by reference in their entireties). The principal sensor of unfolded protein in the ER is BiP/Grp78, which is increased in expression during the course of a UPR. Therefore, to determine if a UPR is induced in BEC upon loss of RASA1 during developmental angiogenesis, expression of BiP was examined. Amounts of BiP were sharply increased in EC of E18.5 Rasa1$^{fl/fl}$ Cdh5$^{ert2cre}$ embryos treated with TM at E13.5 compared to EC in E18.5 Rasa1$^{fl/fl}$ controls and EC of E18.5 Rasa1$^{fl/fl}$ Cdh5$^{ert2cre}$ embryos not treated with TM (FIGS. 5 and 24). These findings are consistent with the induction of a UPR in EC upon loss of RASA1.

The Chemical Chaperone 4-Phenylbutyrate Rescues Blood Vascular Phenotypes in Induced RASA1-Deficient Embryos.

Figure 6:
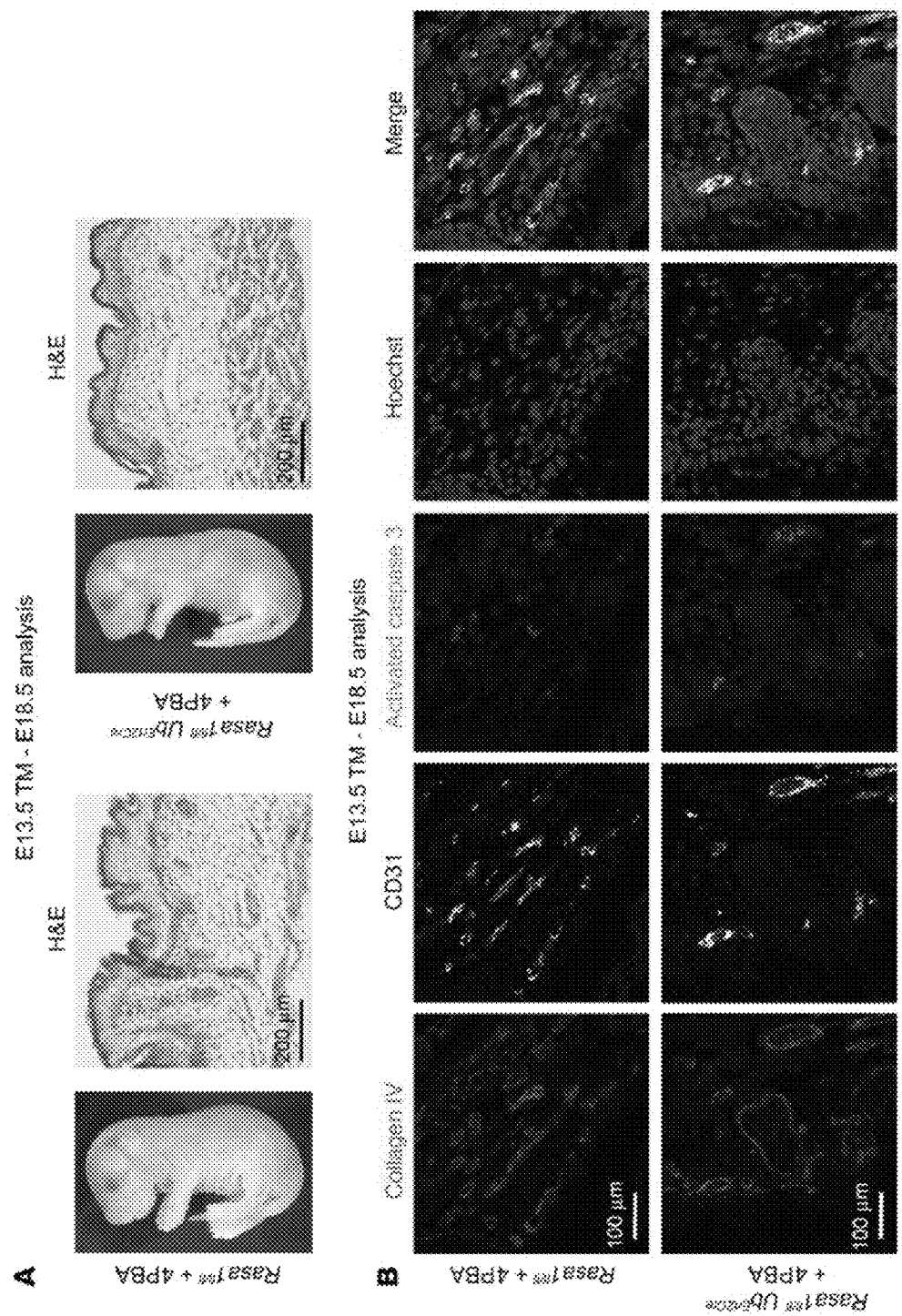
FIG. 6, panels A-B. Rescue of developmental angiogenesis defects in induced RASA1-deficient mice with the chemical chaperone 4PBA. TM was administered to littermate Rasa1$^{fl/fl}$ and Rasa1$^{fl/fl}$ Ub$^{ert2cre}$ embryos at E13.5. 4PBA was co-administered with the TM and was also administered to embryos on consecutive days thereafter until embryo harvest at E18.5. (A) Gross appearance of embryos. Note absence of hemorrhage and edema in Rasa1$^{fl/fl}$ Ub$^{ert2cre}$ embryos that was confirmed by H&E staining of skin sections. (B) Skin sections were stained with Hoechst and antibodies against collagen IV, CD31 and activated caspase 3. Note normal deposition of collagen IV in vascular BM and absence of BEC apoptosis in Rasa1$^{fl/fl}$ Ub$^{ert2cre}$ embryos.
Figure 7:
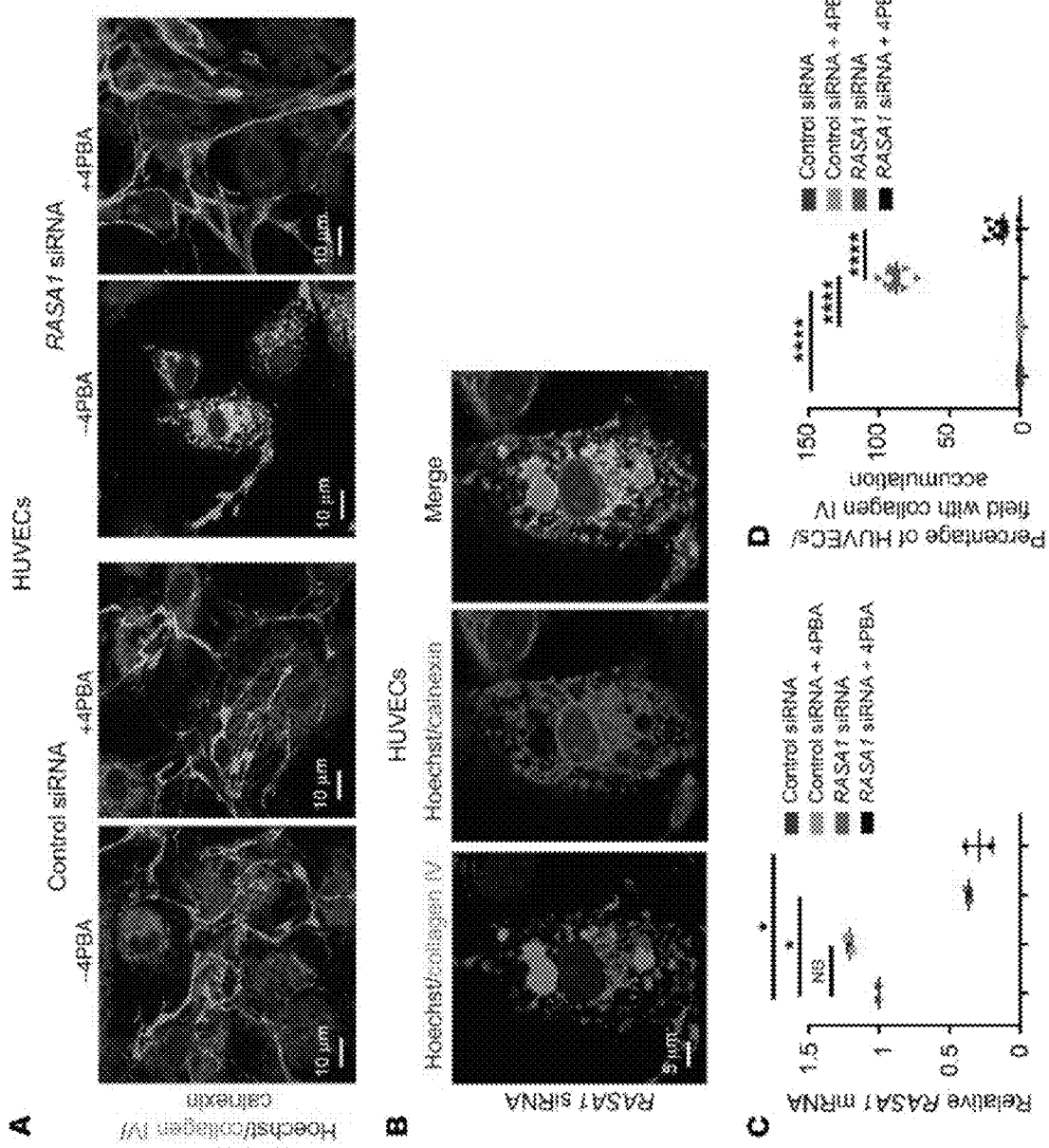
FIG. 7, panels A-D. RASA1 knockdown in HUVEC results in collagen IV accumulation in the ER that can be rescued by 4PBA. HUVEC were transfected with control or RASA1 siRNA and cultured for 24 hours in the presence or absence of 4PBA. (A) Cells were stained with Hoechst and antibodies against collagen IV and calnexin. Representative images are shown. Note intracellular accumulation of collagen IV in RASA1 siRNA-treated cells and its rescue by 4PBA treatment. (B) Higher magnification images of RASA1 siRNA-treated cells in (A) to show large intracellular accumulations of collagen IV surrounded by calnexin. (C) Knockdown of RASA1 was confirmed by reverse transcriptase qPCR. Shown is the mean+/−1 SEM of the amount of RASA1 mRNA normalized to the RASA1 mRNA level in control siRNA-treated HUVEC in the same experiment (n=2). (D) Mean+/−1 SEM of the percentage of HUVEC per field with evidence of intracellular collagen IV accumulation (n=12). *, $P<0.05$, ****, $P<0.0001$, ns, not significant, one-way ANOVA test with a Dunnett's multiple comparisons post-hoc test.
Figure 25:
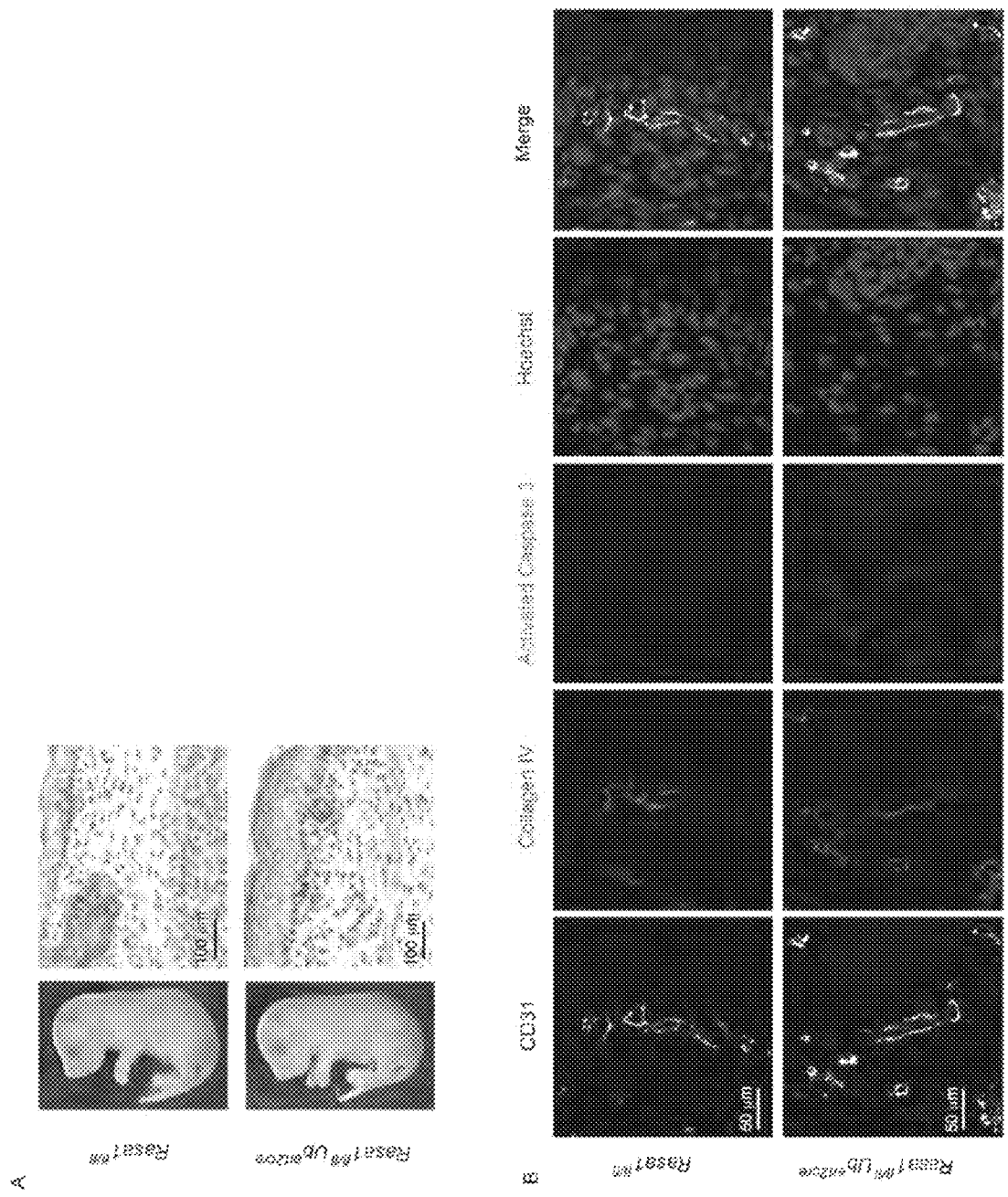
FIG. 25, panels A-B. Absence of vascular phenotypes in embryos treated with 4PBA alone. Littermate $Rasa1^{fl/fl}$ and $Rasa1^{fl/fl}\ Ub^{ert2cre}$ embryos were administered 4PBA at 13.5 and every day thereafter until embryo harvest at E18.5. (A) Gross appearance of embryos. Note absence of vascular phenotypes confirmed by H&E staining of skin sections. (n=3 embryos each genotype). (B) Skin sections were stained with Hoechst and antibodies against CD31, collagen IV and activated caspase 3. Note normal deposition of collagen IV in vascular BM and absence of BEC apoptosis in $Rasa1^{fl/fl}$ and $Rasa1^{fl/fl}\ Ub^{ert2cre}$ embryos.
Figure 26:
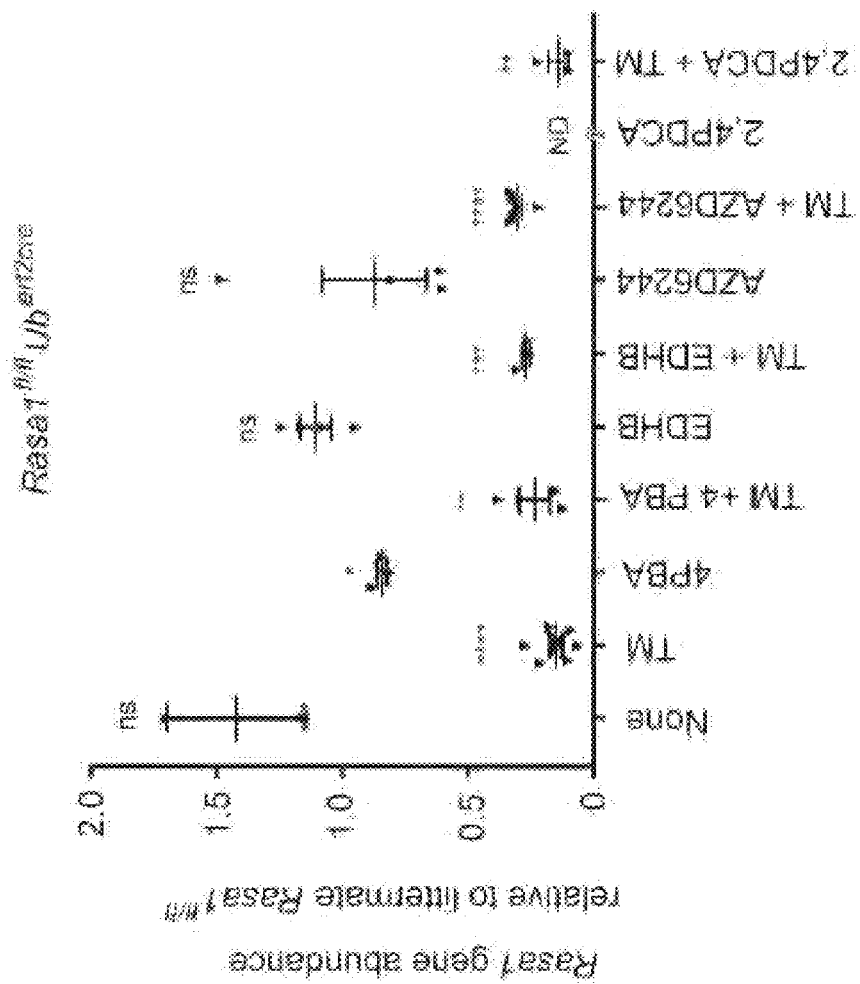
FIG. 26. Rasa1 gene disruption efficiency in $Rasa1^{fl/fl}\ Ub^{ert2cre}$ embryos after treatment with different drugs. $Rasa1^{fl/fl}\ Ub^{ert2cre}$ embryos were administered the indicated drugs starting at E13.5 and for the same number of days thereafter as indicated in other figures. Embryos were harvested at E18.5 and Rasa1 gene abundance was determined by real time qPCR using tail genomic DNA as a template. Results are expressed as mean+/−1 SEM of Rasa1 gene abundance relative to Rasa1$^{fl/fl}$ embryos in the same litter (mean value). n=2, 8, 3, 4, 4, 3, 4, 6, 0 and 3 for None, TM, 4PBA, TM+4PBA, EDHB, TM+EDHB, AZD6244, TM+AZD6244, 2,4PDCA (ND, not determined) and 2,4PDCA+TM respectively. *, P<0.05, , P<0.01; *, P<0.001, ****, P<0.0001; ns, not significant, Student's 1-sample t-test.

Experiments were conducted during development of embodiments herein to if a chemical chaperone, 4-phenylbutyrate (4PBA) ameliorates vascular phenotypes that result from loss of RASA1. 4PBA rescued blocked export of misfolded point mutant collagen IV variants from human and mouse EC in vitro and reversed intracerebral hemorrhage in mouse models that express these mutants (Refs. 27, 35; incorporated by reference in their entireties). Pregnant Rasa1$^{fl/fl}$ mice carrying Rasa1$^{fl/fl}$ and Rasa1$^{fl/fl}$ Ub$^{ert2cre}$ embryos were administered TM with 4PBA at E13.5 followed by 4PBA every day thereafter until embryo harvest at E18.5. Administration of 4PBA in these experiments completely rescued each of EC export of collagen IV, EC apoptosis and blood vascular hemorrhage (Table 1 and FIG. 6, compare FIG. 1). In contrast, 4PBA had no influence upon vascular development when administered alone to embryos in the absence of TM (FIG. 25). As determined by real time qPCR of tail genomic DNA, 4PBA did not affect the ability of TM disrupt the Rasa1 gene in Rasa1$^{fl/fl}$ Ub$^{ert2cre}$ embryos (FIG. 26). RASA1 siRNA-mediated knockdown of RASA1 in human umbilical vein endothelial cells (HUVEC) also resulted in intracellular accumulation of collagen IV, which could be rescued by 4PBA treatment (FIG. 7). These findings provide strong evidence that blocked export of collagen IV from RASA1-deficient EC is a consequence of impaired collagen IV folding in the ER rather than a defect in COPII-mediated secretion.

Loss of RASA1 During Developmental Angiogenesis Results in Increased Abundance of Collagen IV-Modifying Enzymes in EC.

Hetero-trimerization of two collagen IV alpha-1 monomers and one alpha-2 monomer and folding to form the mature protomer in the ER (collagen alpha-1 and alpha-2 are the predominant forms of collagen IV in EC) is a complex process that is regulated by different collagen IV-modifying enzymes and molecular chaperones that include protein disulfide isomerase A1 (PDIA1), peptidyl proline isomerases (PPIs), proline-4 and proline-3 hydroxylases (P4HA1-3 and P3H1-3 respectively), and lysine hydroxylases (LH1-3) also known as procollagen-lysine, 2-oxoglutarate 5-dioxygenase enzymes (PLOD1-3), and Hsp47. To examine if loss of RASA1 resulted in changes in the amounts of collagen IV-modifying enzymes or chaperones in embryonic BEC during developmental angiogenesis, proteomic analyses were performed. Pregnant Rasa1$^{fl/fl}$ mice carrying Rasa1$^{fl/fl}$ and Rasa1$^{fl/fl}$ Ub$^{ert2cre}$ embryos were administered TM at E14.5 and embryos were harvested at E18.5, i.e. prior to BEC apoptosis and hemorrhage (Table 1). Subsequently, BEC were purified from skin of individual embryos, pooled according to genotype and lysed. Tryptic digests of lysates were then analyzed by liquid chromatography-mass spectrometry/mass spectrometry (LC-MS/MS). Data on the relative abundance of nearly 4,000 BEC proteins was obtained. Of these, approximately 250 proteins were increased at least 2-fold and 200 were decreased at least 2-fold in RASA1-deficient BEC compared to control BEC (See, Chen et al. J Clin Invest. 2019 Jun. 11; 129(9):3545-3561; incorporated by reference in its entirety). Strikingly, several of the enzymes involved in collagen IV post-translational modification were increased in abundance, including FKBP9, P3H1, P4HA2, LH2/PLOD2, and LH3/PLOD3 (Table 3). In contrast, other ER resident proteins implicated in collagen folding, including PDIA1 and Hsp47, showed no or only modest changes in abundance. Furthermore, no significant changes in the abundance of any COPII secretory pathway proteins were apparent; consistent with the notion that impaired export of collagen IV is not a result of defects in the COPII secretion mechanism.

TABLE 3

Abundance of collagen IV modifying enzymes in RASA1-deficient embryonic BEC$^a$

| Protein | Function | Cre+/Cre− |
|---|---|---|
| PDIA1 | PDI | 1.4 |
| PPIB | PPI (ER) | 0.8 |
| FKBP2 | PPI (ER) | 0.8 |
| FKBP7 | PPI (ER) | 0.7 |
| FKBP9$^b$ | PPI (ER) | 2.1 |
| FKBP10 | PPI (ER) | 1.2 |
| P3H1 | P3H | 2.1 |
| P3H3 | P3H | >5$^c$ |
| P4HA1 | P4H | 1.7 |
| P4HA2 | P4H | 3.4 |
| PLOD1 | PLOD | 1.6 |
| PLOD2 | PLOD | 5.1 |
| PLOD3 | PLOD | 2 |
| HSP47 | HSP | 1.2 |

$^a$Abundance of all detectable known collagen IV-modifying enzymes and chaperones are shown
$^b$Proteins with 2-fold or greater changes in abundance are indicated with bold type
$^c$P3H3 was undetectable in control cells and thus fold increase is of uncertain significance Inhibitors of 2-Oxoglutarate (2OG) Dependent Oxygenases Rescue Blood Vascular Phenotypes in Induced RASA1-Deficient Embryos.

Figure 8:
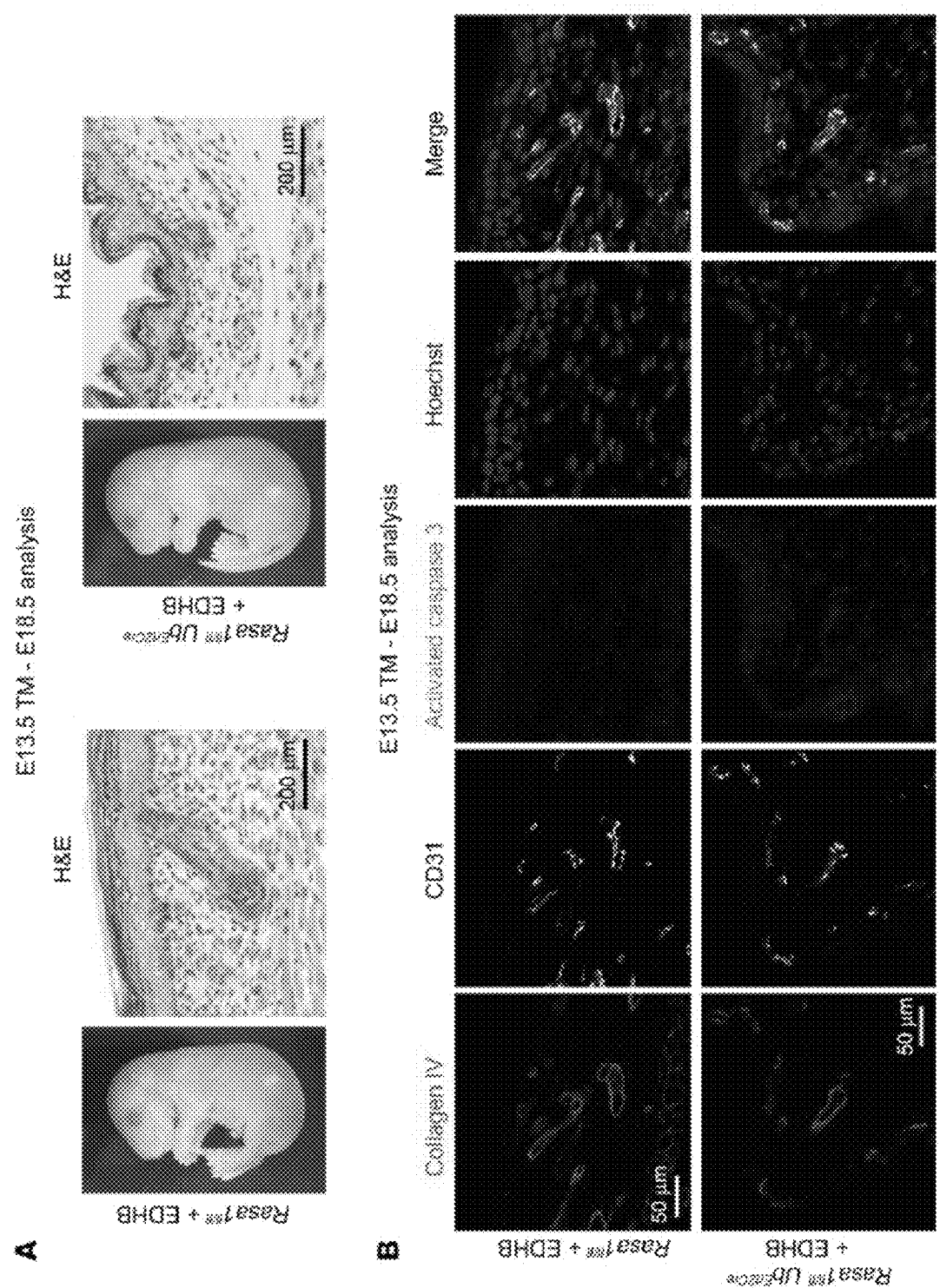
FIG. 8, panel A-B. Rescue of developmental angiogenesis defects in induced RASA1-deficient mice with the 2OG dependent oxygenase inhibitor, EDHB. TM was administered to littermate Rasa1$^{fl/fl}$ and Rasa1$^{fl/fl}$ Ub$^{ert2cre}$ embryos at E13.5. EDHB was co-administered with the TM and was also administered to embryos on consecutive days thereafter until embryo harvest at E18.5. (A) Gross appearance of embryos. Note absence of hemorrhage and edema in Rasa1$^{fl/fl}$ Ub$^{ert2cre}$ embryos that was confirmed by H&E staining of skin sections. (B) Skin sections were stained with Hoechst and antibodies against collagen IV, CD31 and activated caspase 3. Note normal deposition of collagen IV in vascular BM and absence of BEC apoptosis in Rasa1$^{fl/fl}$ Ub$^{ert2cre}$ embryos.
Figure 27:
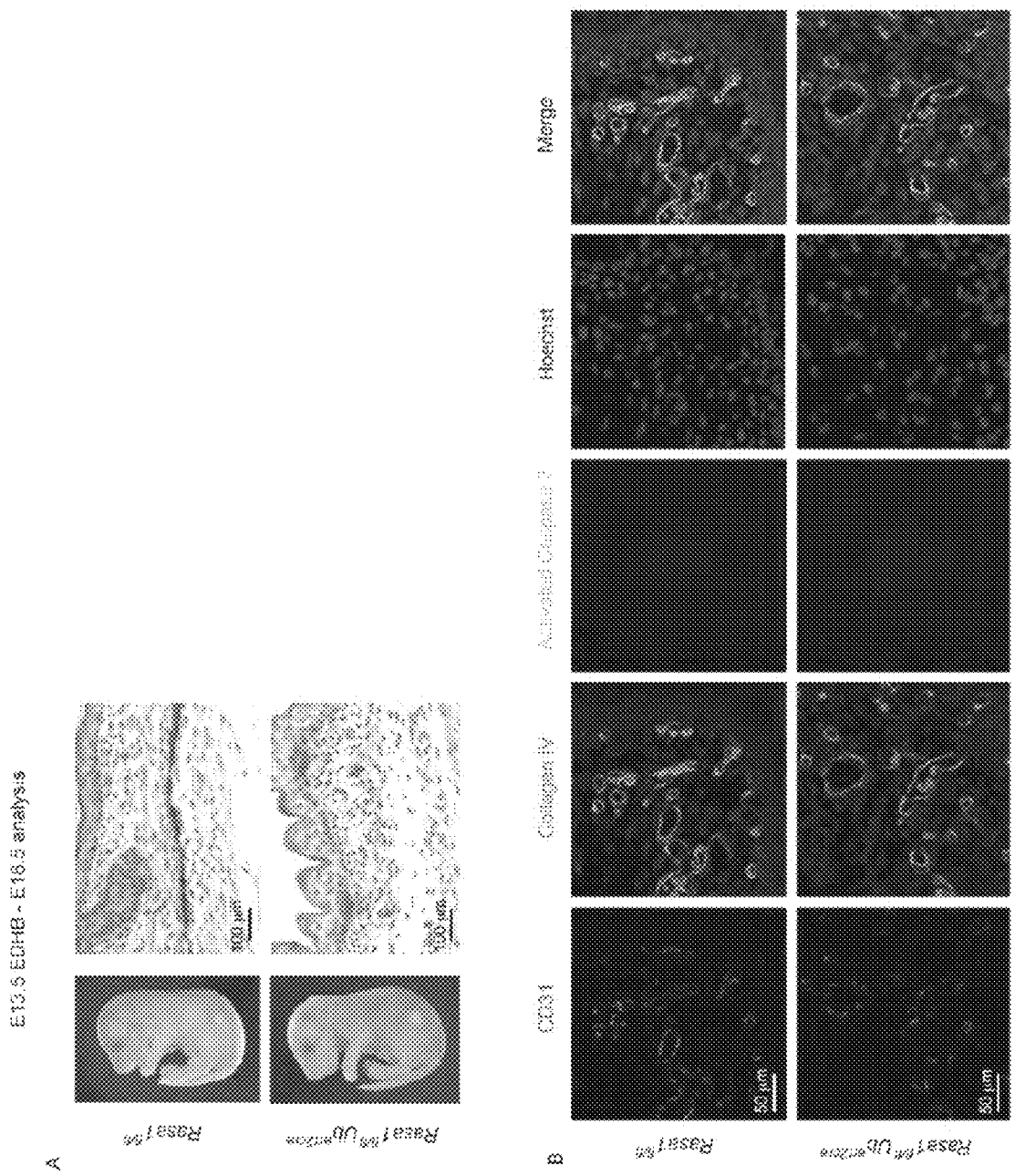
FIG. 27, panels A-B. Absence of vascular phenotypes in embryos treated with EDHB alone. Littermate Rasa1$^{fl/fl}$ and Rasa1$^{fl/fl}$ Ub$^{ert2cre}$ embryos were administered EDHB at E13.5 and every day thereafter until embryo harvest at E18.5. (A) Gross appearance of embryos. Note absence of vascular phenotypes confirmed by H&E staining of skin sections. (n=6 Rasa1$^{fl/fl}$ and n=5 Rasa1$^{fl/fl}$ Ub$^{ert2cre}$ embryos). (B) Skin sections were stained with Hoechst and antibodies against CD31, collagen IV and activated caspase 3. Note normal deposition of collagen IV in vascular BM and absence of BEC apoptosis in Rasa1$^{fl/fl}$ and Rasa1$^{fl/fl}$ Ub$^{ert2cre}$ embryos.
Figure 28:
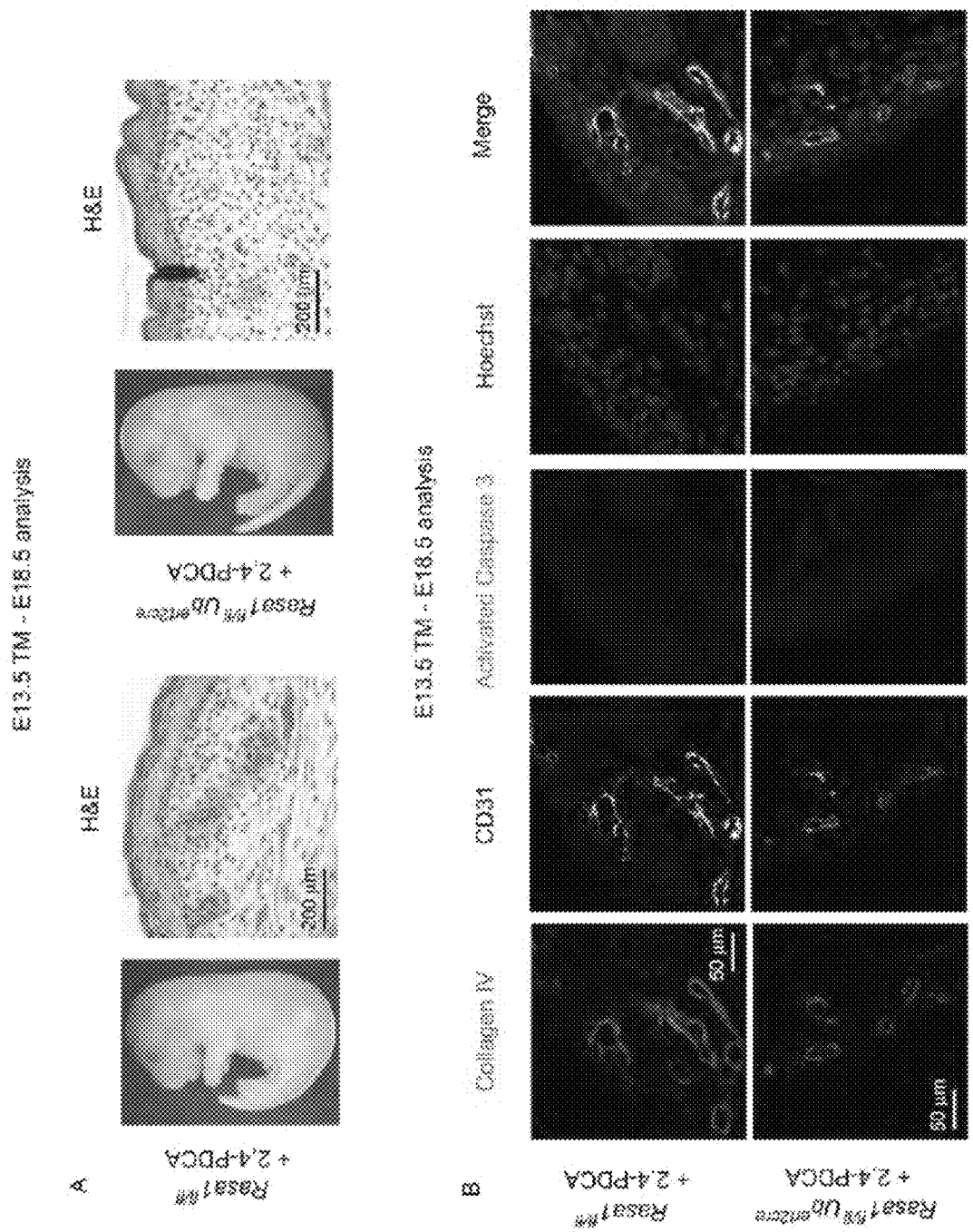
FIG. 28, panels A-B. Rescue of developmental angiogenesis defects in induced RASA1-deficient mice with the 2OG dependent oxygenase inhibitor, 2,4PDCA. TM was administered to littermate Rasa1$^{fl/fl}$ and Rasa1$^{fl/fl}$ Ub$^{ert2cre}$ embryos at E13.5. 2,4PDCA was co-administered with the TM and was also administered to embryos on consecutive days thereafter until embryo harvest at E18.5. (A) Gross appearance of embryos. Note absence of hemorrhage and edema in Rasa1$^{fl/fl}$ Ub$^{ert2cre}$ embryos that was confirmed by H&E staining of skin sections. (B) Skin sections were stained with Hoechst and antibodies against CD31, collagen IV and activated caspase 3. Note normal deposition of collagen IV in vascular BM and absence of BEC apoptosis in Rasa1$^{fl/fl}$ Ub$^{ert2cre}$ embryos.

P4HA2, P3H1, PLOD2 and PLOD3 all belong to the same family of enzymes known as 2-oxoglutarate (2OG) dependent oxygenases, so called because of their dependency upon 2OG for catalysis (Ref. 41; incorporated by reference in its entirety). Drugs are available that generically inhibit all members of this family. One such drug is the catechol, ethyl-3,4-dihydroxybenzoic acid (EDHB) that has been used in vitro and in vivo to block the activity of collagen proline and lysine hydroxylases (Refs. 41-42; incorporated by reference in their entireties). To determine if increased abundance of any or all of these enzymes is responsible for collagen IV accumulation in BEC during developmental angiogenesis, experiments were conducted during development of embodiments herein to examine the ability of EDHB to rescue blocked collagen IV export and vascular phenotypes in induced RASA1-deficient embryos. Pregnant Rasa1$^{fl/fl}$ mice carrying Rasa1$^{fl/fl}$ and Rasa1$^{fl/fl}$ Ub$^{ert2cre}$ embryos were administered TM at E13.5 together with EDHB that was additionally administered to mice every day thereafter until embryo harvest at E18.5. Administration of EDHB in these experiments completely rescued EC export of collagen IV, EC apoptosis and blood vascular hemorrhage (Table 1 and FIG. 8, compare FIG. 1). In contrast, when administered to embryos in the absence of TM, EDHB did not affect vascular development (FIG. 27). As with 4PBA, EDHB did not affect Rasa1 gene disruption induced by TM in Rasa1$^{fl/fl}$ Ub$^{ert2cre}$ embryos (FIG. 26). The same results were obtained using another generic 2OG-dependent oxygenase inhibitor, 2,4 pyridinedicarboxylic acid (2,4PDCA) (Table 1, FIGS. 26 and 28). These findings are consistent with a model in which loss of RASA1 in BEC during developmental angiogenesis results in increased amounts of collagen IV-modifying 2OG dependent oxygenases in BEC that accounts for collagen IV retention in the ER and downstream vascular phenotypes.

Dysregulated Ras-MAPK Signaling is Responsible for the Development of BV Phenotypes Following RASA1 Loss During Developmental Angiogenesis.

RASA1 may participate in certain signaling pathways independently of its ability to regulate Ras (Ref. 10; incorporated by reference in its entirety). Rasa1$^{fl/R780Q}$ Ub$^{ert2cre}$ embryos were examined to determine if vascular phenotypes that result from induced loss of RASA1 during developmental angiogenesis result from dysregulated Ras signaling or to perturbation of a distinct signaling pathway. Administration of TM to these embryos results in the expression of Rasa1$^{R780Q}$ alone that encodes a catalytically inactive form of RASA1 in which all putative alternative functions of RASA1 are predicted to remain intact.

Pregnant Rasa1$^{fl/fl}$ mice carrying Rasa1$^{fl/fl}$ and Rasa1$^{fl/R780Q}$ embryos with and without Ub$^{ert2cre}$ were administered TM at E12.5 and harvested at E18.5.

Figure 9:
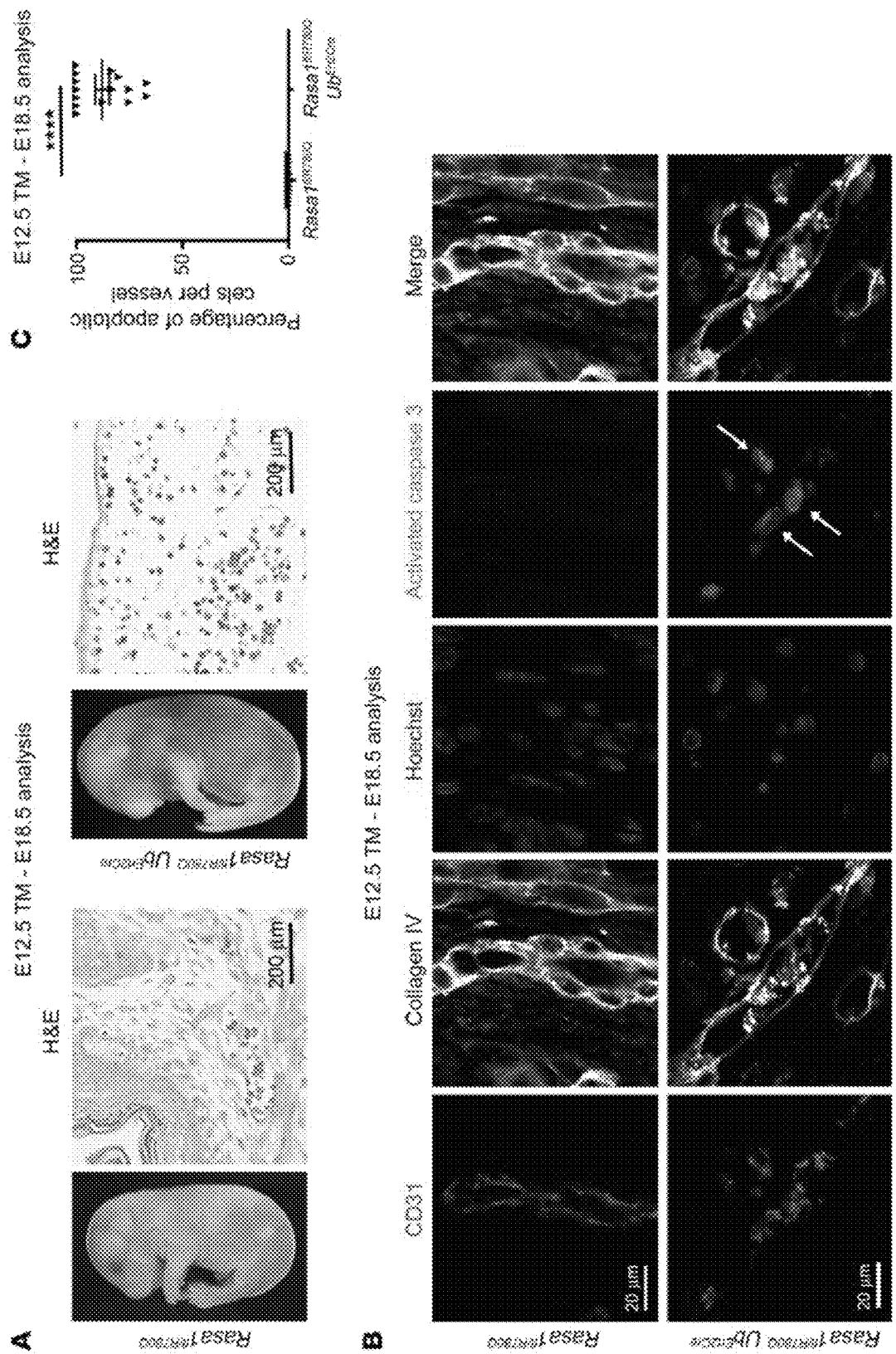
FIG. 9, panels A-C. BV abnormalities in embryos induced to express RASA1 R780Q alone during developmental angiogenesis. TM was administered to littermate Rasa1$^{fl/R780Q}$ and Rasa1$^{fl/R780Q}$ Ub$^{ert2cre}$ embryos at E12.5 and embryos were harvested at E18.5. (A) Gross appearance of embryos. Note cutaneous hemorrhage in Rasa1$^{fl/R780Q}$ Ub$^{ert2cre}$ embryos confirmed by H&E staining of skin sections. (B) Skin sections were stained with Hoechst and antibodies against collagen IV, CD31 and activated caspase 3. Note discontinuous distribution of collagen IV in BV BM, accumulation of collagen IV in BEC and presence of activated caspase 3 in nuclei of BEC (arrows) of Rasa1$^{fl/R780Q}$ Ub$^{ert2cre}$ embryos. (C) Quantitation of BEC apoptosis in skin BV of Rasa1$^{fl/R780Q}$ and Rasa1$^{fl/R780Q}$ Ub$^{ert2cre}$ embryos administered TM at E12.5 and harvested at E18.5. Shown is the mean+/−1 SEM of the percentage of activated caspase 3+ BEC per BV (n=15 BV each genotype). ****$P<0.0001$, Student's 2-sample t-test.
Figure 29:
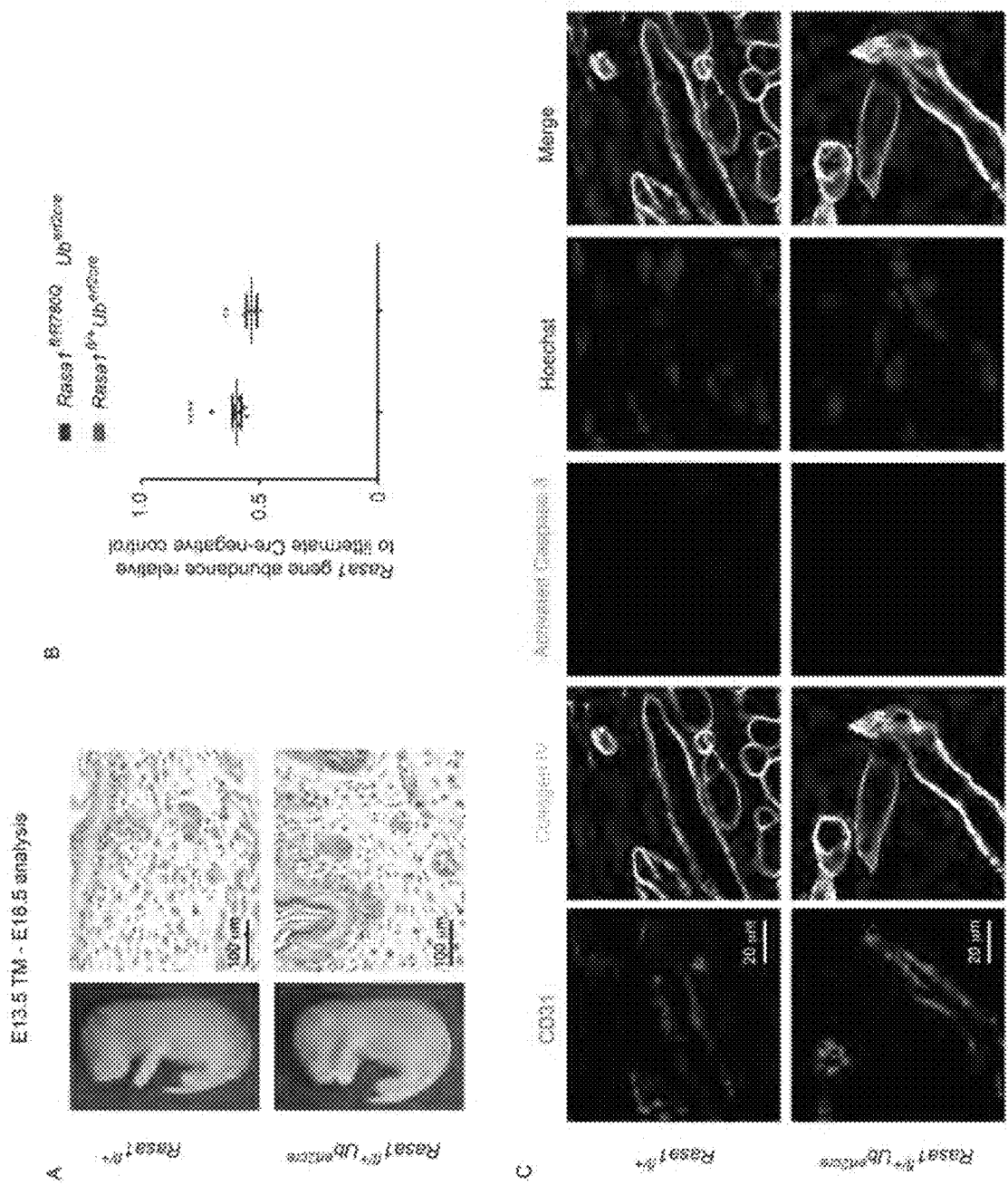
FIG. 29, panels A-C. Absence of vascular phenotypes in induced Rasa1 heterozygous embryos. Littermate Rasa1$^{fl/+}$ and Rasa1$^{fl/+}$ Ub$^{ert2cre}$ embryos were administered TM on E13.5 and harvested at E18.5. (A) Gross appearance of embryos. Note absence of hemorrhage and edema in Rasa1$^{fl/+}$ Ub$^{ert2cre}$ embryos that was confirmed by H&E staining of skin sections. (B) Rasa1 gene abundance of embryos in (A) and FIG. 9 was determined by real time qPCR using tail genomic DNA as a template. Results are expressed as mean+/−1 SEM of Rasa1 gene abundance relative to Rasa1$^{fl/R780Q}$ or Rasa1$^{fl/+}$ embryos in the same litter (mean value). n=7 and 3 for Rasa1$^{fl/R780Q}$ Ub$^{ert2cre}$ and Rasa1$^{fl/+}$ Ub$^{ert2cre}$ embryos respectively. (C) Skin sections from embryos in (A) were stained with Hoechst and antibodies against CD31, collagen IV and activated caspase 3. Note normal deposition of collagen IV in vascular BM and absence of BEC apoptosis in Rasa1$^{fl/+}$ Ub$^{ert2cre}$ embryos. , P<0.01; **P<0.0001, Student's 1-sample t-test.

Like Rasa1$^{fl/fl}$ Ub$^{ert2cre}$ embryos (FIG. 1), Rasa1$^{fl/R780Q}$ Ub$^{ert2cre}$ embryos showed extensive hemorrhage and edema at E18.5 (Table 1 and FIG. 9A). Furthermore, this was associated with accumulation of collagen IV in EC and EC apoptosis (FIG. 9B). In contrast, the same vascular phenotypes were not apparent in E18.5 Rasa1$^{fl/+}$ Ub$^{ert2cre}$ embryos induced to lose one Rasa1 gene copy by administration of TM at E13.5 (FIG. 29). Thus, vascular phenotypes that result following loss of RASA1 during developmental angiogenesis are consequent to loss of an ability of RASA1 to regulate Ras and not loss of a Ras-independent function for this molecule.

Figure 10:
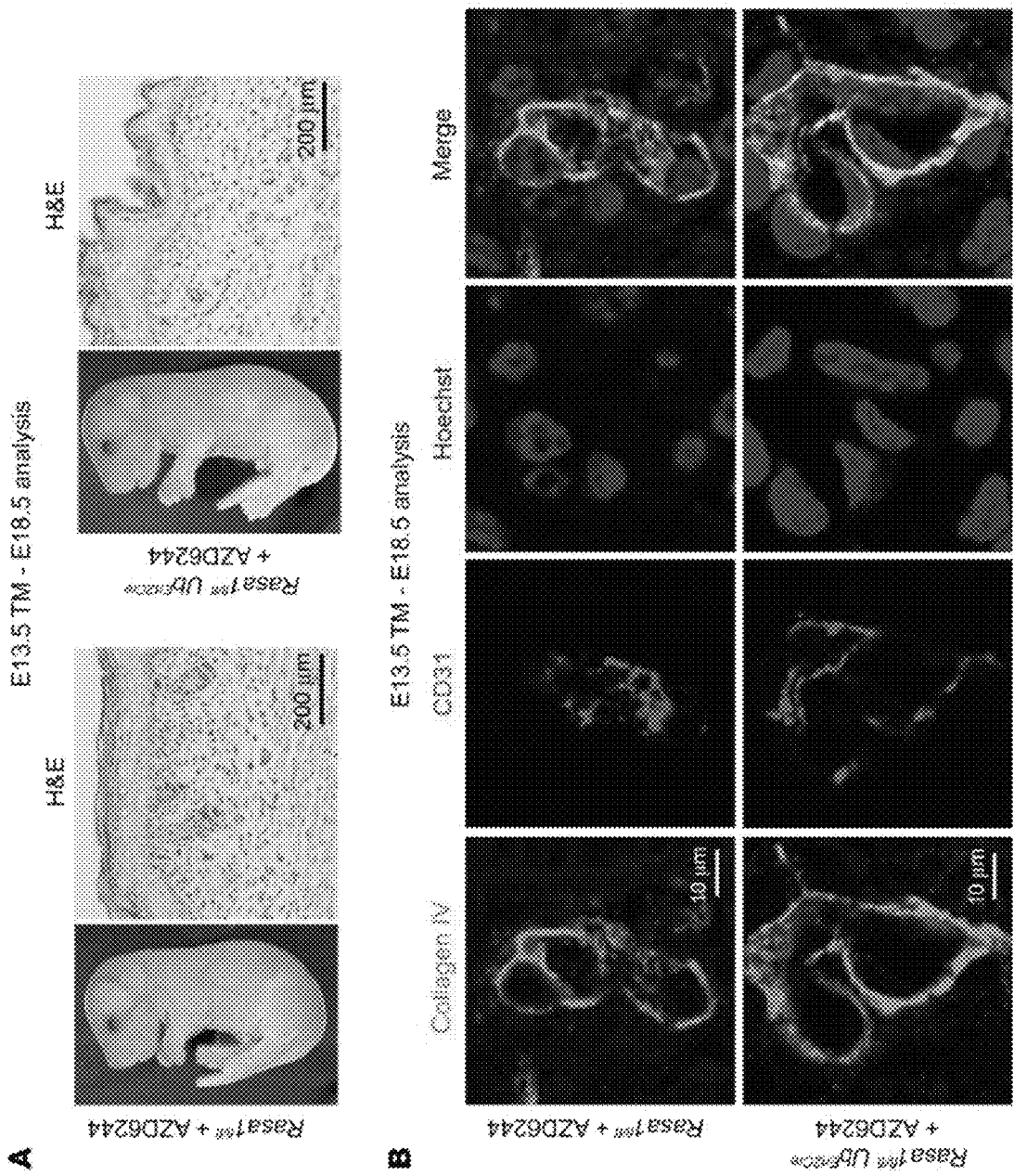
FIG. 10, panels A-B. An inhibitor of MAPK signaling blocks the development of BV abnormalities resulting from induced loss of RASA1 during developmental angiogenesis. TM was administered to littermate Rasa1$^{fl/fl}$ and Rasa1$^{fl/fl}$ Ub$^{ert2cre}$ embryos at E13.5. The MAPK pathway inhibitor, AZD6244, was co-administered with the TM and was also administered to embryos on the following two days afterward. Embryos were harvested at E18.5. (A) Gross appearance of embryos. Note absence of hemorrhage and edema in Rasa1$^{fl/fl}$ Ub$^{ert2cre}$ embryos that was confirmed by H&E staining of skin sections. (B) Skin sections were stained with Hoechst and antibodies against collagen IV and CD31. Note normal deposition of collagen IV in vascular BM in Rasa1$^{fl/fl}$ Ub$^{ert2cre}$ embryos.
Figure 30:
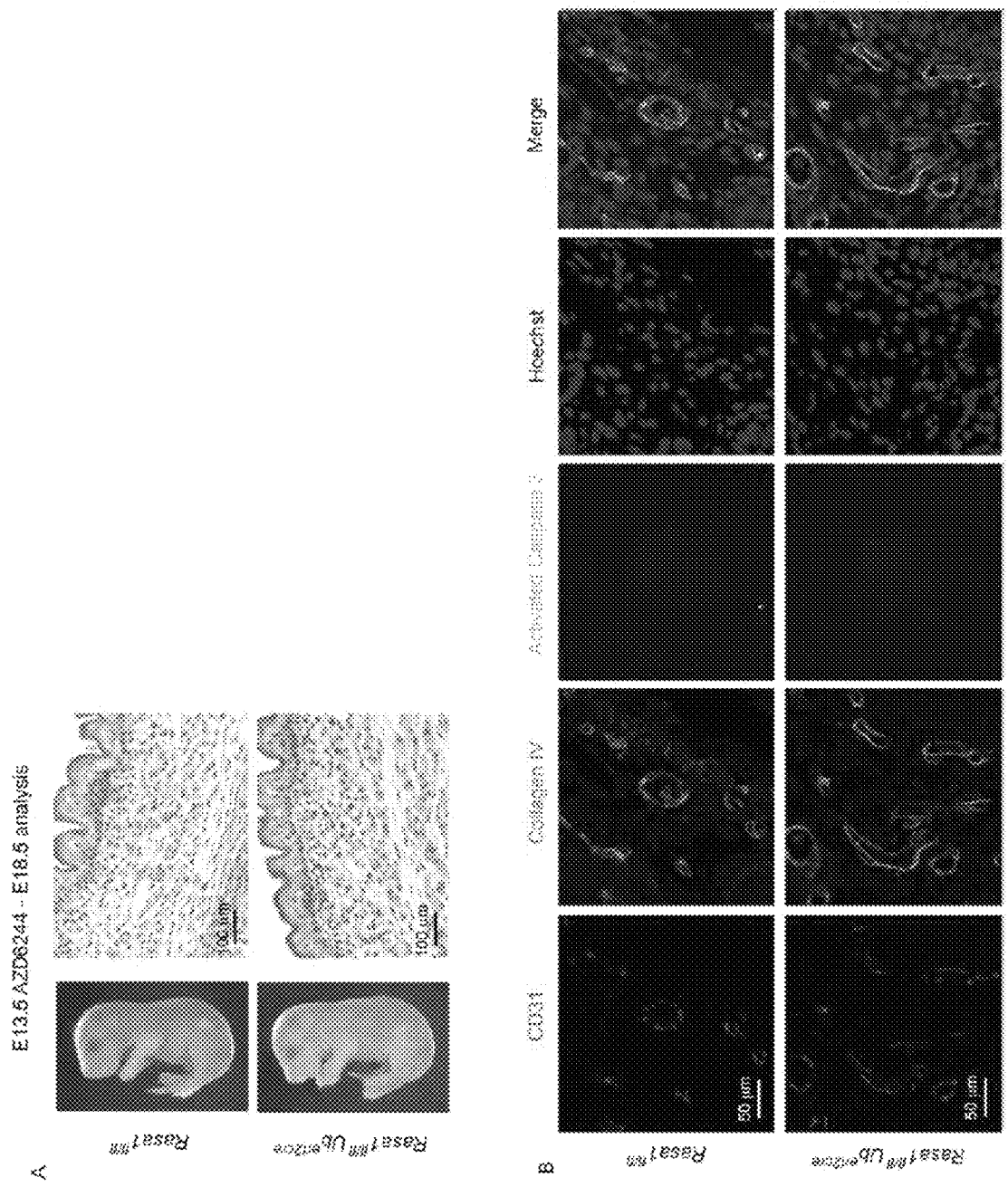
FIG. 30, panels A-B. Absence of vascular phenotypes in embryos treated with AZD6244 alone. Littermate Rasa1$^{fl/fl}$ and Rasa1$^{fl/fl}$ Ub$^{ert2cre}$ embryos were administered AZD6244 at E13.5 and every day thereafter until embryo harvest at E18.5. (A) Gross appearance of embryos. Note absence of vascular phenotypes confirmed by H&E staining of skin sections. (n=1 Rasa1$^{fl/fl}$ and n=4 Rasa1$^{fl/fl}$ Ub$^{ert2cre}$ embryos). (B) Skin sections were stained with Hoechst and antibodies against CD31, collagen IV and activated caspase 3. Note normal deposition of collagen IV in vascular BM and absence of BEC apoptosis in Rasa1$^{fl/fl}$ and Rasa1$^{fl/fl}$ Ub$^{ert2cre}$ embryos.

Two well-characterized signaling pathways downstream of activated Ras are the MAPK and PI3K pathways. Experiments were conducted during development of embodiments herein to determine whether augmented activation of either or both pathways was responsible for BV phenotypes upon loss of RASA1 during developmental angiogenesis. To address this, Rasa1$^{fl/fl}$ mice carrying Rasa1$^{fl/fl}$ and Rasa1$^{fl/fl}$ Ub$^{ert2cre}$ embryos were administered TM at E13.5 together with a MAPK pathway inhibitor (AZD6244) (Refs. 43-44; incorporated by reference in their entireties) or a PI3K inhibitor (PX-866) (Ref. 45. incorporated by reference in its entirety) that were also administered to mice on the subsequent two days following the TM injection. As assessed at E18.5, the MAPK pathway inhibitor rescued the block in collagen IV export from BEC and prevented the development of hemorrhage in Rasa1$^{fl/fl}$ Ub$^{ert2cre}$ embryos that is observed after TM treatment alone (Table 1 and FIG. 10, compare FIG. 1). AZD6244 did not affect TM-induced Rasa1 gene deletion efficiency in Rasa1$^{fl/fl}$ Ub$^{ert2cre}$ embryos (FIG. 26) and, by itself, AZD6244 did not induce any vascular abnormalities (FIG. 30). In contrast, the PI3K inhibitor was unable to rescue BEC export of collagen IV and apoptosis and extensive cutaneous hemorrhage was evident at E18.5. These findings show that dysregulated Ras-MAPK signaling rather than dysregulated Ras-PI3K signaling drives BV phenotypes upon RASA1 loss during developmental angiogenesis.

RASA1 is Required for Normal Retinal Angiogenesis in Newborns.

No spontaneous BV abnormalities have been noted in mice in which the Rasa1 gene is disrupted after E15.5 (Refs.

Figures 11A, 11B:
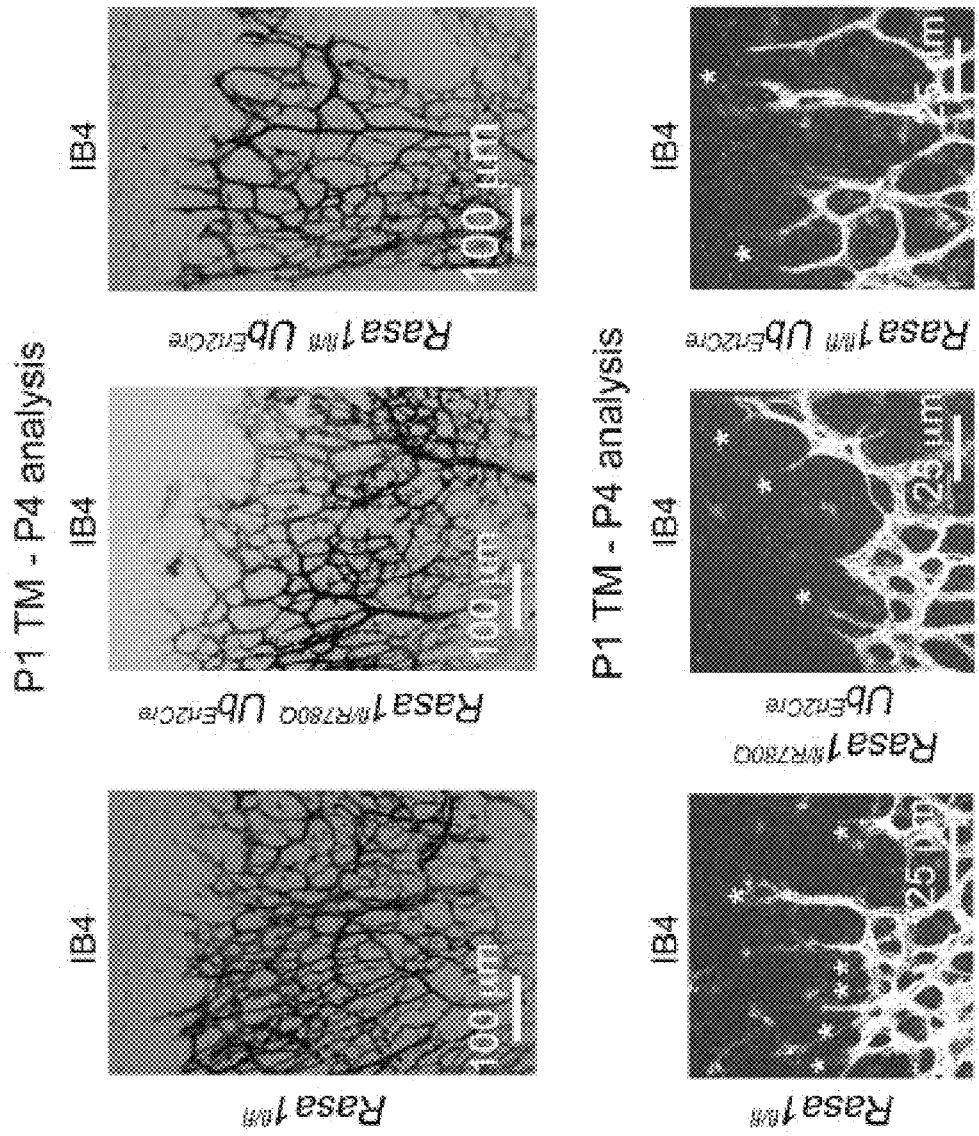
FIGS. 11A-D. Impaired retinal angiogenesis in neonatal induced RASA1 R780Q and RASA1-deficient mice. TM was administered to littermate Rasa1$^{fl/fl}$, Rasa1$^{fl/R780Q}$Ub$^{ert2cre}$ and Rasa1$^{fl/fl}$ Ub$^{ert2cre}$ mice at P1 and retinas were harvested at P4. (A-C) Retinas were stained with isolectin B4 (IB4) to identify BV and anti-collagen IV (C). (A,B) Representative low (A) and high (B) power images of IB4 staining are shown. *, filopodia at the vascular front. (C) High power images (left) to show collagen IV accumulation in BEC of Rasa1$^{fl/R780Q}$Ub$^{ert2cre}$ and Rasa1$^{fl/fl}$ Ub$^{ert2cre}$ retinas (arrows) and lower power images (right) to illustrate empty collagen IV sleeves in Rasa1$^{fl/R780Q}$Ub$^{ert2cre}$ and Rasa1$^{fl/fl}$ Ub$^{ert2cre}$ retinas (arrows). (D) Graphs show mean+/−1 SEM of the number of branch points from veins (n=6 retinas each genotype), the percentage coverage of retinas with BEC per field (n=5-7 retinas each genotype), the number of filopodia per vascular field (n=7-10 retinas each genotype), and the number of empty collagen sleeves per field (n=5-8 retinas each genotype). , $P<0.01$; *$P<0.001$,****, $P<0.0001$, one-way ANOVA test with a Dunnett's multiple comparisons post-hoc test.
Figure 11C:
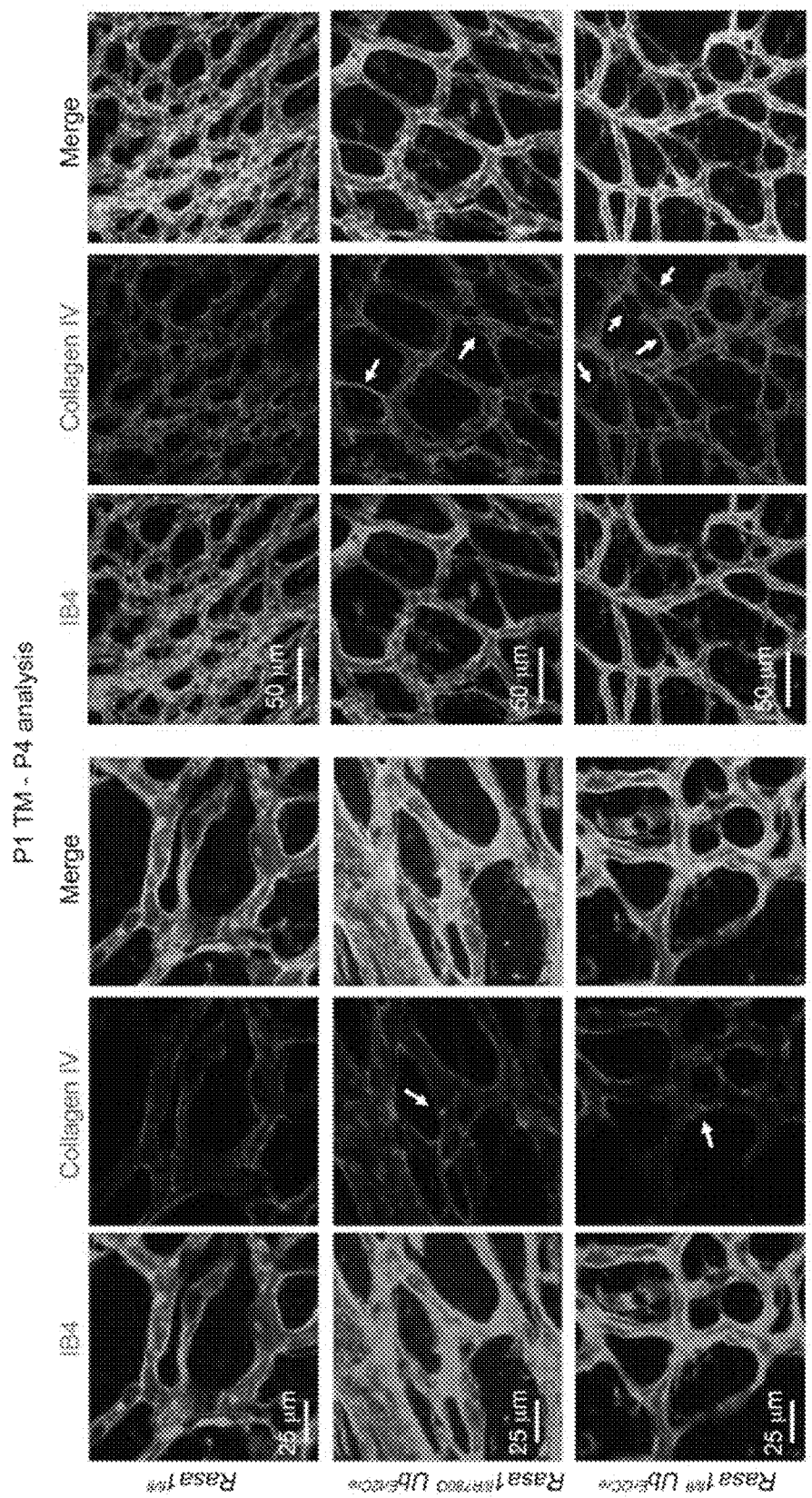
Figure 11D:
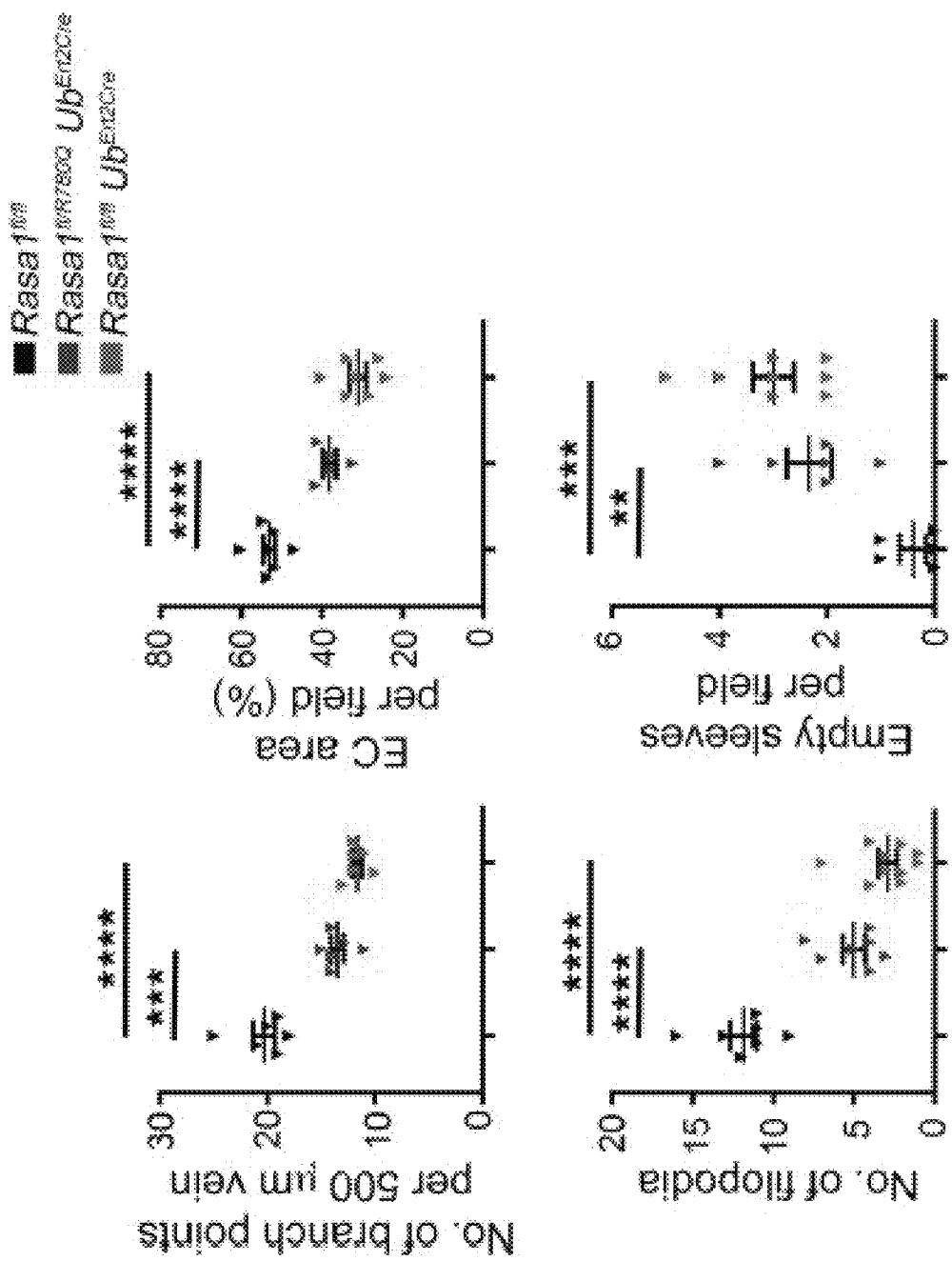
Figure 31:
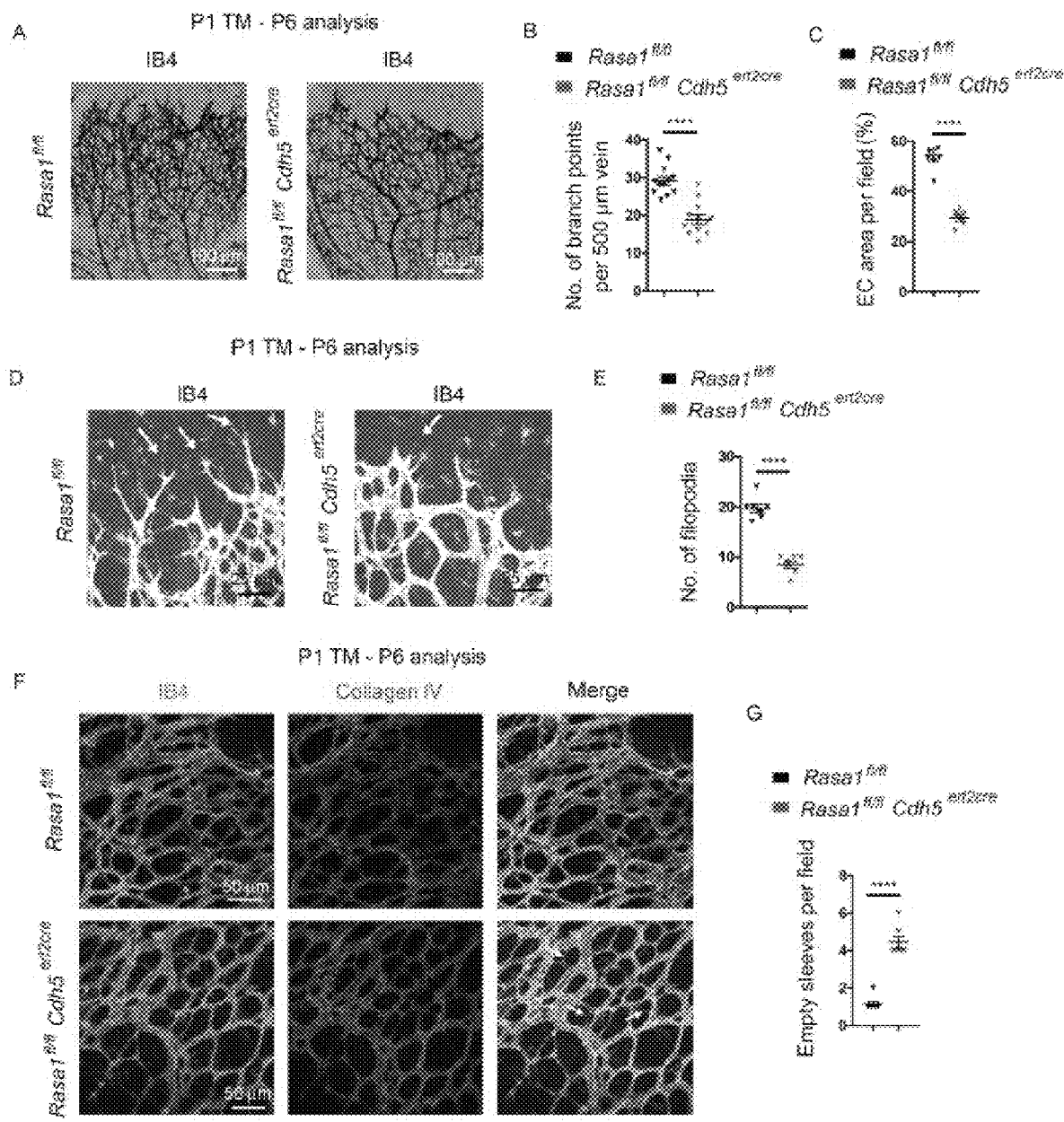
FIG. 31, panels A-G. Impaired retinal angiogenesis in neonatal induced RASA1-deficient mice. TM was administered to littermate Rasa1$^{fl/fl}$ and Rasa1$^{fl/fl}$ Cdh5$^{ert2cre}$ mice at P1 and retinas were harvested at P6. (A-E) Retinas were stained with isolectin B4 (IB4) to identify BV. (A) Shown are representative images of IB4 staining. (B) Graph shows mean+/−1 SEM of the number of branch points from veins (n=12 retinas each genotype). (C) Graph shows mean+/−1 SEM of percentage coverage of retinas with BEC (n=7 retinas each genotype). (D) Representative higher power images of IB4 staining showing filopodia of BEC at edge of vascular fields (arrows). (E) Graph shows mean+/−1 SEM of the number of filopodia per field (n=7 retinas each genotype). (F) Retinas were stained with IB4 and an antibody against collagen IV. Shown are representative images of staining. Note empty collagen IV sleeves in retinas of Rasa1$^{fl/fl}$ Cdh5$^{ert2cre}$ mice (arrows). (G) Graph shows mean+/−1 SEM of the number of empty collagen sleeves (n=7 retinas each genotype). ****, P<0.0001, Student's 2-sample t-test.
Figure 32:
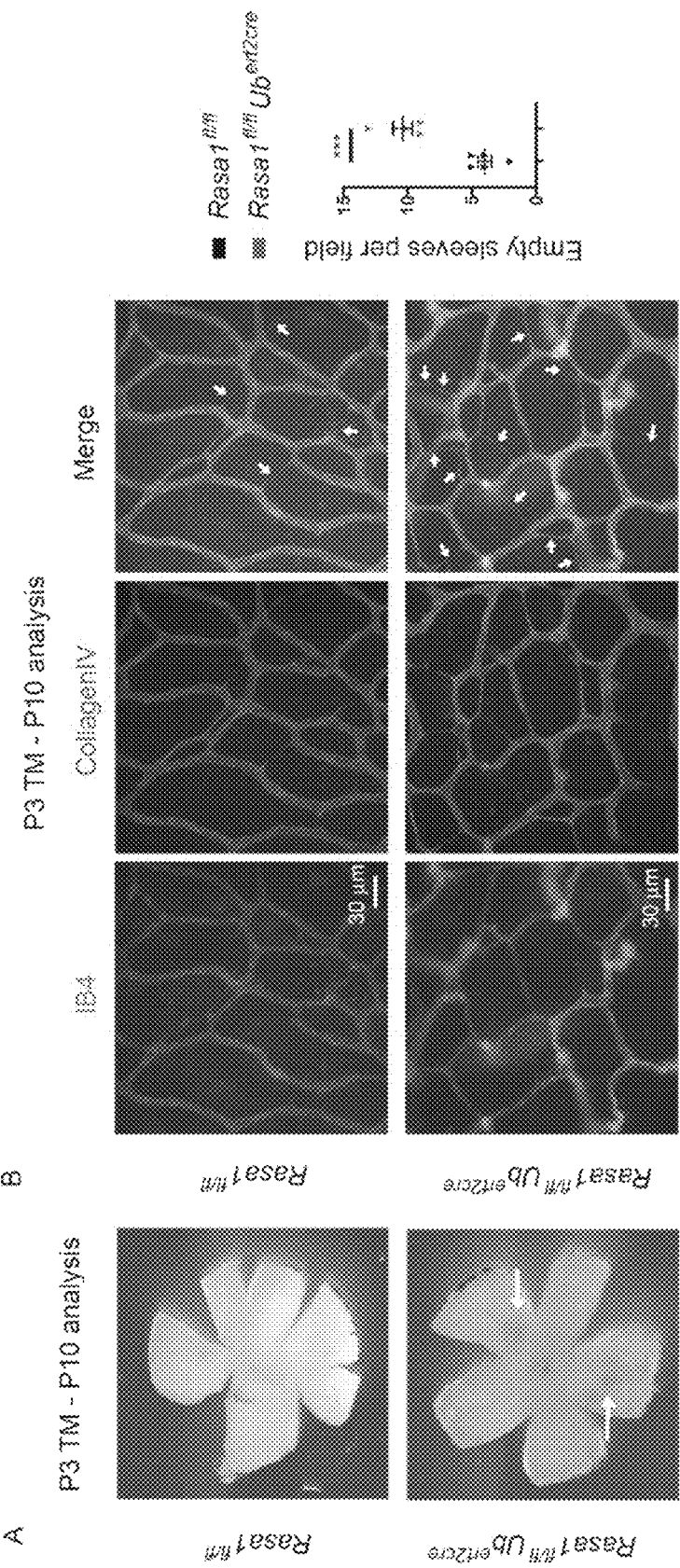
FIG. 32, panels A-B. Hemorrhage and impaired angiogenesis in retinas of neonatal induced RASA1-deficient mice. TM was administered to littermate Rasa1$^{fl/fl}$ and Rasa1$^{fl/fl}$ Ub$^{ert2cre}$ mice at P3 and retinas were harvested at P10. (A) Gross appearance of representative retinas. Note areas of hemorrhage in retinas of Rasa1$^{fl/fl}$ Ub$^{ert2cre}$ mice (arrows). (B) Retinas were stained with isolectin B4 (IB4) and an antibody against collagen IV. Collagen IV empty sleeves are indicated (arrows). Graph at right shows mean+/−1 SEM of the number of empty collagen sleeves (n=5 retinas each genotype). ***, P<0.001, Student's 2-sample t-test.

16-17; incorporated by reference in their entireties). The majority of the collagen IV in vascular BM is deposited during developmental angiogenesis. Collagen IV is recognized to be one of the most stable proteins in the animal kingdom (Ref. 38; incorporated by reference in its entirety). Thus, in postnatal life, continued high rate synthesis of collagen IV would be unnecessary in order for BEC to remain attached to BM. Nonetheless, in situations where de novo deposition of BM is required, abnormalities of BV function might be expected in RASA1-deficient mice. Two such situations are retinal angiogenesis in newborns and pathological angiogenesis in adults. To examine retinal angiogenesis, TM was administered to littermate Rasa1$^{fl/fl}$ Ub$^{ert2cre}$ and Rasa1$^{fl/R780Q}$ Ub$^{ert2cre}$ mice and cre-negative controls at P1 and examined the retinal vasculature at P4. The extent of new vessel growth in TM-treated Rasa1$^{fl/fl}$ Ub$^{ert2cre}$ and Rasa1$^{fl/R780Q}$ Ub$^{ert2cre}$ mice was significantly less than in Rasa1$^{fl/fl}$ controls as assessed by the number of vessel branch points and percentage coverage of the retina with BEC (FIG. 11A,D). Furthermore, the number of BEC filopodia, which are a feature of sprouting angiogenesis, at the periphery of the vascular coverage area, was reduced in the Rasa1$^{fl/fl}$ Ub$^{ert2cre}$ and Rasa1$^{fl/R780Q}$ Ub$^{ert2cre}$ mice (FIG. 11B,D). Intracellular accumulation of collagen IV could be detected in retinal BEC of Rasa1$^{fl/fl}$ Ub$^{ert2cre}$ and Rasa1$^{fl/R780Q}$ Ub$^{ert2cre}$ mice but not Rasa1$^{fl/fl}$ control mice at P4 (FIG. 11C). In addition, in Rasa1$^{fl/fl}$ Ub$^{ert2cre}$ and Rasa1$^{fl/R780Q}$ Ub$^{ert2cre}$ retinas, the number of "empty sleeves" that comprised of a thin tube of collagen IV with no BEC was substantially increased compared to controls (FIG. 11C,D). This latter observation is consistent with impaired deposition of collagen IV into BM and BEC death during retinal angiogenesis in the absence of catalytically-active RASA1. Decreased angiogenesis was also observed in retinas of Rasa1$^{fl/fl}$ Cdh5$^{ert2cre}$ mice administered TM at P1 and analyzed at P6 (FIG. 31), confirming an EC-intrinsic role for RASA1 in retinal angiogenesis. In Rasa1$^{fl/fl}$ Ub$^{ert2cre}$ mice administered TM at P3, areas of hemorrhage were observed in retinas at P10 (FIG. 32).

Rasa1 is Required for Pathological Angiogenesis in Adults.

Figure 33:
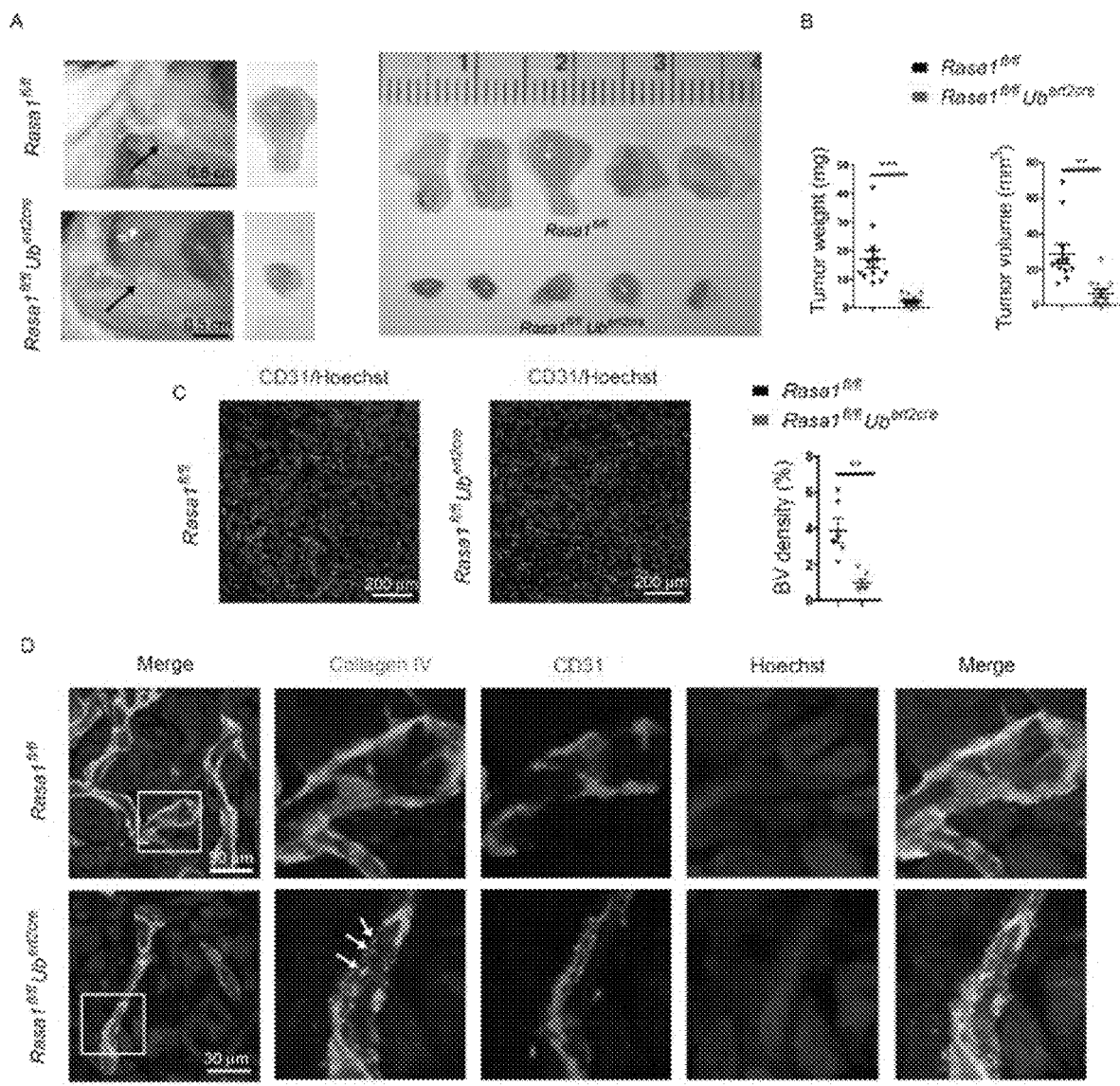
FIG. 33, panels A-D. Disruption of Rasa1 in adult mice inhibits pathological angiogenesis in an ovarian tumor model. Littermate adult female Rasa1$^{fl/fl}$ and Rasa1$^{fl/fl}$ Ub$^{ert2cre}$ mice were administered TM before subcutaneous injection of ID8 ovarian tumor cells into flanks one week later. After 6 weeks, mice were euthanized and tumor growth was assessed. (A) Representative images of tumors before and after excision from indicated recipients are shown. (B) Graphs show mean+/−1 SEM of tumor weight and volume (n=11 tumors from mice of each genotype). (C) Sections of tumors were stained with Hoechst and CD31 antibodies. Representative images show reduced BV density in tumors from Rasa1$^{fl/fl}$ Ub$^{ert2cre}$ mice. Graph at right shows mean+/−1 SEM of percentage coverage of fields with BV (n=6 tumors from mice of each genotype). (D) Tumors were stained with Hoechst and antibodies against collagen IV and CD31. Representative images are shown. Note accumulation of collagen IV in BEC of tumors from Rasa1$^{fl/fl}$ Ub$^{ert2cre}$ mice. , P<0.01; *P<0.001, Student's 2-sample t-test.
Figure 34:
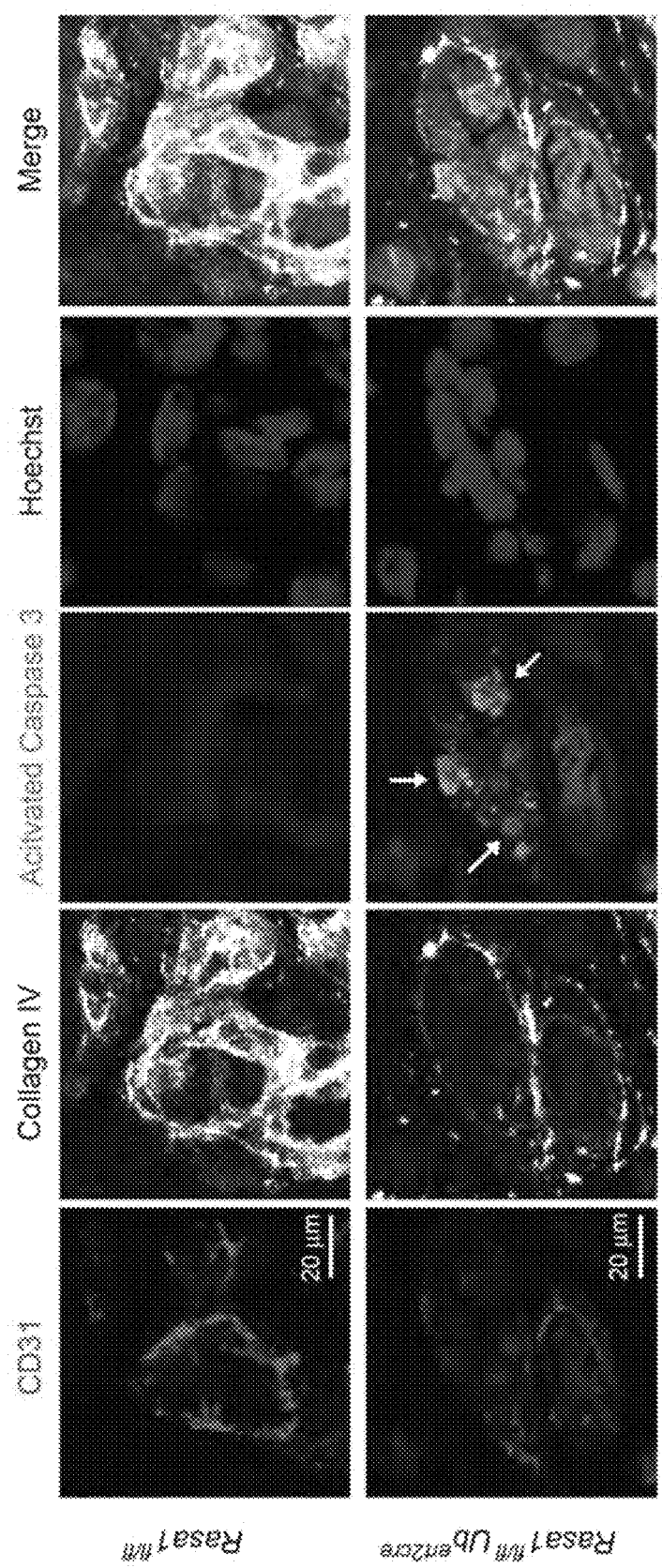
FIG. 34. Accumulation of collagen IV in BEC and BEC apoptosis in BV of ID8 tumors from induced RASA1-deficient mice. ID8 tumors from Rasa1$^{fl/fl}$ and Rasa1$^{fl/fl}$ Ub$^{ert2cre}$ mice in FIG. 21 were sectioned and stained with Hoechst and antibodies against CD31, collagen IV and activated caspase 3. Note accumulation of collagen IV in BEC and BEC apoptosis (arrows) in tumors from Rasa1$^{fl/fl}$ Ub$^{ert2cre}$ mice.

To examine pathological angiogenesis, an ID8 ovarian tumor model was used (Ref. 46; incorporated by reference in its entirety). Adult littermate female Rasa1$^{fl/fl}$ and Rasa1$^{fl/fl}$ Ub$^{ert2cre}$ mice were administered TM and 1 week later were injected in the flanks with ID8 tumor cells. Growth of injected ID8 tumor cells in female recipients is strictly dependent upon host BV angiogenesis. Six weeks after injection, ID8 tumors were substantially smaller in Rasa1$^{fl/fl}$ Ub$^{ert2cre}$ mice compared to controls (FIGS. 33A and B). Upon histological analysis, the density of BV in tumors from Rasa1$^{fl/fl}$ Ub$^{ert2cre}$ mice was found to be substantially less than in tumors from control mice indicating that reduced tumor growth in the former was a result of impaired BV tumor angiogenesis (FIG. 33C). Further analysis of BV in tumors of Rasa1$^{fl/fl}$ Ub$^{ert2cre}$ mice revealed intracellular accumulation of collagen IV in BEC and BEC apoptosis (FIGS. 33 and 34). The experiments indicate that blocked export of collagen IV from BEC and BEC apoptosis account for an impaired pathological angiogenesis response in the absence of RASA1.

Figure 12E:
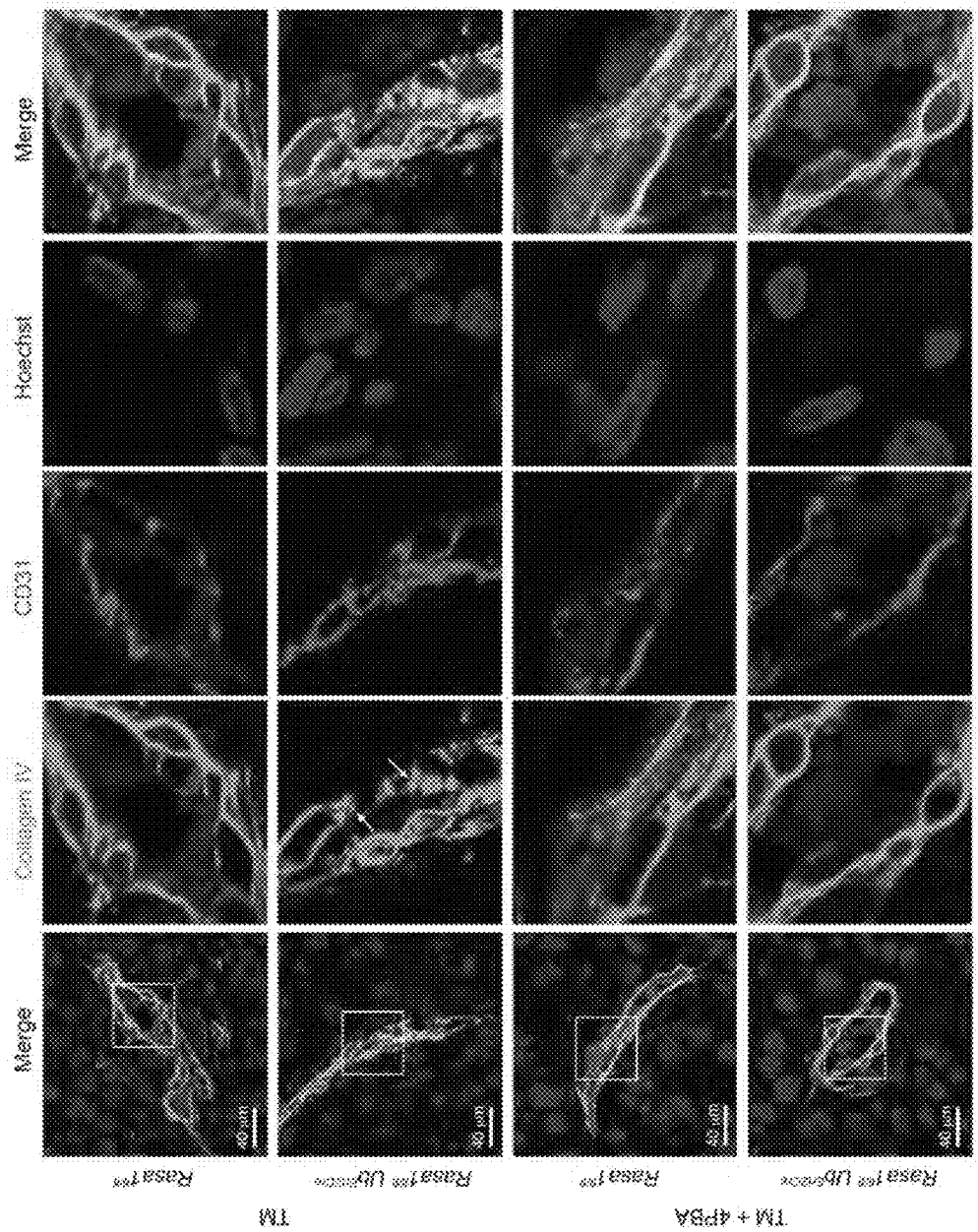
Figure 35:
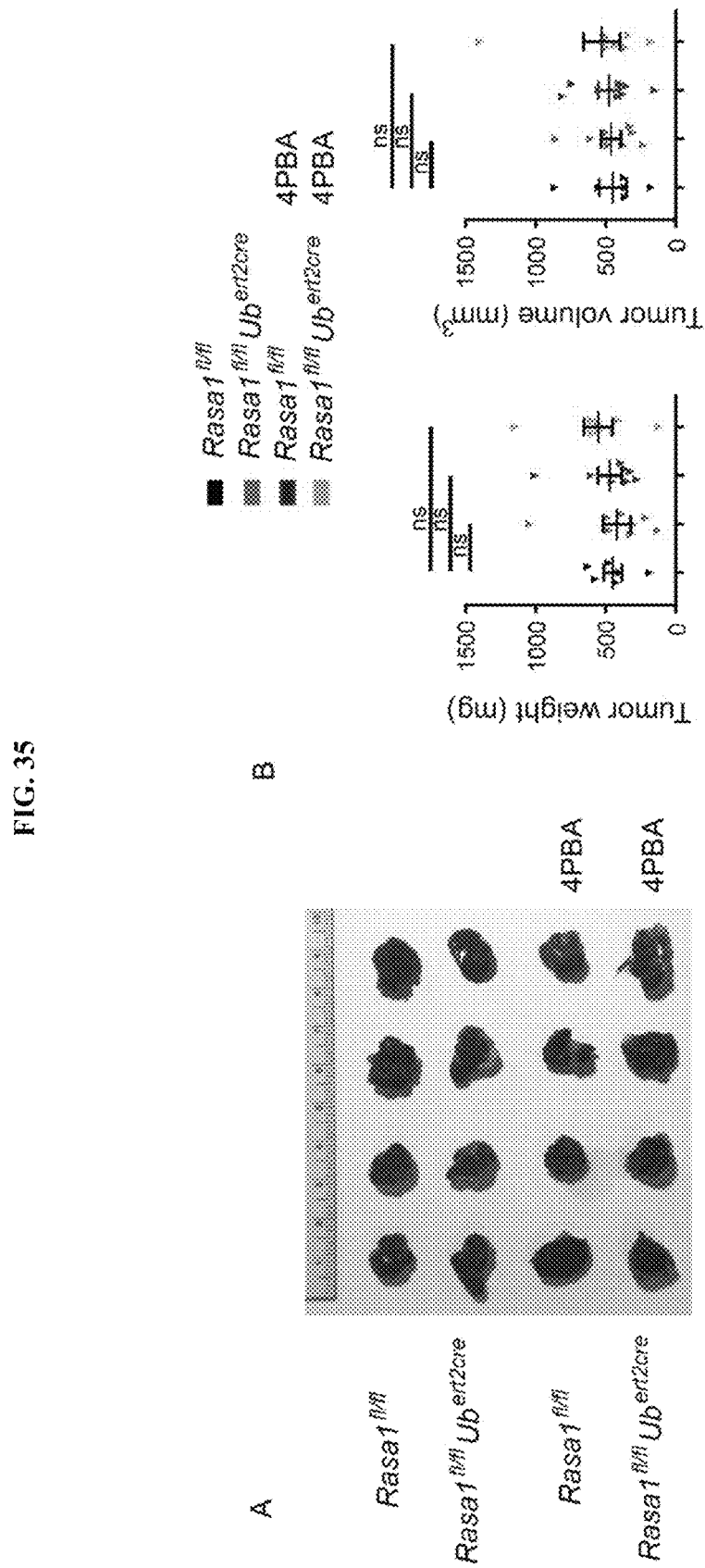
FIG. 35, panels A-B. Influence of 4PBA alone upon B16 melanoma growth. Littermate adult Rasa1$^{fl/fl}$ and Rasa1$^{fl/fl}$ Ub$^{ert2cre}$ mice were injected into flanks subcutaneously with B16 melanoma cells. 4PBA was administered to some mice at the same time as B16 melanoma cells and every day thereafter for the duration of the experiment. After 13 days, mice were euthanized and tumors were harvested. (A) Representative images of harvested tumors are shown. (B)

B16 cells grow more rapidly than ID8 cells in vivo, thus permitting more ready analysis of the effect of drugs that promote collagen IV folding such as 4PBA. B16 were injected into the flanks of littermate TM-treated Rasa1$^{fl/fl}$ and Rasa1$^{fl/fl}$ Ub$^{ert2cre}$ mice. Some mice were also injected with 4BPA at the same time that tumor cells were injected and additional 4PBA was administered to mice everyday thereafter. After 13 days, tumor growth and angiogenesis was assessed (FIG. 12). As with ID8 tumor growth, B16 growth was inhibited in TM-treated Rasa1$^{fl/fl}$ Ub$^{ert2cre}$ mice compared to Rasa1$^{fl/fl}$ controls (FIGS. 12A and B). In addition, the reduced growth of B16 tumors was also associated with impaired intra-tumoral BV angiogenesis and collagen IV accumulation in BEC (FIG. 12C-E). 4PBA restored the growth of B16 cells in TM-treated Rasa1$^{fl/fl}$ Ub$^{ert2cre}$ recipients and this was associated with normal export of collagen IV from BEC and BV angiogenesis (FIG. 12). In contrast, 4PBA had no influence upon B16 growth in TM-treated Rasa1$^{fl/fl}$ mice (FIG. 12) or when administered alone to Rasa1$^{fl/fl}$ and Rasa1$^{fl/fl}$ Ub$^{ert2cre}$ mice that had not previously been injected with TM (FIG. 35). These findings are consistent with the notion that impaired pathological angiogenesis and tumor growth in RASA1-deficient adult mice is also a consequence of an inability of BEC to export collagen IV for deposition in newly-forming basement membranes.

Example 2

Experiments conducted during development of embodiments herein demonstrated that loss of EPHB4 in BEC inhibits developmental angiogenesis, and that loss of EPHB4 results in impaired targeting of RASA1 to Ras and dysregulated Ras signaling resulting in increased PLOD2 that prevents normal folding and export of collagen IV.

EPHB4 mutations in CM-AVM are inactivating and. CM-AVM resulting from RASA1 or EPHB4 mutations has been designated CM-AVM1 and CM-AVM2 respectively. CM-AVM1 and CM-AVM2 are clinically indistinguishable with the exception of the additional occurrence of telangiectasias in CM-AVM2 (ref. 4A; incorporated by reference in its entirety). With the use of conditional RASA1-deficient and EPHB4-deficient mouse models, experiments conducted during development of embodiments herein have demonstrated that RASA1 and EPHB4 are required for developmental angiogenesis because they are necessary for the export of collagen IV from BEC and deposition of collagen IV in vascular BM. In the absence of RASA1, collagen IV is retained within the ER of BEC resulting in BEC apoptosis.

Example 3

Experiments conducted during development of embodiments herein demonstrate that inducible embryonic disruption of the EphB4 receptor in mice results in the same phenotype as inducible disruption of Rasa1, further demonstrating the relationship between EphB4 and Rasa1. Induced disruption of the EphB4 gene in embryonic mice results in the same phenotype of blood vascular hemorrhage associated with endothelial cell apoptosis (FIG. 39A-B), as observed in induced RASA1-deficient embryos. The induced EphB4-deficient embryos exhibit clear evidence of collagen IV accumulation in blood vascular endothelial cells (FIG. 40), again, as observed in induced RASA1-deficient embryos.

REFERENCES

The following references, some of which are cited above by number, are herein incorporated by reference in their entireties.

1. Eerola I, Boon L M, Mulliken J B, Burrows P E, Dompmartin A, Watanabe S, Vanwijck R, and Vikkula M. Capillary malformation-arteriovenous malformation, a new clinical and genetic disorder caused by RASA1 mutations. *Am J Hum Genet.* 2003; 73(6):1240-9.
2. Revencu N, Boon L M, Mendola A, Cordisco M R, Dubois J, Clapuyt P, Hammer F, Amor D J, Irvine A D, Baselga E, et al. RASA1 mutations and associated phenotypes in 68 families with capillary malformation-arteriovenous malformation. *Hum Mutat.* 2013; 34(12):1632-41.
3. Revencu N, Boon L M, Mulliken J B, Enjolras O, Cordisco M R, Burrows P E, Clapuyt P, Hammer F, Dubois J, Baselga E, et al. Parkes Weber syndrome, vein of Galen aneurysmal malformation, and other fast-flow vascular anomalies are caused by RASA1 mutations. *Hum Mutat.* 2008; 29(7):959-65.
4. Burrows P E, Gonzalez-Garay M L, Rasmussen J C, Aldrich M B, Guilliod R, Maus E A, Fife C E, Kwon S, Lapinski P E, King P D, et al. Lymphatic abnormalities are associated with RASA1 gene mutations in mouse and man. *Proc Natl Acad Sci USA.* 2013.
5. de Wijn R S, Oduber C E, Breugem C C, Alders M, Hennekam R C, and van der Horst C M. Phenotypic variability in a family with capillary malformations caused by a mutation in the RASA1 gene. *Eur J Med Genet.* 2012; 55(3):191-5.
6. Macmurdo C F, Wooderchak-Donahue W, Bayrak-Toydemir P, Le J, Wallenstein M B, Milla C, Teng J M, Bernstein J A, and Stevenson D A. RASA1 somatic mutation and variable expressivity in capillary malformation/arteriovenous malformation (CM/AVM) syndrome. *Am J Med Genet A.* 2016; 170(6):1450-4.
7. Sevick-Muraca E M, and King P D. Lymphatic vessel abnormalities arising from disorders of Ras signal transduction. *Trends Cardiovasc Med.* 2014; 24(3):121-7.
8. Buday L, and Downward J. Many faces of Ras activation. *Biochim Biophys Acta.* 2008; 1786(2):178-87.
9. Wennerberg K, Rossman K L, and Der C J. The Ras superfamily at a glance. *J Cell Sci.* 2005; 118(Pt 5):843-6.
10. King P D, Lubeck B A, and Lapinski P E. Nonredundant functions for Ras GTPase-activating proteins in tissue homeostasis. *Sci Signal.* 2013; 6(264):rel.
11. Lapinski P E, Doosti A, Salato V, North P, Burrows P E, and King P D. Somatic second hit mutation of RASA1 in vascular endothelial cells in capillary malformation-arteriovenous malformation. *Eur J Med Genet.* 2018; 61(1):11-6.
12. Amyere M, Revencu N, Helaers R, Pairet E, Baselga E, Cordisco M, Chung W, Dubois J, Lacour J P, Martorell L, et al. Germline Loss-of-Function Mutations in EPHB4 Cause a Second Form of Capillary Malformation-Arteriovenous Malformation (CM-AVM2) Deregulating RAS-MAPK Signaling. *Circulation.* 2017; 136(11):1037-48.
13. Kawasaki J, Aegerter S, Fevurly R D, Mammoto A, Mammoto T, Sahin M, Mably J D, Fishman S J, and Chan J. RASA1 functions in EPHB4 signaling pathway to suppress endothelial mTORC1 activity. *J Clin Invest.* 2014; 124(6):2774-84.
14. Henkemeyer M, Rossi D J, Holmyard D P, Puri M C, Mbamalu G, Harpal K, Shih T S, Jacks T, and Pawson T. Vascular system defects and neuronal apoptosis in mice lacking ras GTPase-activating protein. *Nature.* 1995; 377 (6551):695-701.
15. Lubeck B A, Lapinski P E, Bauler T J, Oliver J A, Hughes E D, Saunders T L, and King P D. Blood vascular abnormalities in Rasa1(R780Q) knockin mice: implications for the pathogenesis of capillary malformation-arteriovenous malformation. *Am J Pathol.* 2014; 184(12):3163-9.
16. Lapinski P E, Kwon S, Lubeck B A, Wilkinson J E, Srinivasan R S, Sevick-Muraca E, and King P D. RASA1 maintains the lymphatic vasculature in a quiescent functional state in mice. *J Clin Invest.* 2012; 122(2):733-47.
17. Lapinski P E, Lubeck B A, Chen D, Doosti A, Zawieja S D, Davis M J, and King P D. RASA1 regulates the function of lymphatic vessel valves in mice. *J Clin Invest.* 2017; 127(7):2569-85.
18. Udan R S, Culver J C, and Dickinson M E. Understanding vascular development. *Wiley Interdiscip Rev Dev Biol.* 2013; 2(3):327-46.
19. Wang Y, Nakayama M, Pitulescu M E, Schmidt T S, Bochenek M L, Sakakibara A, Adams S, Davy A, Deutsch U, Luthi U, et al. Ephrin-B2 controls VEGF-induced angiogenesis and lymphangiogenesis. *Nature.* 2010; 465 (7297):483-6.
20. Glentis A, Gurchenkov V, and Matic Vignjevic D. Assembly, heterogeneity, and breaching of the basement membranes. *Cell Adh Migr.* 2014; 8(3):236-45.
21. Malhotra V, and Erlmann P. The pathway of collagen secretion. *Annu Rev Cell Dev Biol.* 2015; 31(109-24.
22. Butler J, Watson H R, Lee A G, Schuppe H J, and East J M. Retrieval from the ER-golgi intermediate compartment is key to the targeting of c-terminally anchored ER-resident proteins. *J Cell Biochem.* 2011; 112(12):3543-8.
23. Michel J B. Anoikis in the cardiovascular system: known and unknown extracellular mediators. *Arterioscler Thromb Vasc Biol.* 2003; 23(12):2146-54.
24. Kim I, Xu W, and Reed J C. Cell death and endoplasmic reticulum stress: disease relevance and therapeutic opportunities. *Nat Rev Drug Discov.* 2008; 7(12):1013-30.
25. Oslowski C M, and Urano F. The binary switch between life and death of endoplasmic reticulum-stressed beta cells. *Curr Opin Endocrinol Diabetes Obes.* 2010; 17(2):107-12.
26. Guiraud S, Migeon T, Ferry A, Chen Z, Ouchelouche S, Verpont M C, Sado Y, Allamand V, Ronco P, and Plaisier E. HANAC Col4a1 Mutation in Mice Leads to Skeletal Muscle Alterations due to a Primary Vascular Defect. *Am J Pathol.* 2017; 187(3):505-16.
27. Jeanne M, Jorgensen J, and Gould D B. Molecular and Genetic Analyses of Collagen Type IV Mutant Mouse Models of Spontaneous Intracerebral Hemorrhage Identify Mechanisms for Stroke Prevention. *Circulation.* 2015; 131(18):1555-65.
28. Jeanne M, Labelle-Dumais C, Jorgensen J, Kauffman W B, Mancini G M, Favor J, Valant V, Greenberg S M, Rosand J, and Gould D B. COL4A2 mutations impair COL4A1 and COL4A2 secretion and cause hemorrhagic stroke. *Am J Hum Genet.* 2012; 90(1):91-101.
29. Weng Y C, Sonni A, Labelle-Dumais C, de Leau M, Kauffman W B, Jeanne M, Biffi A, Greenberg S M, Rosand J, and Gould D B. COL4A1 mutations in patients with sporadic late-onset intracerebral hemorrhage. *Ann Neurol.* 2012; 71(4):470-7.
30. Marutani T, Yamamoto A, Nagai N, Kubota H, and Nagata K. Accumulation of type IV collagen in dilated ER leads to apoptosis in Hsp47-knockout mouse embryos via induction of CHOP. *J Cell Sci.* 2004; 117(Pt 24):5913-22.
31. Wilson D G, Phamluong K, Li L, Sun M, Cao T C, Liu P S, Modrusan Z, Sandoval W N, Rangell L, Carano R A, et al. Global defects in collagen secretion in a Mia3/TANGO1 knockout mouse. *J Cell Biol.* 2011; 193(5):935-51.

32. Saito K, and Katada T. Mechanisms for exporting large-sized cargoes from the endoplasmic reticulum. *Cell Mol Life Sci.* 2015; 72(19):3709-20.

33. Unlu G, Levic D S, Melville D B, and Knapik E W. Trafficking mechanisms of extracellular matrix macromolecules: insights from vertebrate development and human diseases. *Int J Biochem Cell Biol.* 2014; 47(57-67.

34. Melville D B, Montero-Balaguer M, Levic D S, Bradley K, Smith J R, Hatzopoulos A K, and Knapik E W. The feelgood mutation in zebrafish dysregulates COPII-dependent secretion of select extracellular matrix proteins in skeletal morphogenesis. *Dis Model Mech.* 2011; 4(6):763-76.

35. Kuo D S, Labelle-Dumais C, Mao M, Jeanne M, Kauffman W B, Allen J, Favor J, and Gould D B. Allelic heterogeneity contributes to variability in ocular dysgenesis, myopathy and brain malformations caused by Col4a1 and Col4a2 mutations. *Hum Mol Genet.* 2014; 23(7):1709-22.

36. Chioran A, Duncan S, Catalano A, Brown T J, and Ringuette M J. Collagen IV trafficking: The inside-out and beyond story. *Dev Biol.* 2017; 431(2):124-33.

37. Ishikawa Y, and Bachinger H P. A molecular ensemble in the rER for procollagen maturation. *Biochim Biophys Acta.* 2013; 1833(11):2479-91.

38. Shoulders M D, and Raines R T. Collagen structure and stability. *Annu Rev Biochem.* 2009; 78(929-58.

39. Mizuno K, Hayashi T, Peyton D H, and Bachinger H P. The peptides acetyl-(Gly-3(S)Hyp-4(R)Hyp)10-NH2 and acetyl-(Gly-Pro-3(S)Hyp)10-NH2 do not form a collagen triple helix. *J Biol Chem.* 2004; 279(1):282-7.

40. Jenkins C L, Bretscher L E, Guzei I A, and Raines R T. Effect of 3-hydroxyproline residues on collagen stability. *J Am Chem Soc.* 2003; 125(21):6422-7.

41. Rose N R, McDonough M A, King O N, Kawamura A, and Schofield C J. Inhibition of 2-oxoglutarate dependent oxygenases. *Chem Soc Rev.* 2011; 40(8):4364-97.

42. Gilkes D M, Chaturvedi P, Bajpai S, Wong C C, Wei H, Pitcairn S, Hubbi M E, Wirtz D, and Semenza G L. Collagen prolyl hydroxylases are essential for breast cancer metastasis. *Cancer Res.* 2013; 73(11):3285-96.

43. Engelman J A, Chen L, Tan X, Crosby K, Guimaraes A R, Upadhyay R, Maira M, McNamara K, Perera S A, Song Y, et al. Effective use of PI3K and MEK inhibitors to treat mutant Kras G12D and PIK3CA H1047R murine lung cancers. *Nat Med.* 2008; 14(12):1351-6.

44. Pratilas C A, and Solit D B. Targeting the mitogen-activated protein kinase pathway: physiological feedback and drug response. *Clin Cancer Res.* 2010; 16(13):3329-34.

45. Courtney K D, Corcoran R B, and Engelman J A. The PI3K pathway as drug target in human cancer. *J Clin Oncol.* 2010; 28(6):1075-83.

46. Su F, Kozak K R, Imaizumi S, Gao F, Amneus M W, Grijalva V, Ng C, Wagner A, Hough G, Farias-Eisner G, et al. Apolipoprotein A-I (apoA-I) and apoA-I mimetic peptides inhibit tumor development in a mouse model of ovarian cancer. *Proc Natl Acad Sci USA.* 2010; 107(46):19997-20002.

47. Jablonska J, Leschner S, Westphal K, Lienenklaus S, and Weiss S. Neutrophils responsive to endogenous IFN-beta regulate tumor angiogenesis and growth in a mouse tumor model. *J Clin Invest.* 2010; 120(4):1151-64.

48. Chang L, and Karin M. Mammalian MAP kinase signalling cascades. *Nature.* 2001; 410(6824):37-40.

49. Fish J E, and Wythe J D. The molecular regulation of arteriovenous specification and maintenance. *Dev Dyn.* 2015; 244(3):391-409.

50. Adams R H, Wilkinson G A, Weiss C, Diella F, Gale N W, Deutsch U, Risau W, and Klein R. Roles of ephrinB ligands and EphB receptors in cardiovascular development: demarcation of arterial/venous domains, vascular morphogenesis, and sprouting angiogenesis. *Genes Dev.* 1999; 13(3):295-306.

51. Gerety S S, Wang H U, Chen Z F, and Anderson D J. Symmetrical mutant phenotypes of the receptor EphB4 and its specific transmembrane ligand ephrin-B2 in cardiovascular development. *Mol Cell.* 1999; 4(3):403-14.

52. Bazigou E, and Makinen T. Flow control in our vessels: vascular valves make sure there is no way back. *Cell Mol Life Sci.* 2013; 70(6):1055-66.

53. Bazigou E, Wilson J T, and Moore J E, Jr. Primary and secondary lymphatic valve development: molecular, functional and mechanical insights. *Microvasc Res.* 2014; 96(38-45.

54. Anand S, Majeti B K, Acevedo L M, Murphy E A, Mukthavaram R, Scheppke L, Huang M, Shields D J, Lindquist J N, Lapinski P E, et al. MicroRNA-132-mediated loss of p120RasGAP activates the endothelium to facilitate pathological angiogenesis. *Nat Med.* 2010; 16(8):909-14.

55. Westenskow P D, Kurihara T, Aguilar E, Scheppke E L, Moreno S K, Wittgrove C, Marchetti V, Michael I P, Anand S, Nagy A, et al. Ras pathway inhibition prevents neovascularization by repressing endothelial cell sprouting. *J Clin Invest.* 2013; 123(11):4900-8.

56. Li Q F, Decker-Rockefeller B, Bajaj A, and Pumiglia K. Activation of Ras in the Vascular Endothelium Induces Brain Vascular Malformations and Hemorrhagic Stroke. *Cell Rep.* 2018; 24(11):2869-82.

57. Nikolaev S I, Vetiska S, Bonilla X, Boudreau E, Jauhiainen S, Rezai Jahromi B, Khyzha N, DiStefano P V, Suutarinen S, Kiehl T R, et al. Somatic Activating KRAS Mutations in Arteriovenous Malformations of the Brain. *N Engl J Med.* 2018; 378(3):250-61.

58. Yamane T, Mitsumata M, Yamaguchi N, Nakazawa T, Mochizuki K, Kondo T, Kawasaki T, Murata S, Yoshida Y, and Katoh R. Laminar high shear stress up-regulates type IV collagen synthesis and down-regulates MMP-2 secretion in endothelium. A quantitative analysis. *Cell Tissue Res.* 2010; 340(3):471-9.

59. Lapinski P E, Bauler T J, Brown E J, Hughes E D, Saunders T L, and King P D. Generation of mice with a conditional allele of the p120 Ras GTPase-activating protein. *Genesis.* 2007; 45(12):762-7.

1A. Eerola I, Boon L M, Mulliken J B, Burrows P E, Dompmartin A, Watanabe S, Vanwijck R, and Vikkula M. Capillary malformation-arteriovenous malformation, a new clinical and genetic disorder caused by RASA1 mutations. *Am J Hum Genet.* 2003; 73(6):1240-9.

2A. Revencu N, Boon L M, Mendola A, Cordisco M R, Dubois J, Clapuyt P, Hammer F, Amor D J, Irvine A D, Baselga E, et al. RASA1 mutations and associated phenotypes in 68 families with capillary malformation-arteriovenous malformation. *Hum Mutat.* 2013; 34(12):1632-41.

3A. Revencu N, Boon L M, Mulliken J B, Enjolras O, Cordisco M R, Burrows P E, Clapuyt P, Hammer F, Dubois J, Baselga E, et al. Parkes Weber syndrome, vein of Galen aneurysmal malformation, and other fast-flow vascular anomalies are caused by RASA1 mutations. *Hum Mutat.* 2008; 29(7):959-65.

4A. Amyere M, Revencu N, Helaers R, Pairet E, Baselga E, Cordisco M, Chung W, Dubois J, Lacour J P, Martorell L, et al. Germline Loss-of-Function Mutations in EPHB4 Cause a Second Form of Capillary Malformation-Arteriovenous Malformation (CM-AVM2) Deregulating RAS-MAPK Signaling. *Circulation.* 2017; 136(11):1037-48.

5A. King P D, Lubeck B A, and Lapinski P E. Nonredundant functions for Ras GTPase-activating proteins in tissue homeostasis. *Sci Signal.* 2013; 6(264):rel.

6A. Buday L, and Downward J. Many faces of Ras activation. *Biochim Biophys Acta.* 2008; 1786(2):178-87.

7A. Wennerberg K, Rossman K L, and Der C J. The Ras superfamily at a glance. *J Cell Sci.* 2005; 118(Pt 5):843-6.

8A. Henkemeyer M, Rossi D J, Holmyard D P, Puri M C, Mbamalu G, Harpal K, Shih T S, Jacks T, and Pawson T. Vascular system defects and neuronal apoptosis in mice lacking ras GTPase-activating protein. *Nature.* 1995; 377 (6551):695-701.

9A. Adams R H, Wilkinson G A, Weiss C, Diella F, Gale N W, Deutsch U, Risau W, and Klein R. Roles of ephrinB ligands and EphB receptors in cardiovascular development: demarcation of arterial/venous domains, vascular morphogenesis, and sprouting angiogenesis. *Genes Dev.* 1999; 13(3):295-306.

10A. Gerety S S, Wang H U, Chen Z F, and Anderson D J. Symmetrical mutant phenotypes of the receptor EphB4 and its specific transmembrane ligand ephrin-B2 in cardiovascular development. *Mol Cell.* 1999; 4(3):403-14.

11A. Burrows P E, Gonzalez-Garay M L, Rasmussen J C, Aldrich M B, Guilliod R, Maus E A, Fife C E, Kwon S, Lapinski P E, King P D, et al. Lymphatic abnormalities are associated with RASA1 gene mutations in mouse and man. *Proc Natl Acad Sci USA.* 2013.

12A. Sevick-Muraca E M, and King P D. Lymphatic vessel abnormalities arising from disorders of Ras signal transduction. *Trends Cardiovasc Med.* 2014; 24(3):121-7.

13A. Lapinski P E, Doosti A, Salato V, North P, Burrows P E, and King P D. Somatic second hit mutation of RASA1 in vascular endothelial cells in capillary malformation-arteriovenous malformation. *Eur J Med Genet.* 2018; 61(1):11-6.

14A. Macmurdo C F, Wooderchak-Donahue W, Bayrak-Toydemir P, Le J, Wallenstein M B, Milla C, Teng J M, Bernstein J A, and Stevenson D A. RASA1 somatic mutation and variable expressivity in capillary malformation/arteriovenous malformation (CM/AVM) syndrome. *Am J Med Genet A.* 2016; 170(6):1450-4.

15A. Kawasaki J, Aegerter S, Fevurly R D, Mammoto A, Mammoto T, Sahin M, Mably J D, Fishman S J, and Chan J. RASA1 functions in EPHB4 signaling pathway to suppress endothelial mTORC1 activity. *J Clin Invest.* 2014; 124(6):2774-84.

16A. Kim I, Ryu Y S, Kwak H J, Ahn S Y, Oh J L, Yancopoulos G D, Gale N W, and Koh G Y. EphB ligand, ephrinB2, suppresses the VEGF- and angiopoietin 1-induced Ras/mitogen-activated protein kinase pathway in venous endothelial cells. *FASEB J.* 2002; 16(9):1126-8.

17A. Udan R S, Culver J C, and Dickinson M E. Understanding vascular development. *Wiley Interdiscip Rev Dev Biol.* 2013; 2(3):327-46.

18A. Fish J E, and Wythe J D. The molecular regulation of arteriovenous specification and maintenance. *Dev Dyn.* 2015; 244(3):391-409.

19A. Wooderchak-Donahue W L, Johnson P, McDonald J, Blei F, Berenstein A, Sorscher M, Mayer J, Scheuerle A E, Lewis T, Grimmer J F, et al. Expanding the clinical and molecular findings in RASA1 capillary malformation-arteriovenous malformation. *Eur J Hum Genet.* 2018; 26(10):1521-36.

20A. Vivanti A, Ozanne A, Grondin C, Saliou G, Quevarec L, Maurey H, Aubourg P, Benachi A, Gut M, Gut I, et al. Loss of function mutations in EPHB4 are responsible for vein of Galen aneurysmal malformation. *Brain.* 2018; 141(4):979-88.

21A. Wooderchak-Donahue W L, Akay G, Whitehead K, Briggs E, Stevenson D A, O'Fallon B, Velinder M, Farrell A, Shen W, Bedoukian E, et al. Phenotype of CM-AVM2 caused by variants in EPHB4: how much overlap with hereditary hemorrhagic telangiectasia (HHT)?*Genet Med.* 2019.

22A. Yu J, Streicher J L, Medne L, Krantz I D, and Yan A C. EPHB4 Mutation Implicated in Capillary Malformation-Arteriovenous Malformation Syndrome: A Case Report. *Pediatr Dermatol.* 2017; 34(5):e227-e30.

23A. Lapinski P E, Kwon S, Lubeck B A, Wilkinson J E, Srinivasan R S, Sevick-Muraca E, and King P D. RASA1 maintains the lymphatic vasculature in a quiescent functional state in mice. *J Clin Invest.* 2012; 122(2):733-47.

24A. Lubeck B A, Lapinski P E, Bauler T J, Oliver J A, Hughes E D, Saunders T L, and King P D. Blood vascular abnormalities in Rasa1(R780Q) knockin mice: implications for the pathogenesis of capillary malformation-arteriovenous malformation. *Am J Pathol.* 2014; 184(12): 3163-9.

25A. Holland S J, Gale N W, Gish G D, Roth R A, Songyang Z, Cantley L C, Henkemeyer M, Yancopoulos G D, and Pawson T. Juxtamembrane tyrosine residues couple the Eph family receptor EphB2/Nuk to specific SH2 domain proteins in neuronal cells. *EMBO J.* 1997; 16(13):3877-88.

26A. Xiao Z, Carrasco R, Kinneer K, Sabol D, Jallal B, Coats S, and Tice D A. EphB4 promotes or suppresses Ras/MEK/ERK pathway in a context-dependent manner: Implications for EphB4 as a cancer target. *Cancer Biol Ther.* 2012; 13(8):630-7.

27A. Glentis A, Gurchenkov V, and Matic Vignjevic D. Assembly, heterogeneity, and breaching of the basement membranes. *Cell Adh Migr.* 2014; 8(3):236-45.

28A. Malhotra V, and Erlmann P. The pathway of collagen secretion. *Annu Rev Cell Dev Biol.* 2015; 31(109-24.

29A. Guiraud S, Migeon T, Ferry A, Chen Z, Ouchelouche S, Verpont M C, Sado Y, Allamand V, Ronco P, and Plaisier E. HANAC Col4a1 Mutation in Mice Leads to Skeletal Muscle Alterations due to a Primary Vascular Defect. *Am J Pathol.* 2017; 187(3):505-16.

30A. Jeanne M, Jorgensen J, and Gould D B. Molecular and Genetic Analyses of Collagen Type IV Mutant Mouse Models of Spontaneous Intracerebral Hemorrhage Identify Mechanisms for Stroke Prevention. *Circulation.* 2015; 131(18):1555-65.

31A. Jeanne M, Labelle-Dumais C, Jorgensen J, Kauffman W B, Mancini G M, Favor J, Valant V, Greenberg S M, Rosand J, and Gould D B. COL4A2 mutations impair COL4A1 and COL4A2 secretion and cause hemorrhagic stroke. *Am J Hum Genet.* 2012; 90(1):91-101.

32A. Marutani T, Yamamoto A, Nagai N, Kubota H, and Nagata K. Accumulation of type IV collagen in dilated ER leads to apoptosis in Hsp47-knockout mouse embryos via induction of CHOP. *J Cell Sci.* 2004; 117(Pt 24):5913-22.

33A. Weng Y C, Sonni A, Labelle-Dumais C, de Leau M, Kauffman W B, Jeanne M, Biffi A, Greenberg S M, Rosand J, and Gould D B. COL4A1 mutations in patients with sporadic late-onset intracerebral hemorrhage. *Ann Neurol.* 2012; 71(4):470-7.

34A. Wilson D G, Phamluong K, Li L, Sun M, Cao T C, Liu P S, Modrusan Z, Sandoval W N, Rangell L, Carano R A, et al. Global defects in collagen secretion in a Mia3/TANGO1 knockout mouse. *J Cell Biol.* 2011; 193(5):935-51.

35A. Kim I, Xu W, and Reed J C. Cell death and endoplasmic reticulum stress: disease relevance and therapeutic opportunities. *Nat Rev Drug Discov.* 2008; 7(12):1013-30.

36A. Oslowski C M, and Urano F. The binary switch between life and death of endoplasmic reticulum-stressed beta cells. *Curr Opin Endocrinol Diabetes Obes.* 2010; 17(2):107-12.

37A. Michel J B. Anoikis in the cardiovascular system: known and unknown extracellular mediators. *Arterioscler Thromb Vasc Biol.* 2003; 23(12):2146-54.

38A. Mao M, Alavi M V, Labelle-Dumais C, and Gould D B. Type IV Collagens and Basement Membrane Diseases: Cell Biology and Pathogenic Mechanisms. *Curr Top Membr.* 2015; 76(61-116.

39A. Ricard-Blum S. The collagen family. *Cold Spring Harb Perspect Biol.* 2011; 3(1):a004978.

40A. Chioran A, Duncan S, Catalano A, Brown T J, and Ringuette M J. Collagen IV trafficking: The inside-out and beyond story. *Dev Biol.* 2017; 431(2):124-33.

41A. Ishikawa Y, and Bachinger H P. A molecular ensemble in the rER for procollagen maturation. *Biochim Biophys Acta.* 2013; 1833(11):2479-91.

42A. Kuo D S, Labelle-Dumais C, Mao M, Jeanne M, Kauffman W B, Allen J, Favor J, and 50 Gould D B. Allelic heterogeneity contributes to variability in ocular dysgenesis, myopathy and brain malformations caused by Col4a1 and Col4a2 mutations. *Hum Mol Genet.* 2014; 23(7):1709-22.

43A. Lapinski P E, Lubeck B A, Chen D, Doosti A, Zawieja S D, Davis M J, and King P D. RASA1 regulates the function of lymphatic vessel valves in mice. *J Clin Invest.* 2017; 127(7):2569-85.

44A. Engelman J A, Chen L, Tan X, Crosby K, Guimaraes A R, Upadhyay R, Maira M, McNamara K, Perera S A, Song Y, et al. Effective use of PI3K and MEK inhibitors to treat mutant Kras G12D and PIK3CA H1047R murine lung cancers. *Nat Med.* 2008; 14(12):1351-6.

45A. Pratilas C A, and Solit D B. Targeting the mitogen-activated protein kinase pathway: physiological feedback and drug response. *Clin Cancer Res.* 2010; 16(13):3329-34.

46A. Courtney K D, Corcoran R B, and Engelman J A. The PI3K pathway as drug target in human cancer. *J Clin Oncol.* 2010; 28(6):1075-83.

47A. Doyle S A, and Smith B D. Role of the pro-alpha2(I) COOH-terminal region in assembly of type I collagen: disruption of two intramolecular disulfide bonds in pro-alpha2(I) blocks assembly of type I collagen. *J Cell Biochem.* 1998; 71(2):233-42.

48A. Lim A L, Doyle S A, Balian G, and Smith B D. Role of the pro-alpha2(I) COOH-terminal region in assembly of type I collagen: truncation of the last 10 amino acid residues of pro-alpha2(I) chain prevents assembly of type I collagen heterotrimer. *J Cell Biochem.* 1998; 71(2):216-32.

49A. Wilkinson B, and Gilbert H F. Protein disulfide isomerase. *Biochim Biophys Acta.* 2004; 1699(1-2):35-44.

50A. Bachinger H P, Fessler L I, and Fessler J H. Mouse procollagen IV. Characterization and supramolecular association. *J Biol Chem.* 1982; 257(16):9796-803.

51A. Schmidpeter P A, and Schmid F X. Prolyl isomerization and its catalysis in protein folding and protein function. *J Mol Biol.* 2015; 427(7):1609-31.

52A. Myllyharju J, and Kivirikko K I. Collagens, modifying enzymes and their mutations in humans, flies and worms. *Trends Genet.* 2004; 20(1):33-43.

53A. Tiainen P, Pasanen A, Sormunen R, and Myllyharju J. Characterization of recombinant human prolyl 3-hydroxylase isoenzyme 2, an enzyme modifying the basement membrane collagen IV. *J Biol Chem.* 2008; 283(28): 19432-9.

54A. Annunen P, Autio-Harmainen H, and Kivirikko K I. The novel type II prolyl 4-hydroxylase is the main enzyme form in chondrocytes and capillary endothelial cells, whereas the type I enzyme predominates in most cells. *J Biol Chem.* 1998; 273(11):5989-92.

55A. Nissi R, Autio-Harmainen H, Marttila P, Sormunen R, and Kivirikko K I. Prolyl 4-hydroxylase isoenzymes I and II have different expression patterns in several human tissues. *J Histochem Cytochem.* 2001; 49(9):1143-53.

56A. Byers P H, and Pyott S M. Recessively inherited forms of osteogenesis imperfecta. *Annu Rev Genet.* 2012; 46(475-97.

57A. Vranka J A, Pokidysheva E, Hayashi L, Zientek K, Mizuno K, Ishikawa Y, Maddox K, Tufa S, Keene D R, Klein R, et al. Prolyl 3-hydroxylase 1 null mice display abnormalities in fibrillar collagen-rich tissues such as tendons, skin, and bones. *J Biol Chem.* 2010; 285(22): 17253-62.

58A. Shoulders M D, and Raines R T. Collagen structure and stability. *Annu Rev Biochem.* 2009; 78(929-58.

59A. Mizuno K, Hayashi T, Peyton D H, and Bachinger H P. The peptides acetyl-(Gly-3(S)Hyp-4(R)Hyp)10-NH2 and acetyl-(Gly-Pro-3(S)Hyp)10-NH2 do not form a collagen triple helix. *J Biol Chem.* 2004; 279(1):282-7.

60A. Jenkins C L, Bretscher L E, Guzei I A, and Raines R T. Effect of 3-hydroxyproline 50 residues on collagen stability. *J Am Chem Soc.* 2003; 125(21):6422-7.

61A. Yamauchi M, and Sricholpech M. Lysine post-translational modifications of collagen. *Essays Biochem.* 2012; 52(113-33.

62A. Kivirikko K I, and Pihlajaniemi T. Collagen hydroxylases and the protein disulfide isomerase subunit of prolyl 4-hydroxylases. *Adv Enzymol Relat Areas Mol Biol.* 1998; 72(325-98.

63A. Ruotsalainen H, Sipila L, Vapola M, Sormunen R, Salo A M, Uitto L, Mercer D K, Robins S P, Risteli M, Aszodi A, et al. Glycosylation catalyzed by lysyl hydroxylase 3 is essential for basement membranes. *J Cell Sci.* 2006; 119(Pt 4):625-35.

64A. Sipila L, Ruotsalainen H, Sormunen R, Baker N L, Lamande S R, Vapola M, Wang C, Sado Y, Aszodi A, and Myllyla R. Secretion and assembly of type IV and VI collagens depend on glycosylation of hydroxylysines. *J Biol Chem.* 2007; 282(46):33381-8.

65A. Ishida Y, and Nagata K. Hsp47 as a collagen-specific molecular chaperone. *Methods Enzymol.* 2011; 499(167-82.

66A. Rose N R, McDonough M A, King O N, Kawamura A, and Schofield C J. Inhibition of 2-oxoglutarate dependent oxygenases. *Chem Soc Rev.* 2011; 40(8):4364-97.

67A. Gilkes D M, Chaturvedi P, Bajpai S, Wong C C, Wei H, Pitcairn S, Hubbi M E, Wirtz D, and Semenza G L. Collagen prolyl hydroxylases are essential for breast cancer metastasis. *Cancer Res.* 2013; 73(11):3285-96.

68A. Matsuoka Y, Kubota H, Adachi E, Nagai N, Marutani T, Hosokawa N, and Nagata K. Insufficient folding of type IV collagen and formation of abnormal basement membrane-like structure in embryoid bodies derived from Hsp47-null embryonic stem cells. *Mol Biol Cell.* 2004; 15(10):4467-75.

69A. Takaluoma K, Hyry M, Lantto J, Sormunen R, Bank R A, Kivirikko K I, Myllyharju J, and Soininen R. Tissue-specific changes in the hydroxylysine content and cross-links of collagens and alterations in fibril morphology in lysyl hydroxylase 1 knock-out mice. *J Biol Chem.* 2007; 282(9):6588-96.

70A. Venetsanakos E, Mirza A, Fanton C, Romanov S R, Tlsty T, and McMahon M. Induction of tubulogenesis in telomerase-immortalized human microvascular endothelial cells by glioblastoma cells. *Exp Cell Res.* 2002; 273(1):21-33.

71A. Aro E, Salo A M, Khatri R, Finnila M, Miinalainen I, Sormunen R, Pakkanen O, Holster T, Soininen R, Prein C, et al. Severe Extracellular Matrix Abnormalities and Chondrodysplasia in Mice Lacking Collagen Prolyl 4-Hydroxylase Isoenzyme II in Combination with a Reduced Amount of Isoenzyme I. *J Biol Chem.* 2015; 290(27): 16964-78.

72A. Homan E P, Lietman C, Grafe I, Lennington J, Morello R, Napierala D, Jiang M M, Munivez E M, Dawson B, Bertin T K, et al. Differential effects of collagen prolyl 3-hydroxylation on skeletal tissues. *PLoS Genet.* 2014; 10(1):e1004121.

73A. Rautavuoma K, Takaluoma K, Sormunen R, Myllyharju J, Kivirikko K I, and Soininen R. Premature aggregation of type IV collagen and early lethality in lysyl hydroxylase 3 null mice. *Proc Natl Acad Sci USA.* 2004; 101(39):14120-5.

74A. Claxton S, Kostourou V, Jadeja S, Chambon P, Hodivala-Dilke K, and Fruttiger M. Efficient, inducible Cre-recombinase activation in vascular endothelium. *Genesis.* 2008; 46(2):74-80.

75A. Martin-Almedina S, Martinez-Corral I, Holdhus R, Vicente A, Fotiou E, Lin S, Petersen K, Simpson M A, Hoischen A, Gilissen C, et al. EPHB4 kinase-inactivating mutations cause autosomal dominant lymphatic-related hydrops fetalis. *J Clin Invest.* 2016; 126(8):3080-8.

76A. Wang H U, Chen Z F, and Anderson D J. Molecular distinction and angiogenic interaction between embryonic arteries and veins revealed by ephrin-B2 and its receptor Eph-B4. *Cell.* 1998; 93(5):741-53.

77A. Anand S, Majeti B K, Acevedo L M, Murphy E A, Mukthavaram R, Scheppke L, Huang M, Shields D J, Lindquist J N, Lapinski P E, et al. MicroRNA-132-mediated loss of p120RasGAP activates the endothelium to facilitate pathological angiogenesis. *Nat Med.* 2010; 16(8):909-14.

78A. Lapinski P E, Bauler T J, Brown E J, Hughes E D, Saunders T L, and King P D. Generation of mice with a conditional allele of the p120 Ras GTPase-activating protein. *Genesis.* 2007; 45(12):762-7.

79A. Lapinski P E, Qiao Y, Chang C H, and King P D. A role for p120 RasGAP in thymocyte positive selection and survival of naive T cells. *J Immunol.* 2011; 187(1):151-63.

80A. Mleczko-Sanecka K, Roche F, da Silva A R, Call D, D'Alessio F, Ragab A, Lapinski P E, Ummanni R, Korf U, Oakes C, et al. Unbiased RNAi screen for hepcidin regulators links hepcidin suppression to proliferative Ras/RAF and nutrient-dependent mTOR signaling. *Blood.* 2014; 123(10):1574-85.

81A. Lubeck B A, Lapinski P E, Oliver J A, Ksionda O, Parada L F, Zhu Y, Maillard I, Chiang M, Roose J, and King P D. Cutting Edge: Codeletion of the Ras GTPase-Activating Proteins (RasGAPs) Neurofibromin 1 and p120 RasGAP in T Cells Results in the Development of T Cell Acute Lymphoblastic Leukemia. *J Immunol.* 2015; 195(1):31-5.

---

The invention claimed is:

1. A method of treating or preventing capillary malformation-arteriovenous malformation (CM-AVM) comprising administering to a subject a pharmaceutical composition that promotes proper folding, and therefore export of, collagen IV from endothelial cells.

2. The method of claim 1, wherein the pharmaceutical composition comprises a chaperone molecule the facilitates proper folding of collagen IV, thereby allowing export of collagen from the endoplasmic reticulum and from the endothelial cells.

3. The method of claim 2, wherein the chaperone molecule is selected from 4-phenylbutyric acid (PBA), tauroursodeoxycholic acid (TUDCA), and ursodeoxycholic acid (UDCA).

4. The method of claim 1, wherein the pharmaceutical composition comprises an inhibitor of a collagen IV modifying enzyme that prevents over modification of collagen IV that leads to collagen IV accumulation in the ER and/or retaining of collagen IV within endothelial cells.

5. The method of claim 4, wherein the collagen IV modifying enzyme comprises a 2-oxoglutarate dependent collagen IV modifying enzymes.

6. The method of claim 5, wherein the inhibitor is selected from:

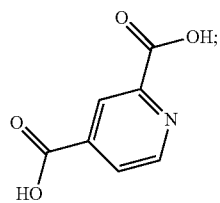

[2,4-Pyridinedicarboxylic Acid (2,4-PDCA)]

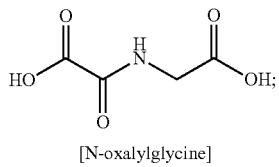

[N-oxalylglycine]

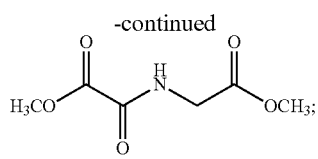

[dimethyloxalylglycine (DMOG)]

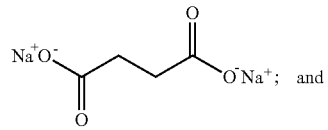

[sodium disuccinate]

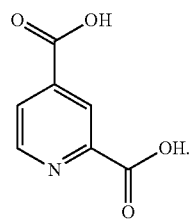

[pyridine-2,4-dicarboxylic acid (PDCA)]

7. The method of claim 1, wherein the pharmaceutical composition comprises an inhibitor of an enzyme of a signaling pathway that is downstream from RASA1 and/or EPHB4.

8. The method of claim 7, wherein the pharmaceutical composition comprises an inhibitor of a mitogen-activated protein kinase (MAPK).

9. The method of claim 8, wherein the inhibitor is selected from:

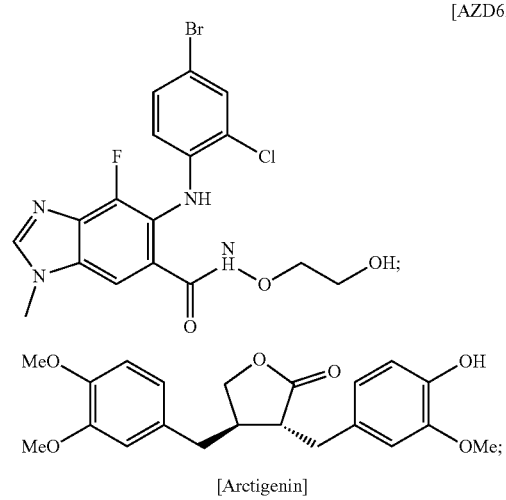

[AZD6244]

[Arctigenin]

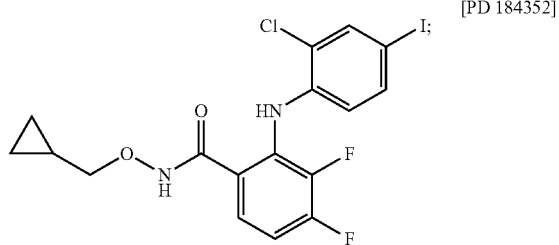

[BIX 02189]

[PD 0325901]

[PD 184352]

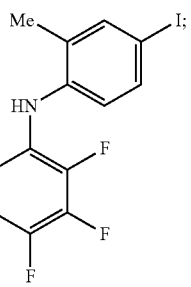

[PD 198306]

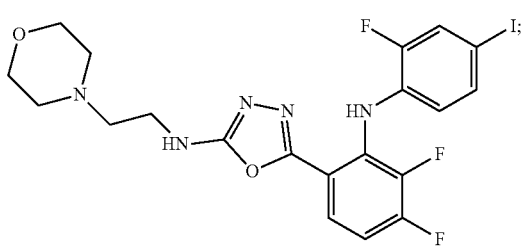

[PD 334581]

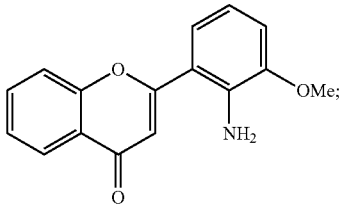

[PD 98059]

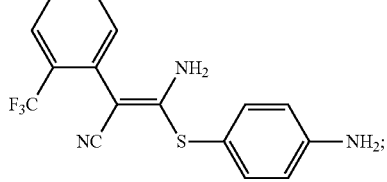

[SL 327]

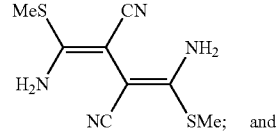

[U0124]

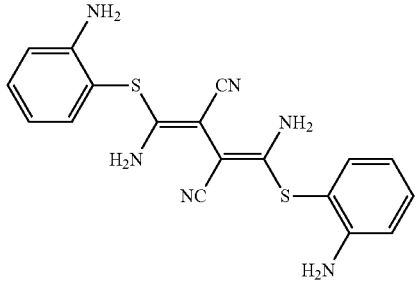

[U0126]

10. The method of claim 1, wherein the pharmaceutical composition is administered to a subject that carries a germline mutation of RASA1 (RAS p21 protein activator 1).

11. The method of claim 1, wherein the pharmaceutical composition is administered to a subject that carries a germline mutation of EPHB4 (Ephrin type-B receptor 4).

12. The method of claim 1, wherein the subject suffers from CM-AVM and the pharmaceutical composition is administered to treat CM-AVM or symptoms thereof.

13. The method of claim 1, wherein the subject is at risk of developing CM-AVM and the pharmaceutical composition is administered to prevent CM-AVM or symptoms thereof.

14. The method of claim 1, wherein the subject is an adult female that carries a germline mutation that places offspring of the subject at risk for CM-AVM.

15. The method of claim 14, wherein the subject is pregnant, and the pharmaceutical composition is administered to prevent the offspring from developing CM-AVM.

16. The method of claim 1, further comprising a step of testing a subject for a germline mutation that renders susceptibility to CM-AVM.

17. The method of claim 16, wherein the subject is an infant or neonate.

18. The method of claim 16, wherein the subject is a female and is pregnant or pursuing pregnancy.

19. The method of claim 1, further comprising co-administering to the subject one or more agents that promote prenatal health and/or prevent development of birth defects in offspring of the subject.

\* \* \* \* \*

SEQUENCE LISTING

```
<160> NUMBER OF SEQ ID NOS: 11

<210> SEQ ID NO 1
<211> LENGTH: 25
<212> TYPE: RNA
<213> ORGANISM: Artificial sequence
<220> FEATURE:
<223> OTHER INFORMATION: RASA1 siRNA

<400> SEQUENCE: 1
gcaggcaggg aagucuggca guuau                                 25

<210> SEQ ID NO 2
<211> LENGTH: 19
<212> TYPE: DNA
<213> ORGANISM: Artificial sequence
<220> FEATURE:
<223> OTHER INFORMATION: DNA Primer

<400> SEQUENCE: 2
ggccgggaag aagatccac                                        19

<210> SEQ ID NO 3
<211> LENGTH: 22
<212> TYPE: DNA
```

```
<213> ORGANISM: Artificial sequence
<220> FEATURE:
<223> OTHER INFORMATION: DNA Primer

<400> SEQUENCE: 3
gcagacttga ccaactgtca tt                                          22

<210> SEQ ID NO 4
<211> LENGTH: 21
<212> TYPE: DNA
<213> ORGANISM: Artificial sequence
<220> FEATURE:
<223> OTHER INFORMATION: DNA Primer

<400> SEQUENCE: 4
tgacccagat catgtttgag a                                           21

<210> SEQ ID NO 5
<211> LENGTH: 20
<212> TYPE: DNA
<213> ORGANISM: Artificial sequence
<220> FEATURE:
<223> OTHER INFORMATION: DNA Primer

<400> SEQUENCE: 5
tacggccaga ggcgtacagc                                             20

<210> SEQ ID NO 6
<211> LENGTH: 21
<212> TYPE: DNA
<213> ORGANISM: Artificial sequence
<220> FEATURE:
<223> OTHER INFORMATION: DNA Primer

<400> SEQUENCE: 6
gagaggcggt gatggaatga a                                           21

<210> SEQ ID NO 7
<211> LENGTH: 23
<212> TYPE: DNA
<213> ORGANISM: Artificial sequence
<220> FEATURE:
<223> OTHER INFORMATION: DNA Primer

<400> SEQUENCE: 7
actcggtaaa caagatgacc aga                                         23

<210> SEQ ID NO 8
<211> LENGTH: 21
<212> TYPE: DNA
<213> ORGANISM: Artificial sequence
<220> FEATURE:
<223> OTHER INFORMATION: DNA Primer

<400> SEQUENCE: 8
aacagaagtc ggaacgcgaa a                                           21

<210> SEQ ID NO 9
<211> LENGTH: 20
<212> TYPE: DNA
<213> ORGANISM: Artificial sequence
<220> FEATURE:
<223> OTHER INFORMATION: DNA Primer

<400> SEQUENCE: 9
tccacgaggg tctcgatctc                                             20
```

```
<210> SEQ ID NO 10
<211> LENGTH: 24
<212> TYPE: DNA
<213> ORGANISM: Artificial sequence
<220> FEATURE:
<223> OTHER INFORMATION: DNA Primer

<400> SEQUENCE: 10
cggttccgat gccctgaggc tctt                                         24

<210> SEQ ID NO 11
<211> LENGTH: 20
<212> TYPE: DNA
<213> ORGANISM: Artificial sequence
<220> FEATURE:
<223> OTHER INFORMATION: DNA Primer

<400> SEQUENCE: 11
tccacgaggg tctcgatctc                                              20
```